（12）United States Patent
Wang et al.

(10) Patent No.: US 9,965,026 B2
(45) Date of Patent: May 8, 2018

(54) INTERACTIVE VIDEO DISPLAY METHOD, DEVICE, AND SYSTEM

(71) Applicant: Huawei Technologies Co., Ltd., Shenzhen (CN)

(72) Inventors: Kai Wang, Shenzhen (CN); Shiguo Lian, Beijing (CN); Zhaoxiang Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 168 days.

(21) Appl. No.: 15/060,976

(22) Filed: Mar. 4, 2016

(65) Prior Publication Data

US 2016/0259403 A1    Sep. 8, 2016

(30) Foreign Application Priority Data

Mar. 4, 2015    (CN) .......................... 2015 1 0096217

(51) Int. Cl.
*G06F 3/00*     (2006.01)
*G06F 3/147*    (2006.01)
(Continued)

(52) U.S. Cl.
CPC .............. *G06F 3/005* (2013.01); *G06F 3/011* (2013.01); *G06F 3/012* (2013.01); *G06F 3/147* (2013.01);
(Continued)

(58) Field of Classification Search
CPC .......... G06F 3/005; G06F 3/011; G06F 3/012; G06F 3/1415; G06F 3/1462
(Continued)

(56) References Cited

U.S. PATENT DOCUMENTS

| 5,903,816 A | 5/1999 | Broadwin et al. |
| 2005/0034161 A1 | 2/2005 | Brown |

(Continued)

FOREIGN PATENT DOCUMENTS

| CN | 1516968 A | 7/2004 |
| WO | 2013162564 A1 | 10/2013 |

OTHER PUBLICATIONS

Wu, C., et al., "Design and Realization of a Framework for Human-System Interaction in Smart Homes," IEEE Transactions on Systems, Man, and Cybernetics—Part A: Systems and Humans, vol. 42, No. 1, Jan. 2012, pp. 15-31.

Gaver, W., et al., "A Virtual Window on Media Space," Proceedings of CHI'95, May 7-11, 1995, 9 pages.

Anton, P., et al., "An Immersive View Approach by Secure Interactive Multimedia Proof-of-concept Implementation," vol. 74, No. 19, Jan. 2013, 17 pages.

(Continued)

*Primary Examiner* — Farzana Hossain
(74) *Attorney, Agent, or Firm* — Conley Rose, P.C.

(57) ABSTRACT

A method, a device, and a system for interactive video display, relate to the field of multimedia technologies, and can resolve a problem in the prior art that browsing experience of a user is not real because a visible region is simply changed only according to a panning change of a location of the user. A specific solution is acquiring posture information of a user, where the posture information includes viewing angle information of the user and location information of the user, and adjusting, according to the posture information, an unadjusted visible region, in a video, for being displayed on a client in order to obtain an adjusted visible region currently for being displayed on the client. The embodiments of the present invention are used for performing interactive video display.

19 Claims, 27 Drawing Sheets

(51) Int. Cl.
  *G06F 3/01* (2006.01)
  *G06K 9/00* (2006.01)
  *G06T 19/00* (2011.01)
  *H04N 5/232* (2006.01)
  *G06F 3/14* (2006.01)

(52) U.S. Cl.
  CPC .......... *G06F 3/1415* (2013.01); *G06F 3/1462* (2013.01); *G06K 9/00382* (2013.01); *G06T 19/006* (2013.01); *H04N 5/23206* (2013.01); *H04N 5/23293* (2013.01); *H04N 5/23296* (2013.01); *G06F 2203/012* (2013.01); *G09G 2320/02* (2013.01); *G09G 2320/0261* (2013.01); *G09G 2340/04* (2013.01); *G09G 2340/0464* (2013.01); *G09G 2370/022* (2013.01)

(58) Field of Classification Search
  USPC .......................................................... 348/77
  See application file for complete search history.

(56) References Cited

U.S. PATENT DOCUMENTS

| | | |
|---|---|---|
| 2009/0051542 A1 | 2/2009 | Jung et al. |
| 2012/0010533 A1* | 1/2012 | Arnett .................. A61B 5/0064 600/590 |
| 2013/0016102 A1 | 1/2013 | Look et al. |
| 2013/0219012 A1 | 8/2013 | Suresh et al. |
| 2014/0002419 A1 | 1/2014 | Thorson et al. |

OTHER PUBLICATIONS

Foreign Communication From a Counterpart Application, European Application No. 16158155.8, Partial European Search Report dated Jul. 20, 2016, 7 pages.
Foreign Communication From A Counterpart Application, European Application No. 16158155.8, Extended European Search Report dated Oct. 17, 2016, 12 pages.

* cited by examiner

Camera device    Server    Client

Coronal axis

Rotate around
the coronal axis

INTERACTIVE VIDEO DISPLAY METHOD, DEVICE, AND SYSTEM

CROSS-REFERENCE TO RELATED APPLICATION

This application claims priority to Chinese Patent Application No. 201510096217.1, filed on Mar. 4, 2015, which is hereby incorporated by reference in its entirety.

TECHNICAL FIELD

The present disclosure relates to the field of multimedia technologies, and in particular, to a method, a device, and a system for interactive video display.

BACKGROUND

With the development of video capturing and shooting technologies and advancement of network transmission technologies, there are, in a daily business office and home entertainment, increasing applications with which a user enjoys a remote scene when staying indoors. The user may browse the remote scene using an electronic screen, a head-mounted display, or another display device, and various applications by which the user browses the remote scene using various devices include a video conference, a television program and a movie, a game, and the like. When the user enjoys the remote scene using a client, an interactive browsing manner allows the user to be able to control in real time a change of video content using various input devices and in various manners (a remote control, a posture, and the like). Therefore, immersive experience and a sense of realistic experience during scene video browsing of the user can be improved.

In the prior art, when a scene video is browsed using a real-time interactive remote scene browsing system (live interactive frame (LIFE)), movement distances, of a visible region of a user on a screen, in a vertical direction and in a horizontal direction may be adjusted by detecting changes, of a location of the user, in an up-down direction and a left-right direction. When the visible region crosses a border of a current image obtained by means of shooting, a camera moves in a changing direction of the visible region. In the method, the visible region is simply changed by means of panning only according to a panning change of the location of the user, and a corresponding change during a change of another posture factor, such as a back and forth movement of the location of the user relative to the screen, is ignored such that a change, perceived by the eyes of the user, of an image is inconsistent with that in a real situation.

SUMMARY

Embodiments of the present disclosure provide a method, a device, and a system for interactive video display, which can resolve a problem in the prior art that browsing experience of a user is not real because a visible region is simply changed only according to a panning change of a location of the user.

To achieve the foregoing objective, the following technical solutions are adopted in the embodiments of the present disclosure.

According to a first aspect, an interactive video display method is provided, including acquiring posture information of a user, where the posture information includes viewing angle information of the user and location information of the user, and adjusting, according to the posture information, an unadjusted visible region, in a video, for being displayed on a client in order to obtain an adjusted visible region currently for being displayed on the client.

With reference to the first aspect, in a first possible implementation manner of the first aspect, the location information of the user includes a vertical distance between the user and a plane of the client, and the adjusting, according to the posture information, an unadjusted visible region, in a video, for being displayed on a client in order to obtain an adjusted visible region currently for being displayed on the client includes acquiring at least one of a region size change value and region displacement of the unadjusted visible region according to the viewing angle information of the user and the vertical distance, where the region size change value includes a width change value of the unadjusted visible region and a height change value of the unadjusted visible region, and the region displacement includes horizontal displacement of the unadjusted visible region and vertical displacement of the unadjusted visible region and adjusting the unadjusted visible region according to the at least one of the region size change value and the region displacement in order to obtain the adjusted visible region.

With reference to the first possible implementation manner of the first aspect, in a second possible implementation manner of the first aspect, the adjusting the unadjusted visible region according to the at least one of the region size change value and the region displacement in order to obtain the adjusted visible region includes, when the vertical distance is greater than or equal to a preset distance threshold, where the video is a dynamic image on which a virtual window picture is superimposed, the virtual window picture includes a transparent region, a range that is in the dynamic image and that is covered by the transparent region of the virtual window picture is visible, and the unadjusted visible region is obtained by superimposing an unadjusted region of the virtual window picture on an unadjusted region of the dynamic image, adjusting the unadjusted region of the virtual window picture according to the at least one of the region size change value and the region displacement in order to obtain an adjusted region of the virtual window picture, and fully covering the unadjusted region of the dynamic image with an adjusted picture that is presented in the adjusted region of the virtual window picture to obtain the adjusted visible region, or when a vertical distance is less than the preset distance threshold, adjusting the unadjusted visible region according to the region displacement in order to obtain the adjusted visible region.

With reference to any one of the first aspect to the second possible implementation manner of the first aspect, in a third possible implementation manner of the first aspect, the viewing angle information of the user includes face orientation information of the user, where the face orientation information of the user includes an angle by which a face orientation of the user rotates around a coronal axis and an angle by which the face orientation of the user rotates around a vertical axis.

With reference to any one of the first to third possible implementation manners of the first aspect, in a fourth possible implementation manner of the first aspect, the region size change value of the unadjusted visible region is acquired using the following formulas.

$$\Delta w = z_u * \left( \tan\left(\frac{\theta_{fov}}{2} + \theta_u^y\right) + \tan\left(\frac{\theta_{fov}}{2} - \theta_u^y\right) \right) - 2 * z_u * \tan\left(\frac{\theta_{fov}}{2}\right), \text{ and}$$

-continued
$$\Delta h = z_u * \left( \tan\left(\frac{\theta_{fov}}{2} + \theta_u^x\right) + \tan\left(\frac{\theta_{fov}}{2} - \theta_u^x\right) \right) - 2 * z_u * \tan\left(\frac{\theta_{fov}}{2}\right),$$

where $\Delta w$ represents the width change value of the unadjusted visible region, $\Delta h$ represents the height change value of the unadjusted visible region, $\theta_u^x$ represents the angle by which the face orientation of the user rotates around the coronal axis, $\theta_u^y$ represents the angle by which the face orientation of the user rotates around the vertical axis, $\theta_{fov}$ represents a maximum visual angle of human eyes, and $z_u$ represents the vertical distance.

With reference to any one of the first to fourth possible implementation manners of the first aspect, in a fifth possible implementation manner of the first aspect, the region displacement of the unadjusted visible region is acquired using the following formulas:

$$x_v = \frac{1}{2} * z_u * \left( \tan\left(\frac{\theta_{fov}}{2} + \theta_u^y\right) - \tan\left(\frac{\theta_{fov}}{2} - \theta_u^y\right) \right), \text{ and}$$

$$y_v = \frac{1}{2} * z_u * \left( \tan\left(\frac{\theta_{fov}}{2} + \theta_u^x\right) - \tan\left(\frac{\theta_{fov}}{2} - \theta_u^x\right) \right),$$

where $x_v$ represents the horizontal displacement of the unadjusted visible region, $y_v$ represents the vertical displacement of the unadjusted visible region, $\theta_u^x$ represents the angle by which the face orientation of the user rotates around the coronal axis, $\theta_u^y$ represents the angle by which the face orientation of the user rotates around the vertical axis, $\theta_{fov}$ represents a maximum visual angle of human eyes, and $z_u$ represents the vertical distance.

With reference to any one of the first aspect to the fifth possible implementation manner of the first aspect, in a sixth possible implementation manner of the first aspect, the location information of the user includes a change value of the vertical distance between the user and the plane of the client, and the adjusting, according to the posture information, an unadjusted visible region, in a video, for being displayed on a client in order to obtain an adjusted visible region currently for being displayed on the client includes acquiring the region size change value of the unadjusted visible region according to the change value of the vertical distance, where the region size change value includes the width change value of the unadjusted visible region and the height change value of the unadjusted visible region, and adjusting the unadjusted visible region according to the region size change value in order to obtain the adjusted visible region.

With reference to the sixth possible implementation manner of the first aspect, in a seventh possible implementation manner of the first aspect, a formula for acquiring the region size change value of the unadjusted visible region according to the change value of the vertical distance includes $$\Delta w = \Delta h = \Delta z_u * \tan\left(\frac{\theta_{fov}}{2}\right) * 2,$$

where $\Delta w$ represents the width change value of the unadjusted visible region, $\Delta h$ represents the height change value of the unadjusted visible region, $\theta_{fov}$ represents a maximum visual angle of human eyes, and $\Delta z_u$ represents the change value of the vertical distance.

With reference to any one of the first aspect to the seventh possible implementation manner of the first aspect, in an eighth possible implementation manner of the first aspect, the method is executed by the client, and after the adjusting, according to the posture information, an unadjusted visible region, in a video, for being displayed on a client in order to obtain an adjusted visible region currently for being displayed on the client, the method further includes requesting, from a server, a bitstream file corresponding to a region in the video that covers the adjusted visible region; and receiving the bitstream file.

With reference to the eighth possible implementation manner of the first aspect, in a ninth possible implementation manner of the first aspect, the video is divided into n sub-regions, n is a positive integer greater than 1, adjacent sub-regions in the n sub-regions have an overlapped region and the adjacent sub-regions have non-overlapped regions, and the region in the video that covers the adjusted visible region is a to-be-downloaded sub-region in the n sub-regions that has a region overlapped with the adjusted visible region.

With reference to the ninth possible implementation manner of the first aspect, in a tenth possible implementation manner of the first aspect, the requesting, from a server, a bitstream file corresponding to a region in the video that covers the adjusted visible region includes determining, according to a media presentation description that is of the video and that is obtained from the server, address information of the bitstream file corresponding to the to-be-downloaded sub-region, where the media presentation description carries a parameter that is used to indicate a sub-region, in the video, corresponding to the address information, and requesting, from the server according to the address information, the bitstream file corresponding to the to-be-downloaded sub-region.

With reference to any one of the first aspect to the seventh possible implementation manner of the first aspect, in an eleventh possible implementation manner of the first aspect, the method is executed by the client, and after the adjusting, according to the posture information, an unadjusted visible region, in a video, for being displayed on a client in order to obtain an adjusted visible region currently for being displayed on the client, the method further includes predicting a next visible region according to the unadjusted visible region and the adjusted visible region, requesting, from a server, a bitstream file corresponding to a region in the video that covers the next visible region, and receiving the bitstream file.

With reference to any one of the first aspect to the eleventh possible implementation manner of the first aspect, in a twelfth possible implementation manner of the first aspect, the method is executed by the client, the video is shot by a camera device, a camera of the camera device is rotatable, the video includes a buffer region, the unadjusted visible region is within a region range of the buffer region, and the buffer region is within a region range of the video, and after the adjusting, according to the posture information, an unadjusted visible region, in a video, for being displayed on a client in order to obtain an adjusted visible region currently for being displayed on the client, the method further includes, when the adjusted visible region includes a region outside the buffer region, instructing the camera device to rotate the camera in an adjustment direction, where the adjustment direction is a direction from the unadjusted visible region to the adjusted visible region, and redefining an adjusted buffer region so that the adjusted visible region is within a region range of the adjusted buffer region.

With reference to any one of the first aspect to the seventh possible implementation manner of the first aspect, in a thirteenth possible implementation manner of the first aspect, the method is executed by a server, and after the adjusting, according to the posture information, an unadjusted visible region, in a video, for being displayed on a client in order to obtain an adjusted visible region currently for being displayed on the client, the method further includes sending, to the client, a bitstream file corresponding to a region in the video that covers the adjusted visible region.

With reference to the thirteenth possible implementation manner of the first aspect, in a fourteenth possible implementation manner of the first aspect, the video is divided into n sub-regions, where n is a positive integer greater than 1, adjacent sub-regions in the n sub-regions have an overlapped region and the adjacent sub-regions have non-overlapped regions, and the region in the video that covers the adjusted visible region is a to-be-downloaded sub-region in the n sub-regions that has a region overlapped with the adjusted visible region.

With reference to the fourteenth possible implementation manner of the first aspect, in a fifteenth possible implementation manner of the first aspect, the sending, to the client, a bitstream file corresponding to a region in the video that covers the adjusted visible region includes determining, according to a generated media presentation description of the video, address information of the bitstream file corresponding to the to-be-downloaded sub-region, where the media presentation description carries a parameter that is used to indicate a sub-region, in the video, corresponding to the address information; and sending, to the client according to the address information, the bitstream file corresponding to the to-be-downloaded sub-region.

With reference to any one of the first aspect to the seventh possible implementation manner of the first aspect, in a sixteenth possible implementation manner of the first aspect, the method is executed by a server, and after the adjusting, according to the posture information, an unadjusted visible region, in a video, for being displayed on a client in order to obtain an adjusted visible region currently for being displayed on the client, the method further includes predicting a next visible region according to the unadjusted visible region and the adjusted visible region, and sending, to the client, a bitstream file corresponding to a region in the video that covers the next visible region.

With reference to any one of the first aspect to the seventh possible implementation manner of the first aspect, in a seventeenth possible implementation manner of the first aspect, the method is executed by a server, the video is shot by a camera device, a camera of the camera device is rotatable, the video includes a buffer region, the unadjusted visible region is within a region range of the buffer region, and the buffer region is within a region range of the video, and after the adjusting, according to the posture information, an unadjusted visible region, in a video, for being displayed on a client in order to obtain an adjusted visible region currently for being displayed on the client, the method further includes, when the adjusted visible region includes a region outside the buffer region, instructing the camera device to rotate the camera in an adjustment direction, where the adjustment direction is a direction from the unadjusted visible region to the adjusted visible region, and redefining an adjusted buffer region so that the adjusted visible region is within a region range of the adjusted buffer region.

With reference to the eighth or thirteenth possible implementation manner of the first aspect, in an eighteenth possible implementation manner of the first aspect, the region in the video that covers the adjusted visible region is the adjusted visible region.

With reference to the eleventh or sixteenth possible implementation manner of the first aspect, in a nineteenth possible implementation manner of the first aspect, the region in the video that covers the next visible region is the next visible region.

With reference to the tenth or fifteenth possible implementation manner of the first aspect, in a twentieth possible implementation manner of the first aspect, the media presentation description includes a media presentation description having a viewing angle (VMPD), where the VMPD includes address information of the n sub-regions in each time segment obtained by performing compression coding at different bit rates.

According to a second aspect, a computer device is provided, including an acquiring unit configured to acquire posture information of a user, where the posture information includes viewing angle information of the user and location information of the user, and a processing unit configured to adjust, according to the posture information acquired by the acquiring unit, an unadjusted visible region, in a video, for being displayed on a client in order to obtain an adjusted visible region currently for being displayed on the client.

With reference to the second aspect, in a first possible implementation manner of the second aspect, the location information of the user includes a vertical distance between the user and a plane of the client, and the processing unit is further configured to acquire at least one of a region size change value and region displacement of the unadjusted visible region according to the viewing angle information of the user and the vertical distance, where the region size change value includes a width change value and a height change value of the unadjusted visible region, and the region displacement includes horizontal displacement of the unadjusted visible region and vertical displacement of the unadjusted visible region, and adjust the unadjusted visible region according to the at least one of the region size change value and the region displacement in order to obtain the adjusted visible region.

With reference to the first possible implementation manner of the second aspect, in a second possible implementation manner of the second aspect, the processing unit is further configured to, when the vertical distance is greater than or equal to a preset distance threshold, where the video is a dynamic image on which a virtual window picture is superimposed, the virtual window picture includes a transparent region, a range that is in the dynamic image and that is covered by the transparent region of the virtual window picture is visible, and the unadjusted visible region is obtained by superimposing an unadjusted region of the virtual window picture on an unadjusted region of the dynamic image, adjust the unadjusted region of the virtual window picture according to the at least one of the region size change value and the region displacement in order to obtain an adjusted region of the virtual window picture, and fully cover the unadjusted region of the dynamic image with an adjusted picture that is presented in the adjusted region of the virtual window picture to obtain the adjusted visible region, or when a vertical distance is less than the preset distance threshold, adjust the unadjusted visible region according to the region displacement in order to obtain the adjusted visible region.

With reference to any one of the second aspect to the second possible implementation manner of the second aspect, in a third possible implementation manner of the second aspect, the viewing angle information of the user includes face orientation information of the user, where the face orientation information of the user includes an angle by which a face orientation of the user rotates around a coronal axis and an angle by which the face orientation of the user rotates around a vertical axis.

With reference to any one of the first to third possible implementation manners of the second aspect, in a fourth possible implementation manner of the second aspect, the region size change value of the unadjusted visible region is acquired using the following formulas:

$$\Delta w = z_u * \left(\tan\left(\frac{\theta_{fov}}{2} + \theta_u^y\right) + \tan\left(\frac{\theta_{fov}}{2} - \theta_u^y\right)\right) - 2 * z_u * \tan\left(\frac{\theta_{fov}}{2}\right), \text{ and}$$

$$\Delta h = z_u * \left(\tan\left(\frac{\theta_{fov}}{2} + \theta_u^x\right) + \tan\left(\frac{\theta_{fov}}{2} - \theta_u^x\right)\right) - 2 * z_u * \tan\left(\frac{\theta_{fov}}{2}\right),$$

where $\Delta w$ represents the width change value of the unadjusted visible region, $\Delta h$ represents the height change value of the unadjusted visible region, $\theta_u^x$ represents the angle by which the face orientation of the user rotates around the coronal axis, $\theta_u^y$ represents the angle by which the face orientation of the user rotates around the vertical axis, $\theta_{fov}$ represents a maximum visual angle of human eyes, and $z_u$ represents the vertical distance.

With reference to any one of the first to fourth possible implementation manners of the second aspect, in a fifth possible implementation manner of the second aspect, the region displacement of the unadjusted visible region is acquired using the following formulas.

$$x_v = \frac{1}{2} * z_u * \left(\tan\left(\frac{\theta_{fov}}{2} + \theta_u^y\right) - \tan\left(\frac{\theta_{fov}}{2} - \theta_u^y\right)\right), \text{ and}$$

$$y_v = \frac{1}{2} * z_u * \left(\tan\left(\frac{\theta_{fov}}{2} + \theta_u^x\right) - \tan\left(\frac{\theta_{fov}}{2} - \theta_u^x\right)\right),$$

where $x_v$ represents the horizontal displacement of the unadjusted visible region, $y_v$ represents the vertical displacement of the unadjusted visible region, $\theta_u^x$ represents the angle by which the face orientation of the user rotates around the coronal axis, $\theta_u^y$ represents the angle by which the face orientation of the user rotates around the vertical axis, $\theta_{fov}$ represents a maximum visual angle of human eyes, and $z_u$ represents the vertical distance.

With reference to any one of the second aspect to the fifth possible implementation manner of the second aspect, in a sixth possible implementation manner of the second aspect, the location information of the user includes a change value of the vertical distance between the user and the plane of the client, and the processing unit is further configured to acquire the region size change value of the unadjusted visible region according to the change value of the vertical distance, where the region size change value includes the width change value of the unadjusted visible region and the height change value of the unadjusted visible region, and adjust the unadjusted visible region according to the region size change value in order to obtain the adjusted visible region.

With reference to the sixth possible implementation manner of the second aspect, in a seventh possible implementation manner of the second aspect, a formula for acquiring the region size change value of the unadjusted visible region according to the change value of the vertical distance includes, $$\Delta w = \Delta h = \Delta z_u * \tan\left(\frac{\theta_{fov}}{2}\right) * 2,$$

where $\Delta w$ represents the width change value of the unadjusted visible region, $\Delta h$ represents the height change value of the unadjusted visible region, $\theta_{fov}$ represents a maximum visual angle of human eyes, and $\Delta z_u$ represents the change value of the vertical distance.

With reference to any one of the second aspect to the seventh possible implementation manner of the second aspect, in an eighth possible implementation manner of the second aspect, the computer device is the client and further includes a first requesting unit configured to request, from a server, a bitstream file corresponding to a region in the video that covers the adjusted visible region acquired by the processing unit, and a first receiving unit configured to receive the bitstream file requested by the first requesting unit.

With reference to the eighth possible implementation manner of the second aspect, in a ninth possible implementation manner of the second aspect, the video is divided into n sub-regions, where n is a positive integer greater than 1, adjacent sub-regions in the n sub-regions have an overlapped region and the adjacent sub-regions have non-overlapped regions, and the region in the video that covers the adjusted visible region is a to-be-downloaded sub-region in the n sub-regions that has a region overlapped with the adjusted visible region.

With reference to the ninth possible implementation manner of the second aspect, in a tenth possible implementation manner of the second aspect, the first requesting unit is further configured to, determine, according to a media presentation description that is of the video and that is obtained from the server, address information of the bitstream file corresponding to the to-be-downloaded sub-region, where the media presentation description carries a parameter that is used to indicate a sub-region, in the video, corresponding to the address information, and request, from the server according to the address information, the bitstream file corresponding to the to-be-downloaded sub-region.

With reference to any one of the second aspect to the seventh possible implementation manner of the second aspect, in an eleventh possible implementation manner of the second aspect, the computer device is the client, and the processing unit is further configured to predict a next visible region according to a previous visible region and the adjusted visible region currently for being displayed on the client, and the computer device further includes a second requesting unit configured to request, from a server, a bitstream file corresponding to a region in the video that covers the next visible region predicted by the processing unit, and a second receiving unit configured to receive the bitstream file requested by the second requesting unit.

With reference to any one of the second aspect to the eleventh possible implementation manner of the second aspect, in a twelfth possible implementation manner of the second aspect, the computer device is the client, the video is shot by a camera device, a camera of the camera device is rotatable, the video includes a buffer region, the unadjusted visible region is within a region range of the buffer region, and the buffer region is within a region range of the video, and the processing unit is further configured to, when the adjusted visible region includes a region outside the buffer region, instruct the camera device to rotate the camera in an adjustment direction, where the adjustment direction is a direction from the unadjusted visible region to the adjusted visible region, and redefine an adjusted buffer region so that the adjusted visible region is within a region range of the adjusted buffer region.

With reference to any one of the second aspect to the seventh possible implementation manner of the second aspect, in a thirteenth possible implementation manner of the second aspect, the computer device is a server and further includes a first sending unit configured to send, to the client, a bitstream file corresponding to a region in the video that covers the adjusted visible region acquired by the processing unit.

With reference to the thirteenth possible implementation manner of the second aspect, in a fourteenth possible implementation manner of the second aspect, the video is divided into n sub-regions, where n is a positive integer greater than 1, adjacent sub-regions in the n sub-regions have an overlapped region and the adjacent sub-regions have non-overlapped regions, and the region in the video that covers the adjusted visible region is a to-be-downloaded sub-region in the n sub-regions that has a region overlapped with the adjusted visible region.

With reference to the fourteenth possible implementation manner of the second aspect, in a fifteenth possible implementation manner of the second aspect, the first sending unit is further configured to determine, according to a generated media presentation description of the video, address information of the bitstream file corresponding to the to-be-downloaded sub-region, where the media presentation description carries a parameter that is used to indicate a sub-region, in the video, corresponding to the address information; and send, to the client according to the address information, the bitstream file corresponding to the to-be-downloaded sub-region.

With reference to any one of the second aspect to the seventh possible implementation manner of the second aspect, in a sixteenth possible implementation manner of the second aspect, the computer device is a server, and the processing unit is further configured to predict a next visible region according to the unadjusted visible region and the adjusted visible region, and the computer device further includes a second sending unit configured to send, to the client, a bitstream file corresponding to a region in the video that covers the next visible region predicted by the processing unit.

With reference to any one of the second aspect to the seventh possible implementation manner of the second aspect, in a seventeenth possible implementation manner of the second aspect, the computer device is a server, the video is shot by a camera device, a camera of the camera device is rotatable, the video includes a buffer region, the unadjusted visible region is within a region range of the buffer region, and the buffer region is within a region range of the video, and the processing unit is further configured to, when the adjusted visible region includes a region outside the buffer region, instruct the camera device to rotate the camera in an adjustment direction, where the adjustment direction is a direction from the unadjusted visible region to the adjusted visible region, and redefine an adjusted buffer region so that the adjusted visible region is within a region range of the adjusted buffer region.

With reference to the eighth or thirteenth possible implementation manner of the second aspect, in an eighteenth possible implementation manner of the second aspect, the region in the video that covers the adjusted visible region obtained by the processing unit is the adjusted visible region.

With reference to the eleventh or sixteenth possible implementation manner of the second aspect, in a nineteenth possible implementation manner of the second aspect, the region in the video that covers the next visible region is the next visible region.

With reference to the tenth or fifteenth possible implementation manner of the second aspect, in a twentieth possible implementation manner of the second aspect, the media presentation description comprises a media presentation description having a viewing angle VMPD, wherein the VMPD comprises address information of the n sub-regions in each time segment obtained by performing compression coding at different bit rates.

According to a third aspect, a system is provided, including the computer device according to the second aspect.

According to the interactive video display method, the device, and the system that are provided in the embodiments of the present disclosure, posture information of a user is acquired in real time, and an unadjusted visible region, in a video, for being displayed on a client is adjusted according to the posture information of the user in order to obtain an adjusted visible region currently for being displayed on the client such that a visible region for being displayed on the client can be accordingly changed according to a real-time change of the posture information of the user, such as viewing angle information and location information of the user. Therefore, a problem in the prior art that browsing experience of a user is not real because a visible region is simply changed only according to a panning change of a location of the user can be resolved.

BRIEF DESCRIPTION OF DRAWINGS

To describe the technical solutions in the embodiments of the present disclosure or in the prior art more clearly, the following briefly introduces the accompanying drawings required for describing the embodiments or the prior art. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

Scene videos may be classified into two types according to a depth of field: an outdoor scene video in which a depth of field is infinite and an indoor scene video in which a depth of field is finite. Scene videos may also be classified into an offline video and an online video according to a real-time requirement for shooting. The former refers to a video that is shot at a fixed time at a fixed location and that may be prestored for being taken and watched by a user. The latter refers to a video that is captured by various camera devices and transmitted to a client using a network at the same time of being watched by a user. The online video allows a user to be able to enjoy a real-time remote scene and can provide the user with better immersive experience.

The user may browse a scene video in two different browsing manners passive browsing and interactive browsing. Passive browsing refers to that the user watches a scene video played on a screen like watching a movie, and video content is not changed. Interactive browsing refers to that the user may control, using various input devices (for example, a remote control), location information of the user, or the like, video content to be changed in real time according to an input instruction or a location, which can improve immersive experience of browsing a scene video.

Figure 1:
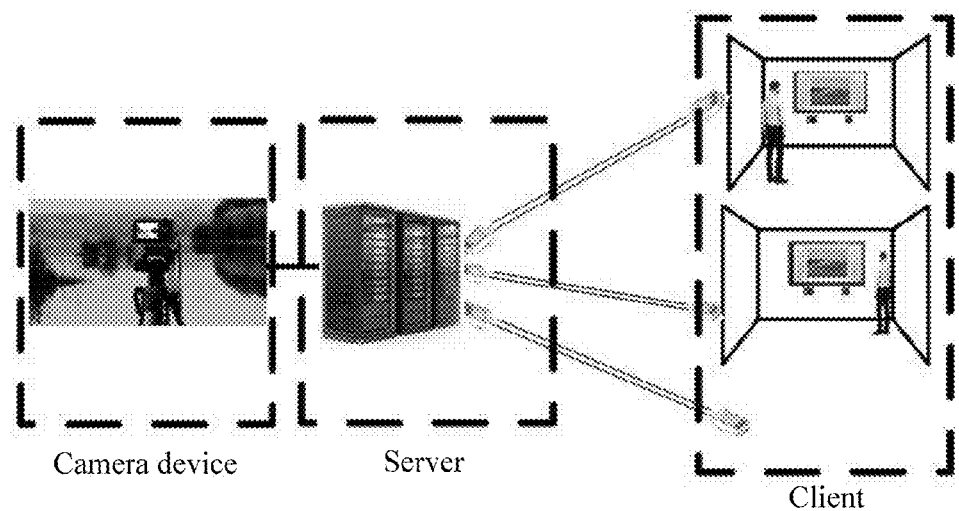
FIG. 1 is a schematic structural diagram of an interactive video display system according to an embodiment of the present disclosure.

The user may perform interactive browsing using an interactive video display system. The interactive video display system may generally include a camera device, a server, and a client, as shown in FIG. 1. The camera device may be connected to the server in a wired manner or in a wireless manner such as WiFi or BLUETOOTH. The server and the client may be connected in a wired manner or in a wireless manner. In this system, the camera device transmits video content obtained by means of shooting to the server, and the server processes the video content and sends the video content to the client. The client herein may include a display screen, a head-mounted display, or another display device that is configured to display the video content sent by the server, and a detection device that is configured to detect posture information of the user, and may further include a computer that is configured to perform related calculation, and the like. The detection device, the display device, or the computer may be connected in a wired manner or in a wireless manner such as WiFi or BLUETOOTH. There may be one or more detection devices, which may also be integrated on the screen. The embodiments of the present disclosure impose no limitation on a quantity of devices in the system and a connection manner between the devices.

The following embodiments use, for example, a screen as a display device of the client for description.

In this application, a visible region refers to an image region, in a video, for being displayed on the client, and is a part of a video region that is obtained by means of shooting by a camera device. The visible region is accordingly changed according to a change of the posture information of a user. To better show a change relationship between the visible region and the posture information of the user, a space rectangular coordinate system $X_u$, $Y_u$, $Z_u$ may be established for description. Exemplarily, a center point of a screen may be set as an origin $O_1=(0,0,0)$ of the space rectangular coordinate system, and a direction that is perpendicular to a plane on which the screen of the client is located, that is, a plane of the client, is set as a direction of a $Z_u$ axis. The plane on which the screen is located divides space into two sides. A direction toward the user may be set as a positive direction of the $Z_u$ axis, and a direction opposite to the positive direction is a negative direction of the $Z_u$ axis. A vertical direction may be set as a direction of a $Y_u$ axis, and an upward direction and a downward direction are a positive direction and a negative direction of the $Y_u$ axis. A horizontal direction that is perpendicular to $Y_u$ and $Z_u$ may be set as a direction of a $X_u$ axis, and a leftward direction and a rightward direction are a negative direction and a positive direction of the $X_u$ axis. After the space rectangular coordinate system is established, a location of the user may be represented by coordinates $(x_u, y_u, z_u)$, where $z_u$ represents a value of a vertical distance between the user and the plane of the client. $\Delta z_u$ may be used to represent a change value of the vertical distance between the user and the plane of the client.

In addition, coordinates of a point in the video region may further be set by setting a coordinate system $(X_v, Y_v)$. A center point in an initial video region may be set as a coordinate origin $O_2=(0,0)$. A horizontal direction is set as an $X_v$ axis, and a rightward direction is a positive direction and a leftward direction is a negative direction. A vertical direction is set as a direction of a $Y_v$ axis, and an upward direction is a positive direction and a downward direction is a negative direction. Coordinates of any point in the visible region may be represented by $(x_v, y_v)$.

Figure 2A:
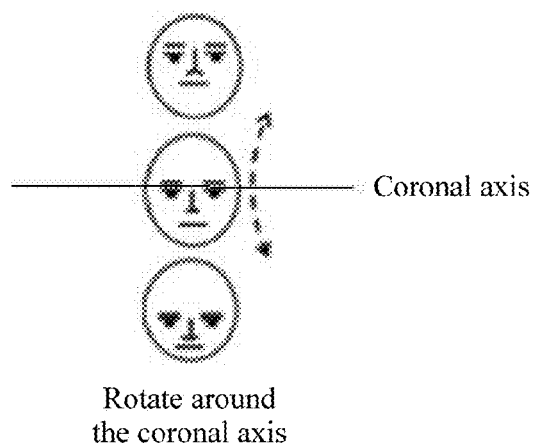
FIG. 2A is a schematic diagram in which a face orientation of a user rotates around a coronal axis according to an embodiment of the present disclosure.
Figure 2B:
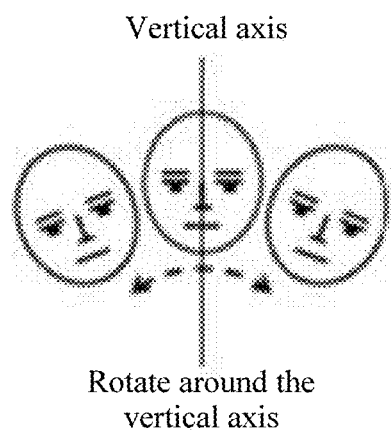
FIG. 2B is a schematic diagram in which a face orientation of a user rotates around a vertical axis according to an embodiment of the present disclosure.

In this application, the posture information of the user may include viewing angle information of the user, and the viewing angle information of the user may include face orientation information of the user, where the face orientation information of the user may include an angle $\theta_u^x$ by which a face orientation of the user rotates around a coronal axis (referring to FIG. 2A) and an angle $\theta_u^y$ by which the face orientation of the user rotates around a vertical axis (referring to FIG. 2B). Exemplarily, when the user looks straight ahead, the angle by which the face orientation of the user rotates around the coronal axis and the angle $\theta_u^y$ by which the face orientation of the user rotates around the vertical axis may be both set to 0. In addition, when the face orientation of the user rotates upward around the coronal axis, $\theta_u^x$ is a positive value, and when the face orientation of the user rotates downward around the coronal axis, $\theta_u^x$ is a negative value; when the face orientation of the user rotates rightward around the vertical axis, $\theta_u^y$ is a positive value, and when the face orientation of the user rotates leftward around the vertical axis, $\theta_u^y$ is a negative value.

This application imposes no limitation on how to represent a location of the user, a viewing angle of the user, and a location of a point in the video region, and how to define a coordinate system.

An embodiment of the present disclosure provides an interactive video display method. For a schematic structural diagram of a client, reference may be made to FIG. 3, and for a flowchart of the method, reference may be made to FIG. 4. The method may mainly include the following steps.

Step 101: The client selects a region from a video and displays the region.

Figure 5A:
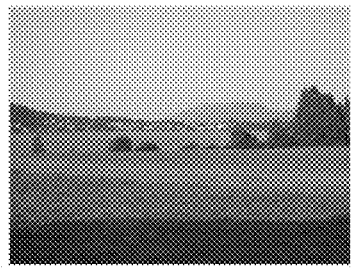
FIG. 5A is a diagram of an image of a video region according to an embodiment of the present disclosure.
Figure 5B:
FIG. 5B is a diagram of an image of an unadjusted visible region according to an embodiment of the present disclosure.

Exemplarily, when starting to perform interactive video display, the client may select a rectangular region in the middle of the video and displays the region on a screen of the client in order to use the selected region as an unadjusted visible region, and adjust the unadjusted visible region to obtain an adjusted visible region. For example, a video region may be shown in FIG. 5A, and the region selected from the video may be shown in FIG. 5B. In this case, coordinates of a center point of the selected unadjusted visible region are (0,0), a width value is $w_0$, and a height value is $h_0$. Certainly, this embodiment of the present disclosure imposes no limitation on a factor such as a specific location, a range, and a shape of the region selected from the video. The video may be an online video that is shot in real time by a camera device and that is received using a server, or may be an offline video prestored in a memory of the client, which is not limited in this embodiment of the present disclosure.

Step 102: The client acquires posture information of a user, where the posture information includes viewing angle information of the user and location information of the user.

Furthermore, the client may acquire the viewing angle information and the location information of the user using a camera of a detection device of the client. The viewing angle information of the user includes face orientation information of the user, where the face orientation information of the user includes an angle $\theta_u^x$ by which a face orientation of the user rotates around a coronal axis and an angle $\theta_u^y$ by which the face orientation of the user rotates around a vertical axis. The location information of the user may include a vertical distance $z_u$ between the user and a plane of the client.

Figure 3:
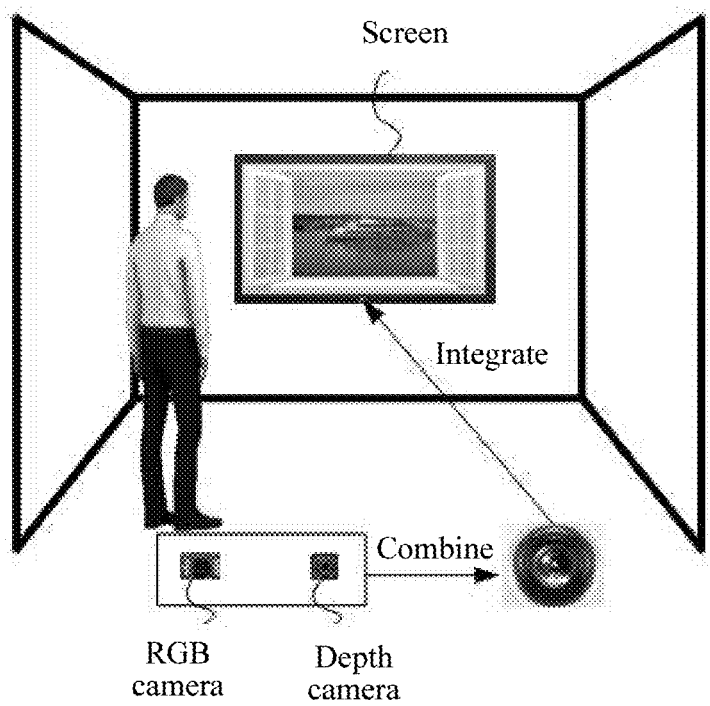
FIG. 3 is a schematic structural diagram of a client according to an embodiment of the present disclosure.
Figure 4:
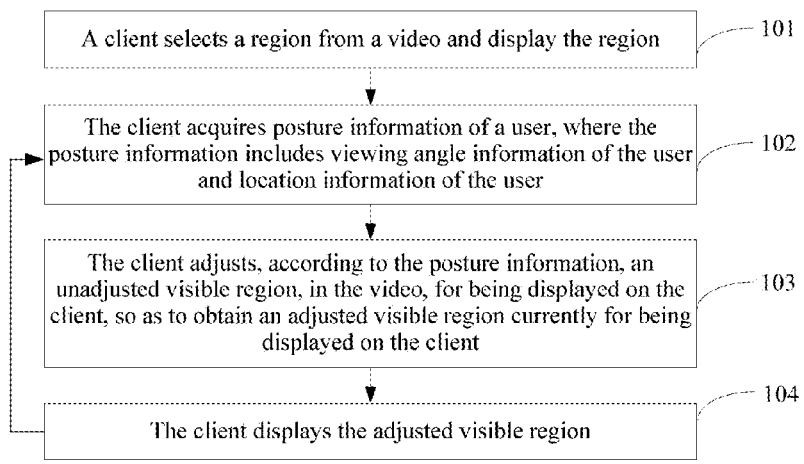
FIG. 4 is a flowchart of an interactive video display method according to an embodiment of the present disclosure.

Exemplarily, in a schematic diagram of a client of a system shown in FIG. 3, the client may periodically (for example, once per second) collect, using a red green blue (RGB) camera and a depth camera of the detection device integrated on the screen, an angle $\theta_u^x$ by which a face orientation of a user rotates around a coronal axis, an angle $\theta_u^y$ by which the face orientation of the user rotates around a vertical axis, and a vertical distance $z_u$ between the user and a plane of the client. The RGB camera generally includes three independent image sensors (charge-coupled device (CCD)), and may acquire a color signal in order to identify each feature point on the face of the user. The depth camera may measure three-dimensional coordinate information of each feature point on the face of the user in order to obtain $\theta_u^x$ and $\theta_u^y$ and $z_u$ of the user according to the three-dimensional coordinate information of each point on the face. For example, $\theta_u^x$ and $\theta_u^y$ of the user may be calculated according to three-dimensional coordinates and a relative relationship among three-dimensional coordinates of an eyebrow center, a nose tip, tops of the ears, or another feature point. The RGB camera and the depth camera herein may be two separate cameras, or may be combined into one camera, or are integrated on a display device, which is not limited herein.

Step 103: The client adjusts, according to the posture information, an unadjusted visible region, in the video, for being displayed on the client in order to obtain an adjusted visible region currently for being displayed on the client.

The unadjusted visible region, in the video, for being displayed on the client refers to the region selected from the video in step 101. An angle $\theta_u^x$ by which the face orientation of the user rotates around the coronal axis and that is corresponding to the unadjusted visible region is 0, a corresponding angle $\theta_u^y$ by which the face orientation of the user rotates around the vertical axis is 0, and a corresponding vertical distance between the user and the plane of the client is $z_{u0}$.

Figure 5C:
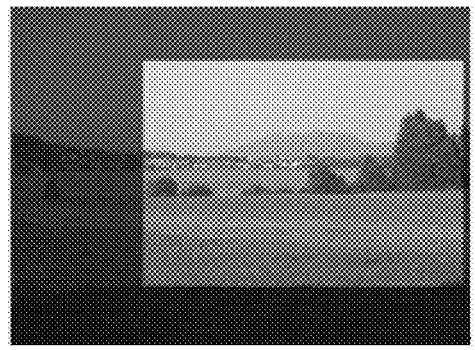
FIG. 5C is a diagram of an image of an adjusted visible region according to an embodiment of the present disclosure.

Optionally, the location information of the user may include the vertical distance between the user and the plane of the client, and the adjusting, by the client according to the posture information, an unadjusted visible region, in the video, for being displayed on the client in order to obtain an adjusted visible region currently for being displayed on the client may include acquiring, by the client, at least one of a region size change value and region displacement of the unadjusted visible region according to the viewing angle information of the user and the vertical distance, where the region size change value includes a width change value of the unadjusted visible region and a height change value of the unadjusted visible region, and the region displacement includes horizontal displacement of the unadjusted visible region and vertical displacement of the unadjusted visible region, and then adjusting the unadjusted visible region according to the at least one of the region size change value and the region displacement in order to obtain the adjusted visible region, where exemplarily, for the adjusted visible region obtained after corresponding adjustment is performed according to a change of the posture information of the user, reference may be made to FIG. 5C.

The way client adjusts, according to the posture information, the unadjusted visible region, in the video, for being displayed on the client in order to obtain the adjusted visible region currently for being displayed on the client may be described in the following two aspects according to a relationship between the vertical distance between the user and the plane of the client and a preset distance threshold $z_\epsilon$. The distance threshold herein is determined according to a factor such as a size of the screen and a maximum visual angle of the user. When the vertical distance between the user and the plane of the client is greater than the preset distance threshold, a frame of the screen and the video on the screen are fully within a field of view of the user. When the vertical distance between the user and the plane of the client is equal to the preset distance threshold, the frame of the screen and the video on the screen are exactly within the field of view of the user. When the vertical distance between the user and the plane of the client is less than the preset distance threshold, the frame of the screen and the video on the screen are not fully within the field of view of the user.

According to a first aspect, when the vertical distance between the user and the plane of the client is greater than or equal to the preset distance threshold, adjusting the unadjusted visible region according to the posture information of the user to obtain the adjusted visible region may be described in the following cases.

It should be noted that, when a change value $\Delta z_u$ of the vertical distance between the user and the plane of the client is not 0, that the vertical distance between the user and the plane of the client is greater than or equal to the preset distance threshold herein refers to that a changed vertical distance between the user and the plane of the client is greater than or equal to the preset distance threshold. When the changed vertical distance between the user and the plane of the client is less than the preset distance threshold, the adjusted visible region is obtained according to a second aspect.

(1) The change value $\Delta z_u$ of the vertical distance between the user and the plane of the client is 0, and the angle $\theta_u^x$ by which the face orientation of the user rotates around the coronal axis or the angle $\theta_u^y$ by which the face orientation of the user rotates around the vertical axis is not 0.

When the vertical distance between the user and the plane of the client is $z_u$, the change value $\Delta z_u$ of the vertical distance is 0, and the angle $\theta_u^x$ by which the face orientation of the user rotates around the coronal axis or the $\theta_u^y$ by which the face orientation of the user rotates around the vertical axis is not 0, the region size change value and the region displacement of the unadjusted visible region may be acquired according to $\theta_u^x$ and $\theta_u^y$ in the viewing angle information of the user and the vertical distance, and further the unadjusted visible region is adjusted according to the region size change value and the region displacement in order to obtain the adjusted visible region. The region size change value herein may include the width change value of the unadjusted visible region and the height change value of the unadjusted visible region, and the region displacement includes the horizontal displacement of the unadjusted visible region and the vertical displacement of the unadjusted visible region.

Formulas for acquiring the region size change value of the unadjusted visible region according to the viewing angle information of the user and the vertical distance may include:

$$\Delta w = z_u * \left( \tan\left(\frac{\theta_{fov}}{2} + \theta_u^y\right) + \tan\left(\frac{\theta_{fov}}{2} - \theta_u^y\right) \right) - \quad \text{(Formula 1)}$$

$$2 * z_u * \tan\left(\frac{\theta_{fov}}{2}\right), \text{ and}$$

$$\Delta h = \quad \text{(Formula 2)}$$
$$z_u * \left( \tan\left(\frac{\theta_{fov}}{2} + \theta_u^x\right) + \tan\left(\frac{\theta_{fov}}{2} - \theta_u^x\right) \right) - 2 * z_u * \tan\left(\frac{\theta_{fov}}{2}\right),$$

where $\Delta w$ herein represents the width change value of the unadjusted visible region, $\Delta h$ represents the height change value of the unadjusted visible region, $\theta_u^x$ represents the angle by which the face orientation of the user rotates around the coronal axis, $\theta_u^y$ represents the angle by which the face orientation of the user rotates around the vertical axis, $\theta_{fov}$ represents a maximum visual angle of human eyes, and $z_u$ represents the vertical distance.

Formulas for acquiring the region displacement of the unadjusted visible region according to the viewing angle information of the user and the vertical distance may include $$x_v = \frac{1}{2} * z_u * \left( \tan\left(\frac{\theta_{fov}}{2} + \theta_u^y\right) - \tan\left(\frac{\theta_{fov}}{2} - \theta_u^y\right) \right), \text{ and} \quad \text{(Formula 3)}$$

$$y_v = \frac{1}{2} * z_u * \left( \tan\left(\frac{\theta_{fov}}{2} + \theta_u^x\right) - \tan\left(\frac{\theta_{fov}}{2} - \theta_u^x\right) \right), \quad \text{(Formula 4)}$$

where $x_v$ herein represents the horizontal displacement of the unadjusted visible region, $y_v$ represents the vertical displacement of the unadjusted visible region, $\theta_u^x$ represents the angle by which the face orientation of the user rotates around the coronal axis, $\theta_u^y$ represents the angle by which the face orientation of the user rotates around the vertical axis, $\theta_{fov}$ represents a maximum visual angle of human eyes, and $z_u$ represents the vertical distance.

It should be noted that, because $\theta_u^x$ and $\theta_u^y$ corresponding to the unadjusted visible region are 0, and the coordinates of the center point of the unadjusted visible region are (0,0). If coordinates of a center point of the adjusted visible region obtained after the unadjusted visible region is adjusted are $(x_v, y_v)$, region displacement occurs for the adjusted visible region relative to the unadjusted visible region, where $x_v$ is the horizontal displacement of the unadjusted visible region, and $y_v$ is the vertical displacement of the unadjusted visible region. If $\theta_u^x$ or $\theta_u^y$ of the user is not 0, $\Delta w$ and $\Delta h$ that are obtained by means of calculation according to the formula 1 and the formula 2 are not 0, and $x_v$ and $y_v$ that are obtained by means of calculation according to the formula 3 and the formula 4 are not 0 either. Therefore, $\Delta w$ may be added to the width value of the unadjusted visible region may be increased by, $\Delta h$ may be added to the height value of the unadjusted visible region is increased by, the unadjusted visible region may be horizontally displaced by $x_v$, and the unadjusted visible region may be vertically displaced by $y_v$, in order to obtain the adjusted visible region corresponding to $\theta_u^x$ and $\theta_u^y$ of the user and $z_u$, where $\Delta w$, $\Delta h$, $x_v$, and $y_v$ may be positive values or negative values, and may be further determined by means of calculation according to the formulas, which are not limited herein.

(2) The change value $\Delta z_u$ of the vertical distance between the user and the plane of the client is not 0, and the $\theta_u^x$ by which the face orientation of the user rotates around the coronal axis and the $\theta_u^y$ by which the face orientation of the user rotates around the vertical axis are both 0.

It should be noted that, in the first aspect, that the change value $\Delta z_u$ of the vertical distance between the user and the plane of the client is not 0 refers to that the vertical distance $z_u$, between the user and the plane of the client, acquired by the client is changed relative to $z_{u0}$ by $\Delta z_u$, and $z_u$ is greater than or equal to the preset distance threshold.

When the change value $\Delta z_u$ of the vertical distance between the user and the plane of the client is not 0, and the $\theta_u^x$ by which the face orientation of the user rotates around the coronal axis and the $\theta_u^y$ by which the face orientation of the user rotates around the vertical axis are both 0, $\Delta w$ and $\Delta h$ that are obtained by means of calculation according to the formula 1 and the formula 2 are 0, and $x_v$ and $y_v$ that are obtained by means of calculation according to the formula 3 and the formula 4 are also 0. That is, a change of the vertical distance between the user and the plane of the client does not affect the region size change value of the unadjusted visible region. In this case, the region size change value of the unadjusted visible region may be acquired according to the change value of the vertical distance, and further the unadjusted visible region is adjusted according to the region size change value in order to obtain the adjusted visible region.

A formula for acquiring the region size change value of the unadjusted visible region according to the change value of the vertical distance may include:

$$\Delta w = \Delta h = \Delta z_u * \tan\left(\frac{\theta_{fov}}{2}\right) * 2, \quad \text{(Formula 5)}$$

where $\Delta w$ herein represents the width change value of the unadjusted visible region, $\Delta h$ represents the height change value of the unadjusted visible region, $\theta_{fov}$ represents a maximum visual angle of human eyes, and $\Delta z_u$ represents the change value of the vertical distance.

It can be learned from the formula 5 that, when $\Delta z_u$ is not 0, $\Delta w$ and $\Delta h$ that are obtained by means of calculation are not 0. The client may adjust the unadjusted visible region according to $\Delta w$ and $\Delta h$ in order to obtain the adjusted visible region.

In addition, $\theta_{fov}$ in the formula 1 to the formula 5 may also be any angle preset as required, which is not limited herein.

(3) The change value $\Delta z_u$ of the vertical distance between the user and the plane of the client is not 0, and the $\theta_u^x$ by which the face orientation of the user rotates around the coronal axis or the $\theta_u^y$ by which the face orientation of the user rotates around the vertical axis is not 0.

Similar to the case (2), that the change value $\Delta z_u$ of the vertical distance between the user and the plane of the client is not 0 herein refers to that the vertical distance $z_u$, between the user and the plane of the client, acquired by the client is changed relative to $z_{u0}$ by $\Delta z_u$, and $z_u$ is greater than or equal to the preset distance threshold.

When the change value $\Delta z_u$ of the vertical distance between the user and the plane of the client is not 0, and the $\theta_u^x$ by which the face orientation of the user rotates around the coronal axis or the $\theta_u^y$ by which the face orientation of the user rotates around the vertical axis is not 0, the region size change value $\Delta w_1$ and $\Delta h_1$ of the unadjusted visible region may be calculated according to $\Delta z_u$ and the formula 5. The region size change value $\Delta w_2$ and $\Delta h_2$ of the unadjusted visible region and the region displacement $x_v$ and $y_v$ of the unadjusted visible region are calculated according to the changed vertical distance between the user and the plane of the client and the formula 1 to the formula 4. Therefore, the unadjusted visible region is adjusted according to the region size change value and the region displacement in order to obtain the adjusted visible region.

According to the second aspect, when the vertical distance between the user and the plane of the client is less than the preset distance threshold, adjusting the unadjusted visible region according to the posture information of the user to obtain the adjusted visible region may be described in the following cases.

(a) The change value $\Delta z_u$ of the vertical distance between the user and the plane of the client is 0, and the $\theta_u^x$ by which the face orientation of the user rotates around the coronal axis or the $\theta_u^y$ by which the face orientation of the user rotates around the vertical axis is not 0.

When the vertical distance between the user and the plane of the client is less than the preset distance threshold, the posture information of the user basically does not affect the region size change value of the unadjusted visible region. When the vertical distance between the user and the plane of the client is $z_u$, the change value $\Delta z_u$ of the vertical distance is 0, and the angle $\theta_u^x$ by which the face orientation of the user rotates around the coronal axis or the angle $\theta_u^y$ by which the face orientation of the user rotates around the vertical axis is not 0, the horizontal displacement $x_v$ and the vertical displacement $y_v$ in the region displacement of the unadjusted visible region may be respectively acquired according to the formula 3 and the formula 4, and the unadjusted visible region is adjusted according to the region displacement in order to obtain the adjusted visible region.

(b) The change value $\Delta z_u$ of the vertical distance between the user and the plane of the client is not 0, and the $\theta_u^x$ by which the face orientation of the user rotates around the coronal axis and the $\theta_u^y$ by which the face orientation of the user rotates around the vertical axis are both 0.

It should be noted that, in the second aspect, that the change value $\Delta z_u$ of the vertical distance between the user and the plane of the client is not 0 refers to that the vertical distance $z_u$, between the user and the plane of the client, acquired by the client is changed relative to $z_{u0}$ by $\Delta z_u$, and $z_u$ is less than the preset distance threshold.

When the vertical distance between the user and the plane of the client is less than the preset distance threshold, the posture information of the user basically does not affect the region size change value of the unadjusted visible region. When the $\theta_u^x$ by which the face orientation of the user rotates around the coronal axis and the $\theta_u^y$ by which the face orientation of the user rotates around the vertical axis are both 0, $x_v$ and $y_v$ that are obtained by means of calculation according to the formula 3 and the formula 4 are 0, that is, the region displacement of the unadjusted visible region is 0. In this case, the unadjusted visible region does not need to be adjusted, and the adjusted visible region is the same as the unadjusted visible region.

(c) The change value $\Delta z_u$ of the vertical distance between the user and the plane of the client is not 0, and the $\theta_u^x$ by which the face orientation of the user rotates around the coronal axis or the $\theta_u^y$ by which the face orientation of the user rotates around the vertical axis is not 0.

Similar to the case (b), that the change value $\Delta z_u$ of the vertical distance between the user and the plane of the client is not 0 refers to that the vertical distance $z_u$, between the user and the plane of the client, acquired by the client is changed relative to $z_{u0}$ by $\Delta z_u$, and $z_u$ is less than the preset distance threshold.

When the vertical distance between the user and the plane of the client is less than the preset distance threshold, the posture information of the user basically does not affect the region size change value of the unadjusted visible region. In this case, similar to the case (a), the horizontal displacement $x_v$ and the vertical displacement $y_v$ in the region displacement of the unadjusted visible region may be respectively acquired according to the formula 3 and the formula 4, and the unadjusted visible region is adjusted according to the region displacement in order to obtain the adjusted visible region.

Figure 6:
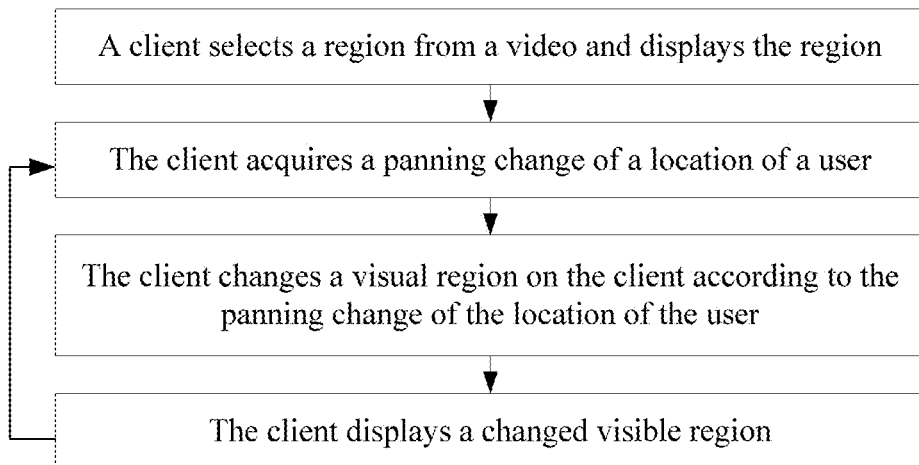
FIG. 6 is a flowchart of changing of a visible region.

It can be learned that, compared with that a visible region is simply changed only according to a panning change of a location of a user (referring to a flowchart, shown in FIG. 6, of changing of a visible region), according to the interactive video display method provided in this embodiment of the present disclosure, at least one of a region size change value and region displacement of an unadjusted visible region may be acquired further according to viewing angle information of a user such as an angle by which a face orientation of the user rotates around a coronal axis and an angle by which the face orientation of the user rotates around a vertical axis, or location information of the user such as a change value of a vertical distance between the user and a plane of a client, and further the unadjusted visible region is adjusted according to the at least one of the region size change value and the region displacement, to obtain an adjusted visible region such that real experience obtained when the user performs interactive browsing can be improved.

Step 104: The client displays the adjusted visible region, and then returns to step 102.

The client displays the obtained adjusted visible region on the screen of the client, and then returns to step 102 in order to continue to obtain a next visible region by adjusting an unadjusted visible region according to acquired posture information.

It should be noted that, when the region size change value of the unadjusted visible region is not 0, that is, a region size of the adjusted visible region and a region size of the unadjusted visible region are different, the client may zoom in or out an image that is presented in the adjusted visible region to be an image of a same size as the screen in order to facilitate display using the screen of the client.

According to the interactive video display method provided in this embodiment of the present disclosure, a client acquires posture information of a user in real time, and adjusts, according to viewing angle information of the user and location information of the user that are in the posture information of the user, an unadjusted visible region, in a video, for being displayed on the client in order to obtain an adjusted visible region currently for being displayed on the client such that a visible region for being displayed on the client can be accordingly changed according to real-time changes of the viewing angle information and the location information of the user. Therefore, a problem in the prior art that browsing experience of a user is not real because a visible region is simply changed only according to a panning change of a location of the user can be resolved.

Figure 7:
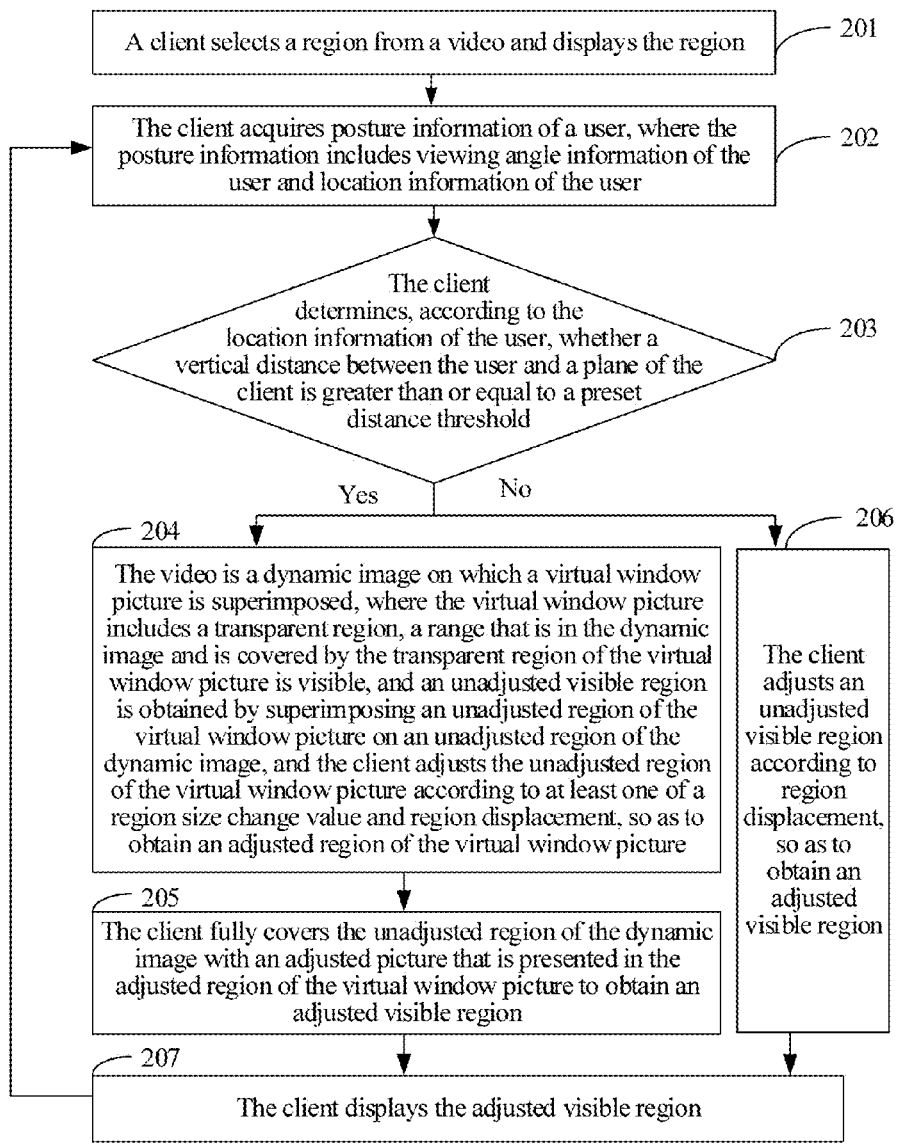
FIG. 7 is a flowchart of an interactive video display method according to another embodiment of the present disclosure.

Referring to FIG. 7, an embodiment of the present disclosure provides an interactive video display method, and the method may mainly include the following steps.

Step 201: A client selects a region from a video and displays the region.

Figure 8A:
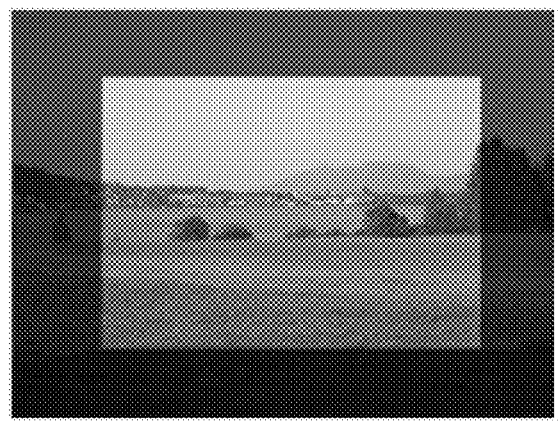
FIG. 8A is a diagram of an image of a video region according to another embodiment of the present disclosure.

Exemplarily, the region selected from the video may be shown in FIG. 8A.

Step 202: The client acquires posture information of a user, where the posture information includes viewing angle information of the user and location information of the user.

For specific implementation manners of step 201 and step 202, reference may be made to step 101 and step 102.

Step 203: The client determines, according to the location information of the user, whether a vertical distance between the user and a plane of the client is greater than or equal to a preset distance threshold, and then goes to step 204 or step 206.

The distance threshold $z_\epsilon$ is determined according to a factor such as a size of a screen of the client and a maximum visual angle of the user.

Step 204: If the client determines that the vertical distance between the user and the plane of the client is greater than or equal to the preset distance threshold in step 203, where the video is a dynamic image on which a virtual window picture is superimposed, the virtual window picture includes a transparent region, a range that is in the dynamic image and that is covered by the transparent region of the virtual window picture is visible, and an unadjusted visible region is obtained by superimposing an unadjusted region of the virtual window picture on an unadjusted region of the dynamic image, the client adjusts the unadjusted region of the virtual window picture according to at least one of a region size change value and region displacement in order to obtain an adjusted region of the virtual window picture, and then goes to step 205.

Figure 8B:
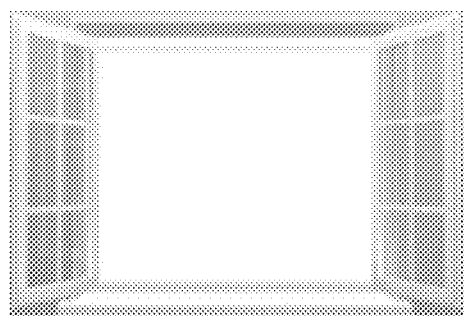
FIG. 8B is a schematic diagram of a virtual window picture according to an embodiment of the present disclosure.
Figure 8C:
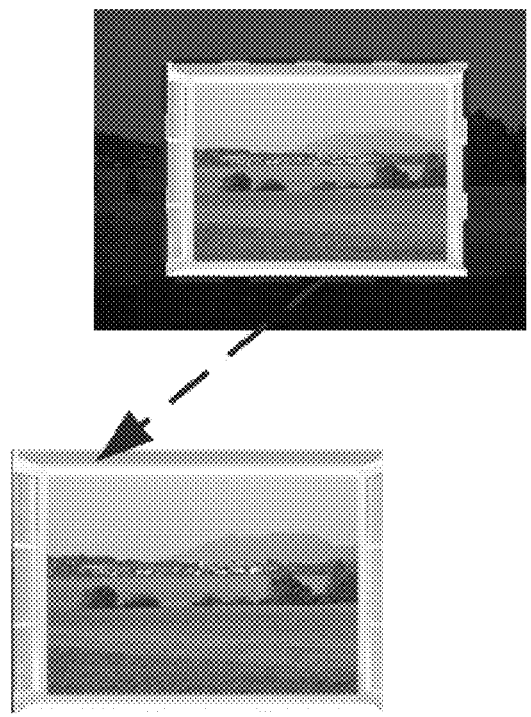
FIG. 8C is a diagram of an image of an unadjusted visible region according to another embodiment of the present disclosure.

When the vertical distance between the user and the plane of the client is greater than or equal to the preset distance threshold, the video displayed on the screen of the client is the dynamic image on which the virtual window picture is superimposed, that is, the virtual window picture is a part of the video, and the unadjusted visible region is obtained by superimposing the unadjusted region of the virtual window picture on the unadjusted region of the dynamic image. The virtual window picture may include the transparent region and a non-transparent region. For example, the virtual window picture may be a picture of which the middle is a rectangular transparent region, and as shown in FIG. 8B, the non-transparent region of the virtual window picture may display a frame of a window by means of simulation, or the non-transparent region of the virtual window picture may display some indoor objects near the window by means of simulation, or the non-transparent region of the virtual window picture may be all black. This embodiment of the present disclosure imposes no limitation on a factor such as a specific size, shape, color, and image of the virtual window picture. Referring to FIG. 8C, a range that is in the dynamic image and that is covered by the transparent region of the virtual window picture is visible, and a range that is in the dynamic image and that is covered by the non-transparent region of the virtual window picture is invisible.

The client may acquire the at least one of the region size change value and the region displacement of the unadjusted region of the virtual window picture according to the posture information of the user, for example, parameters such as an angle by which a face orientation of the user rotates around a coronal axis, an angle by which the face orientation of the user rotates around a vertical axis, and a change value of the vertical distance between the user and the plane of the client, and adjust the unadjusted region of the virtual window picture according to the at least one of the region size change value and the region displacement in order to obtain the adjusted region of the virtual window picture. For a specific implementation manner of adjusting, by the client, the unadjusted region of the virtual window picture according to the at least one of the region size change value and the region displacement in order to obtain the adjusted region of the virtual window picture, reference may be made to the first aspect in step 103 in the foregoing embodiment, and details are not described herein again.

Step 205: The client fully covers the unadjusted region of the dynamic image with an adjusted picture that is presented in the adjusted region of the virtual window picture to obtain an adjusted visible region, and then goes to step 207.

Figure 8D:
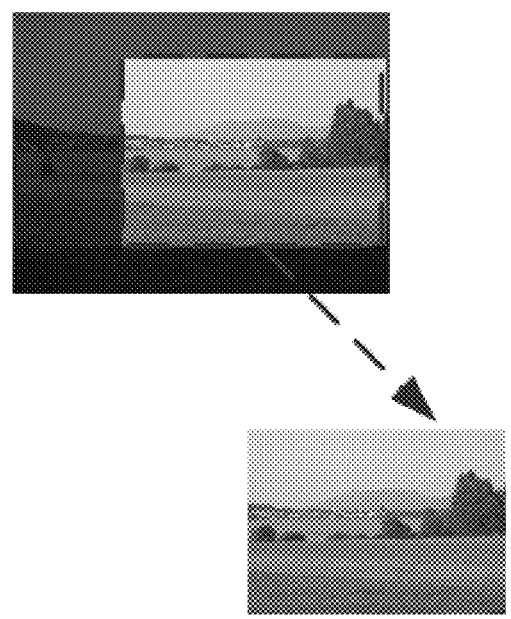
FIG. 8D is a diagram of an image of an adjusted visible region according to another embodiment of the present disclosure.

In a process of obtaining the adjusted region of the virtual window picture, if the region size change value of the unadjusted region of the virtual window picture is not 0, that is, when a region size of the adjusted region and a region size of the unadjusted region are different, the client may zoom in or out the picture that is presented in the adjusted region of the virtual window picture to be a picture of a same size as the screen and then fully cover the unadjusted region of the dynamic image with the picture to obtain the adjusted visible region (referring to FIG. 8D). It can be learned that, in a process of obtaining the adjusted visible region in this embodiment of the present disclosure, a region of the virtual window picture is adjusted, and a region of the dynamic image is not adjusted. Therefore, a region, of the dynamic image, in the adjusted visible region is still an unadjusted region, of the dynamic image, in the unadjusted visible region.

The interactive video display method provided in this embodiment of the present disclosure may be used to display an outdoor scene in which a depth of field is infinite in order to simulate a scenario in which a user indoors views the outdoor scene through a window in a real situation. In the real situation, when a vertical distance between the user and a plane of the window is greater than or equal to a distance threshold, a distance between the user and the window is relatively large, the window is fully within a field of view of the user, and an indoor frame of the window and some indoor objects near the window may also be within the field of view of the user. When the user changes a viewing angle, an image of the scene within the field of view of the user is accordingly changed. When the user approaches the window, sizes of the frame of the window and the indoor objects that are within the field of view of the user gradually increase, a range of the image of the outdoor scene viewed by the user through the window gradually increases, a size of an object in the outdoor scene is basically unchanged, and it is perceived that the image of the scene is unchanged basically.

Figure 9A:
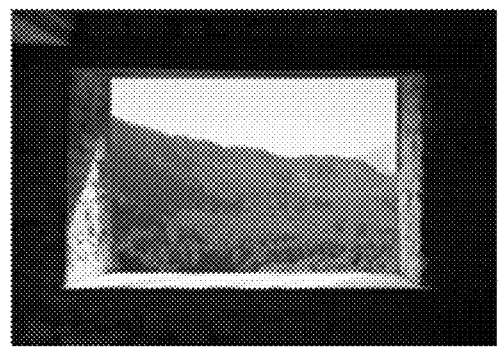
FIG. 9A and FIG. 9B show images, of an outdoor scene on a display screen of a WINSCAPE system, seen when a user moves from far to near and toward the display screen.
Figure 9B:
Figure 9C:
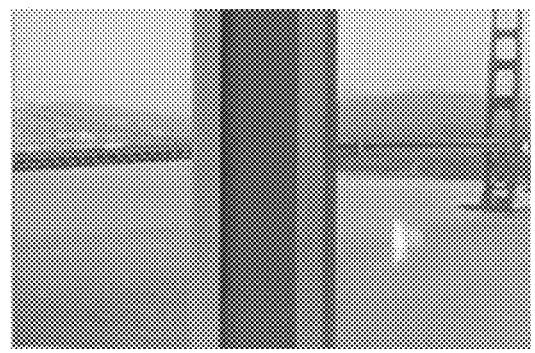
FIG. 9C and FIG. 9D show images of a scene outside a window that are seen when a user moves from far to near and toward the window in an actual scenario.
Figure 9D:

In the prior art, experience obtained when a user views a scene outside a window through a real window may be simulated using a WINSCAPE system. When a vertical distance between the user and a plane of the window is greater than or equal to a distance threshold, a distance between the user and the window is relatively large, and the window is fully within a field of view of the user. When the user approaches the window, a range of an image, of the scene outside the window, displayed on a screen increases, and a size of an object in the image is reduced, as shown in FIG. 9A and FIG. 9B. In a real situation, when the user approaches the window, the range of the image of the scene outside the window should increase, and a size of the object in the image is basically unchanged, as shown in FIG. 9C and FIG. 9D. Therefore, according to the method, simple zooming in or out is performed only according to a change of a location of the user such that a change, perceived by the eyes of the user, of an image is inconsistent with that in the real situation.

According to the interactive video display method provided in this embodiment of the present disclosure, when the vertical distance between the user and the plane of the window is greater than or equal to the distance threshold, a situation in which the scene outside the window is viewed through the window in the real situation is simulated by displaying, on the screen of the client, the dynamic image on which the virtual window picture is superimposed. A border of the transparent region of the virtual window picture may be used to simulate a window in the real situation, and the dynamic image covered by the transparent region of the virtual window picture may be used to simulate the scene outside the window that is viewed through the window.

When the user approaches the window, according to the first aspect in step 103, a width change value Δw and a height change value Δh, in the region size change value of the unadjusted region of the virtual window picture, obtained by means of calculation according to the formula 5 are both negative values, that is, the adjusted region of the virtual window picture becomes smaller compared with the unadjusted region of the virtual window picture. Afterwards, the picture that is presented in the adjusted region of the virtual window picture is zoomed in to be a picture of a same size as the screen of the client and then fully covers the unadjusted region of the dynamic image with the picture to obtain the adjusted visible region. In this case, because the adjusted region of the virtual window picture is zoomed out compared with the unadjusted region, and the picture that is presented in the adjusted region of the virtual window picture is zoomed in, the transparent region and the non-transparent region of the virtual window picture accordingly increase, and the frame of the window or the indoor objects that is or are displayed by means of simulation in the non-transparent region accordingly increase. In addition, because the region of the dynamic image is unchanged, the visible range that is in the dynamic image and that is covered by the transparent region of the virtual window picture accordingly increases, that is, the size of the object in the scene outside the window is unchanged and the range of the scene outside the window increases, as shown in FIG. 9C and FIG. 9D. In this case, this is consistent with the situation when the user approaches the window to view the scene outside the window in the real situation. Therefore, in this embodiment of the present disclosure, a problem in the prior art that when the user approaches the window, browsing experience of the user is not real because the range of the image, of the scene outside the window, displayed on the screen increases and a size of the object in the image is reduced can be resolved.

Figure 10:
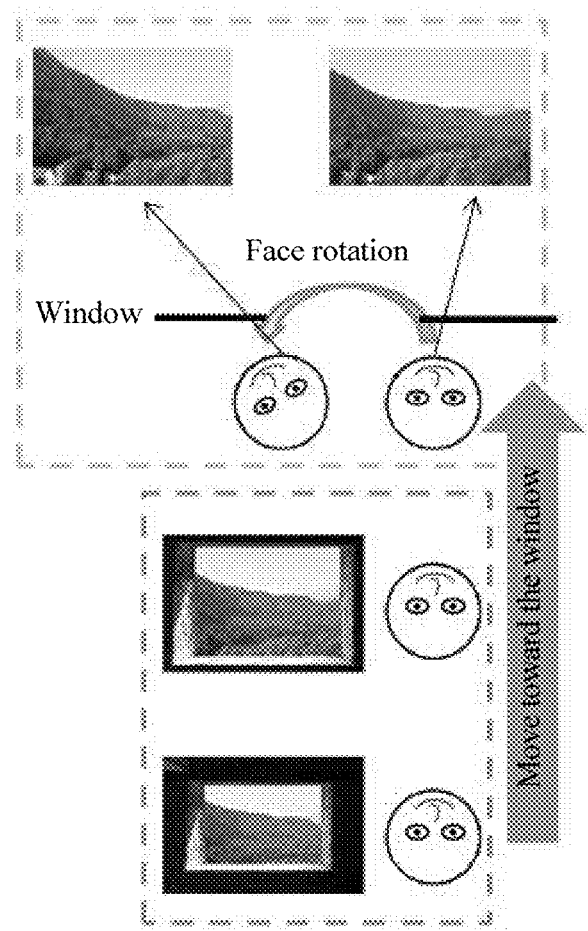
FIG. 10 is a schematic diagram of an effect of varying of a visible region with posture information in an actual scenario according to an embodiment of the present disclosure.

In addition, exemplarily, referring to FIG. 10, when the face orientation of the user rotates leftward around the vertical axis, it can be learned from a calculation result that, $x_v$ in the region displacement of the unadjusted region of the virtual window picture is a negative value, which allows the unadjusted region of the virtual window picture is displaced leftward to obtain the adjusted region of the virtual window picture. Therefore, the range that is in the dynamic image and that is covered by the transparent region of the virtual window picture is also displaced leftward, which is also consistent with the real situation. In the prior art, however, when a face orientation of the user rotates leftward around a vertical axis, an image of a video is not displaced. As a result, browsing experience of the user is not real.

Step 206: If the client determines that the vertical distance between the user and the plane of the client is less than the preset distance threshold in step 203, the client adjusts an unadjusted visible region according to region displacement in order to obtain an adjusted visible region, and then goes to step 207.

When the vertical distance between the user and the plane of the client is less than the preset distance threshold, a change of the viewing angle information of the user and a change of the vertical distance between the user and the plane of the client basically do not affect the region size change value of the unadjusted visible region, and the change of the vertical distance between the user and the plane of the client does not affect the region displacement of the unadjusted visible region either. Therefore, the client may acquire the region displacement of the unadjusted visible region according to the viewing angle information of the user, and further adjusts the unadjusted visible region according to the region displacement in order to obtain the adjusted visible region. For a specific implementation manner of adjusting the unadjusted visible region according to the region displacement to obtain the adjusted visible region, reference may be made to the second aspect in step 103 in the foregoing embodiment, and details are not described herein again.

Therefore, when the vertical distance between the user and the plane of the client is less than the preset distance threshold, the client may adjust the unadjusted visible region according to the viewing angle information of the user to obtain the adjusted visible region, which is consistent with the real situation in which the image of the scene within the field of view of the user is accordingly changed when the user changes the viewing angle, and a problem in the prior art that browsing experience of a user is not real because an image of a video does not vary with a viewing angle of the user can be resolved.

Step 207: The client displays the adjusted visible region, and then returns to step 202.

After obtaining the adjusted visible region, the client may display the adjusted visible region on the screen, and then returns to step 202 in order to continue to adjust the unadjusted visible region according to the acquired posture information to obtain a next visible region.

According to the interactive video display method provided in this embodiment of the present disclosure, when a vertical distance between a user and a plane of a client is greater than or equal to a preset distance threshold, the client may adjust an unadjusted region of a virtual window picture according to posture information of the user to obtain an adjusted region of the virtual window picture, and superimpose the adjusted region of the virtual window picture on an unadjusted region of a dynamic image in order to obtain an adjusted visible region, or when a vertical distance between a user and a plane of a client is less than a preset distance threshold, the client may obtain region displacement of an unadjusted visible region according to posture information of the user, and further adjust the unadjusted visible region according to the region displacement so as to obtain an adjusted visible region. In this case, a visible region displayed on the client can be accordingly changed according to the posture information of the user. Therefore, a problem in the prior art that browsing experience of a user is not real because a visible region is simply changed only according to a panning change of a location of the user can be resolved.

Figure 11:
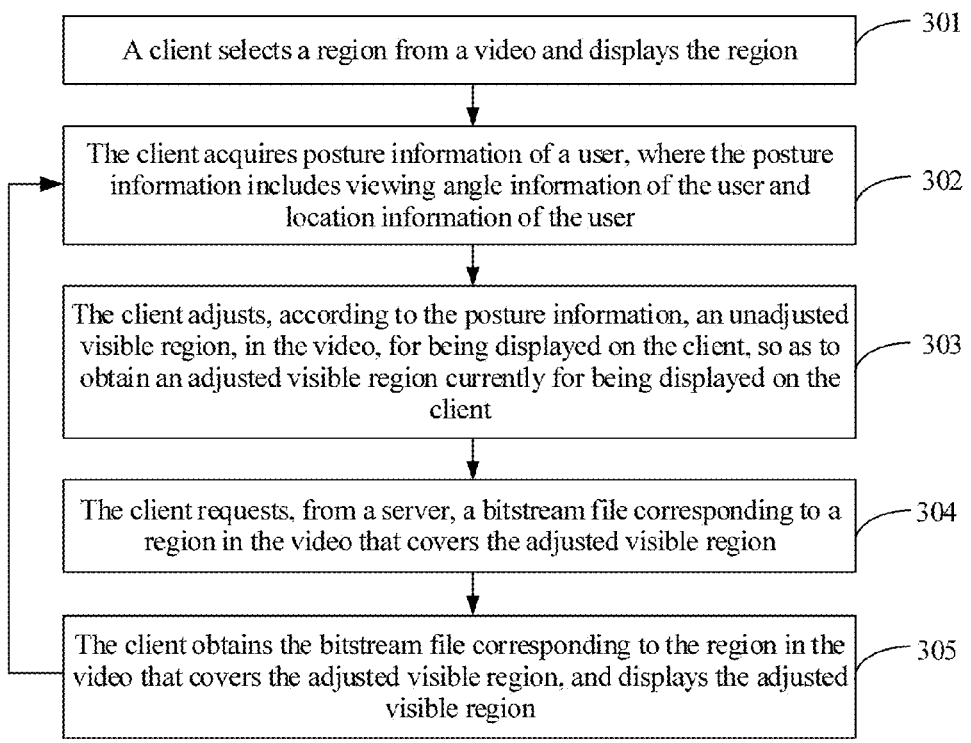
FIG. 11 is a flowchart of an interactive video display method according to another embodiment of the present disclosure.

Referring to FIG. 11, an embodiment of the present disclosure provides an interactive video display method, and the method may mainly include the following steps.

Step 301: A client selects a region from a video and displays the region.

In this embodiment of the present disclosure, there may be one client, or there may be multiple clients. In this step, any one of the clients may select a region from an entire video image obtained by means of shooting by a camera device, such as a wide-angle lens or a lens array, as an unadjusted visible region and displays the region on a screen of the client. For a process of selecting the region by any one of the clients, reference may be made to step 101. A range of a viewing angle at which the wide-angle lens or the lens array may perform capturing is relatively wide, for example, 130° and 170°. The range is greater than a maximum visible range of a user, that is, a range of a viewing angle of the user is within a range of an image of the video captured by the wide-angle lens or the lens array.

Step 302: The client acquires posture information of a user, where the posture information includes viewing angle information of the user and location information of the user.

Step 303: The client adjusts, according to the posture information, an unadjusted visible region, in the video, for being displayed on the client in order to obtain an adjusted visible region currently for being displayed on the client.

For a specific implementation manner of step 301 to step 303, reference may be made to step 101 to step 103 in the foregoing embodiment.

Step 304: The client requests, from a server, a bitstream file corresponding to a region in the video that covers the adjusted visible region.

It should be noted that, the region in the video that covers the adjusted visible region herein refers to a region, in the video, whose range is greater than the adjusted visible region.

Optionally, the region in the video that covers the adjusted visible region may be a to-be-downloaded sub-region in n sub-regions that has a region overlapped with the adjusted visible region. There is one or more to-be-downloaded sub-regions in the n sub-regions obtained by dividing the video, where n is a positive integer greater than 1, and adjacent sub-regions in the n sub-regions have an overlapped region and the adjacent sub-regions have non-overlapped regions.

Optionally, the region in the video that covers the adjusted visible region may be the adjusted visible region.

Because the region in the video that covers the adjusted visible region may be smaller than an entire video region, the client may request, from the server, the bitstream file corresponding to the region whose size is less than that of the entire video region, instead of requesting a bitstream file corresponding to the entire video region like that in the prior art such that a requirement for a bandwidth may be lowered. Therefore, the method may be applied to a scenario in which the bandwidth of the client is limited. When the bandwidth of the client is insufficient, for example, when the bandwidth of the client is less than a bandwidth threshold, according to the method provided in this embodiment of the present disclosure, the bitstream file corresponding to the region in the video that covers the adjusted visible region can still be downloaded, thereby avoiding a problem in the prior art that video playback on a client is not smooth because a bitstream file corresponding to an entire video region cannot be downloaded due to a limited bandwidth. The bandwidth threshold herein may be dynamically set according to an actual situation.

In addition, in this embodiment of the present disclosure, one or more clients may communicate with a same server. For example, when a same scene video is browsed online on multiple clients at the same time, each client may adjust, according to posture information, of a user, corresponding to the client, an unadjusted visible region, in the video, for being displayed on the client in order to obtain an adjusted visible region currently for being displayed on the client. Therefore, this embodiment of the present disclosure may be applicable to a multi-client scenario, and a problem in the prior art that a single-client interactive video display system cannot be expanded to a multi-client interactive video display system can be resolved.

Step 305: The client obtains the bitstream file corresponding to the region in the video that covers the adjusted visible region, displays the adjusted visible region, and then returns to step 302.

According to the interactive video display method provided in this embodiment of the present disclosure, a client adjusts, according to posture information, an unadjusted visible region, in a video, for being displayed on the client in order to obtain an adjusted visible region currently for being displayed on the client such that a problem in the prior art that browsing experience of a user is not real because a visible region is simply changed only according to a panning change of a location of the user can be resolved. After obtaining the adjusted visible region, the client requests, from a server, a bitstream file corresponding to a region in the video that covers the adjusted visible region, instead of requesting, from the server, a bitstream file corresponding to an entire video region like that in the prior art. Therefore, a requirement for a bandwidth of the client may be lowered, thereby avoiding a problem in the prior art that video playback on a client is not smooth because a bitstream file corresponding to an entire video region cannot be downloaded due to a limited bandwidth of the client.

Figure 12:
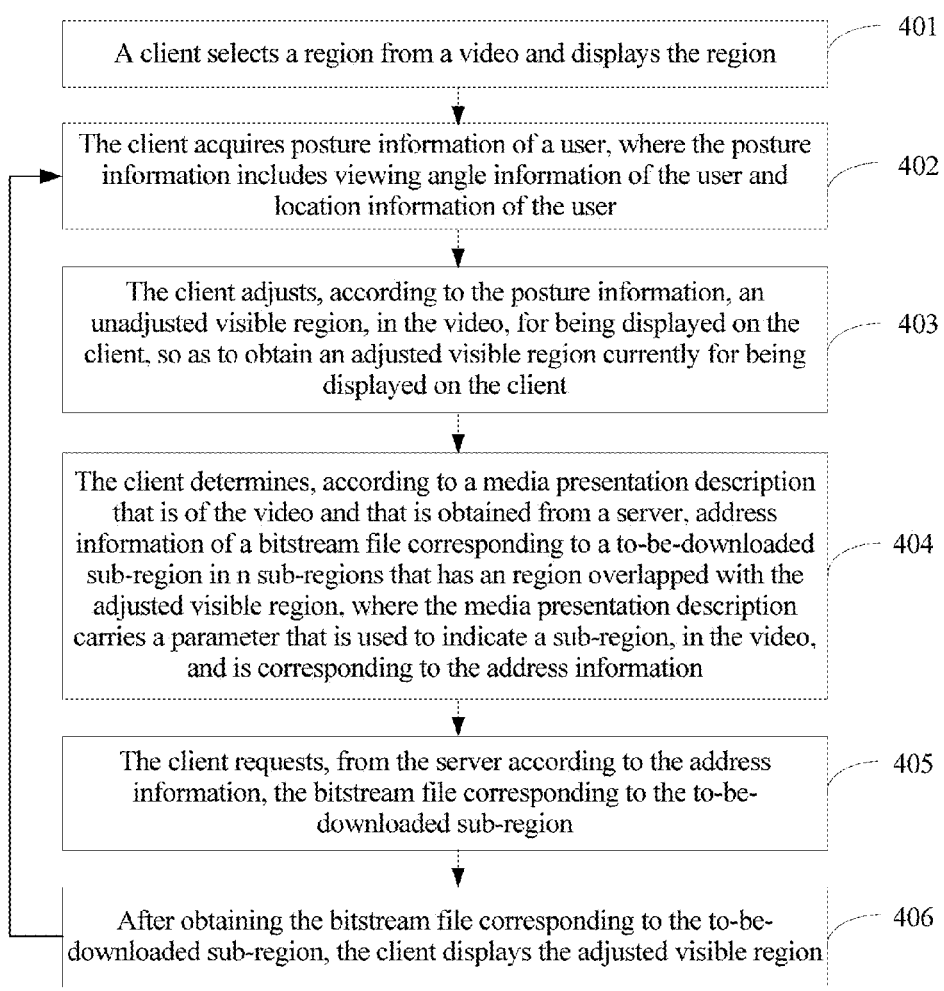
FIG. 12 is a flowchart of an interactive video display method according to another embodiment of the present disclosure.

Referring to FIG. 12, an embodiment of the present disclosure provides an interactive video display method, and the method may mainly include the following steps.

Step 401: A client selects a region from a video and displays the region.

Step 402: The client acquires posture information of a user, where the posture information includes viewing angle information of the user and location information of the user.

Step 403: The client adjusts, according to the posture information, an unadjusted visible region, in the video, for being displayed on the client in order to obtain an adjusted visible region currently for being displayed on the client.

For a specific implementation manner of step 401 to step 403, reference may be made to step 101 to step 103 in the foregoing embodiment.

Step 404: The client determines, according to a media presentation description that is of the video and that is obtained from a server, address information of a bitstream file corresponding to a to-be-downloaded sub-region in n sub-regions that has a region overlapped with the adjusted visible region, where the media presentation description carries a parameter that is used to indicate a sub-region, in the video, corresponding to the address information.

The to-be-downloaded sub-region herein in the n sub-regions that has a region overlapped with the adjusted visible region can cover the adjusted visible region. There may be one or more to-be-downloaded sub-regions in the n sub-regions, which is not limited herein.

Optionally, the video may be divided into the n sub-regions, where n is a positive integer greater than 1, and adjacent sub-regions in the n sub-regions have an overlapped region and the adjacent sub-regions have non-overlapped regions. The media presentation description includes a media presentation description having a viewing angle VMPD, where the VMPD may include address information of the n sub-regions in each time segment obtained by performing compression coding at different bit rates.

Figure 13:
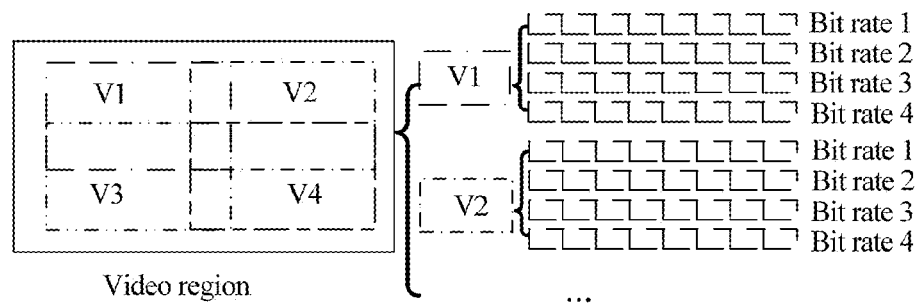
FIG. 13 is a schematic diagram of performing grouping and compression coding according to a dynamic adaptive streaming coding technology according to an embodiment of the present disclosure.

Exemplarily, for a schematic diagram of performing grouping and compression coding on the address information of the n sub-regions in each time segment at different bit rates according to a dynamic adaptive streaming coding technology based on the hypertext transfer protocol (HTTP) (DASH), reference may be made to FIG. 13. For the address information of the n sub-regions in each time segment, in the VMPD, obtained by performing compression coding at different bit rates, reference may be made to Table 1.

TABLE 1 media presentation description
Element or Attribute Name

MPD (media presentation description)
    Base uniform resource locator (URL)
    ProgramInformation
        moreInformationURL
        Period
        baseURL
        sourceUrlTemplatePeriod
        Representation$_j$ (i=0 to m−1)
        VisibleVideoRegion$_j$ (j=0 to n−1) (sub-region$_j$ (j=0 to n−1))
            Segment$_0$
            segmentQuality (Q$_0$) segment quality level (bit rate)
            VisibleVideoRegion(T$_0$) (address information at a T$_0$ moment)
            ...
            VisibleVideoRegion(T$_m$) (address information at a T$_m$ moment)
            segmentQuality (Q$_n$) segment quality level (bit rate)
            ...
            Segment$_n$ In the VMPD, a quality level is generally measured using a media bit rate, and a higher quality level indicates a larger bit rate. A representation includes n sub-regions, each sub-region includes multiple segments, and the segment may last for a particular time period. Compression coding is performed at different bit rates in each time period (such as 2 seconds (s)) of the segment. A bitstream file corresponding to each sub-region in each time segment obtained by performing compression coding at different bit rates is corresponding to one piece of address information, and storage space represented by the address information is used to store the corresponding bitstream file. In the VMPD, specific address information of a bitstream file may not be stored, and a correspondence between a moment and the address information at a current corresponding bit rate may be stored such that a storage address of the bitstream file corresponding to the to-be-downloaded sub-region may be obtained according to a current specific moment and the correspondence. The parameter carried in the media presentation description may include VisibleVideoRegion$_j$ (j=0 to n−1), VisibleVideoRegion(T$_0$), VisibleVideoRegion(T$_m$), and the like in the VMPD shown in Table 1, where the parameter is used to indicate the sub-region, in the video, corresponding to the address information.

Furthermore, the client may determine, according to information about a current network bandwidth, a bit rate applicable to the current network bandwidth for compression coding. For example, when a network bandwidth of the client is sufficient, a relatively high bit rate may be selected. When the network bandwidth of the client is limited, a relatively low bit rate may be selected. Then, the to-be-downloaded sub-region in the n sub-regions that has a region overlapped with the adjusted visible region may be determined according to the adjusted visible region, and further, address information, of the bitstream file, corresponding to a corresponding bit rate at a current moment of the to-be-downloaded sub-region in the n sub-regions that has a region overlapped with the adjusted visible region is determined according to the media presentation description that is of the video and that is obtained from the server and the carried parameter that is used to indicate the sub-region, in the video, corresponding to the address information.

The bit rate applicable to the current network bandwidth for compression coding is selected in order to avoid the following problems. When coding is performed using a same bit rate, if the used bit rate is relatively low, quality of a video is relatively low, and when the network bandwidth of the client is sufficient, only a video bitstream file corresponding to the relatively low bit rate can be downloaded, thereby affecting quality of the video on the client and affecting an effect of user experience. If the used bit rate is relatively high, quality of a video is relatively high and there is a relatively high requirement for the bandwidth, and when the network bandwidth of the client is limited, the client cannot download a bitstream file corresponding to the relatively high bit rate, causing that video playback is not smooth.

Step 405: The client requests, from the server according to the address information, the bitstream file corresponding to the to-be-downloaded sub-region.

In this step, because the to-be-downloaded sub-region in the n sub-regions that has a region overlapped with the adjusted visible region can cover the adjusted visible region, the client may request, from the server, the bitstream file corresponding to the to-be-downloaded sub-region whose region size is less than that of an entire video region, instead of requesting a bitstream file corresponding to the entire video region like that in the prior art such that a requirement for the bandwidth may be lowered. Therefore, the method may be applied to a scenario in which the bandwidth of the client is limited. When the bandwidth of the client is insufficient, for example, when the bandwidth of the client is less than a bandwidth threshold, according to the method provided in this embodiment of the present disclosure, a bitstream file corresponding to a region in the video that covers the adjusted visible region can still be downloaded, thereby avoiding a problem in the prior art that video playback on a client is not smooth because a bitstream file corresponding to an entire video region cannot be downloaded due to a limited bandwidth. The bandwidth threshold herein may be dynamically set according to an actual situation.

Figure 14:
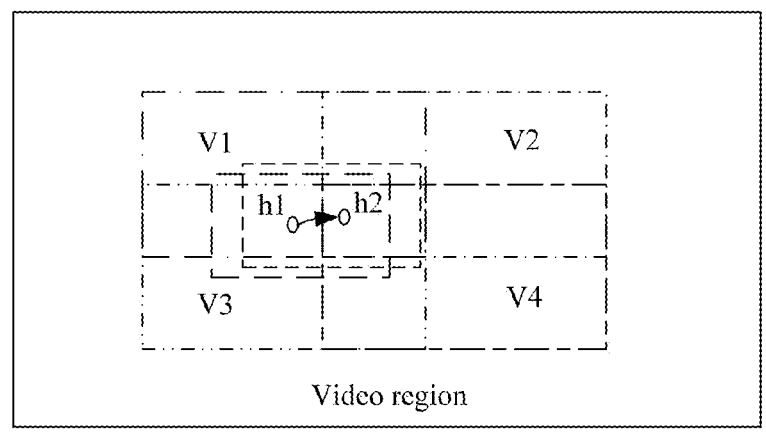
FIG. 14 is a structural diagram of sub-region division according to an embodiment of the present disclosure.

In addition, exemplarily, if the unadjusted visible region is a region surrounded by long dashed lines in FIG. 14, sub-regions covering the visible region are a sub-region v1 in an upper left corner and a sub-region v3 in a lower left corner. When the visible region is changed from the long-dashed-line region in which h1 is located to a short-dashed-line region in which h2 is located (close to a border of v1 and v2), and keeps a steady movement trend, it indicates that the visible region is to cross the border of v1 and v2. Because adjacent sub-regions have an overlapped region, a set of sub-regions covering the visible region is to be changed from (v1, v3) to (v1, v2, v3, v4). In this case, the client may request bitstream files corresponding to the set (v1, v2, v3, v4) of sub-regions covering the visible region. That is, before the visible region crosses the border of the sub-regions v1 and v2, the client may download in advance bitstream files corresponding to the sub-regions v2 and v4. Therefore, because the adjacent sub-regions have an overlapped part, before the visible region crosses the border of v1 and v2, that is, when the visible region approaches the border of v1 and v2, the client may request in advance and receive the bitstream files corresponding to the sub-regions v2 and v4. Therefore, a problem that video playback is not smooth caused because a process in which the bitstream files corresponding to the sub-regions v2 and v4 are downloaded after the visible region crosses the border of v1 and v2 requires time can be avoided. When it is found after several consecutive times of detection that movement trends of the visible region are consistent, for example, it is found for three consecutive times that the visible region moves towards a direction close to the border, it may be considered that this movement trend keeps steady.

If the adjacent sub-regions do not have an overlapped region, when it is predicted that the visible region is changed from the long-dashed-line region in which h1 is located to the short-dashed-line region in which h2 is located, before the visible region crosses the border of v1 and v2, the client does not request and download the bitstream files corresponding to the sub-regions v2 and v4. The client requests and downloads the bitstream files corresponding to the sub-regions v2 and v4 only after the visible region crosses the border of v1 and v2, and in this case, video playback on the client may still be not smooth because a requesting and downloading process and network transmission require time.

Step 406: After receiving the bitstream file corresponding to the to-be-downloaded sub-region, the client displays the adjusted visible region, and then returns to step 402.

Because the to-be-downloaded sub-region in the n sub-regions that has a region overlapped with the adjusted visible region can cover the adjusted visible region, and the bitstream file corresponding to the to-be-downloaded sub-region includes a bitstream file corresponding to the adjusted visible region, the adjusted visible region may be displayed after the bitstream file corresponding to the to-be-downloaded sub-region is obtained.

It should be noted that, after the client obtains the adjusted visible region in step 403, especially when the bandwidth of the client is limited, this embodiment of the present disclosure may further include the following steps.

Step 11: The client predicts a next visible region according to the unadjusted visible region and the adjusted visible region.

Figure 15:
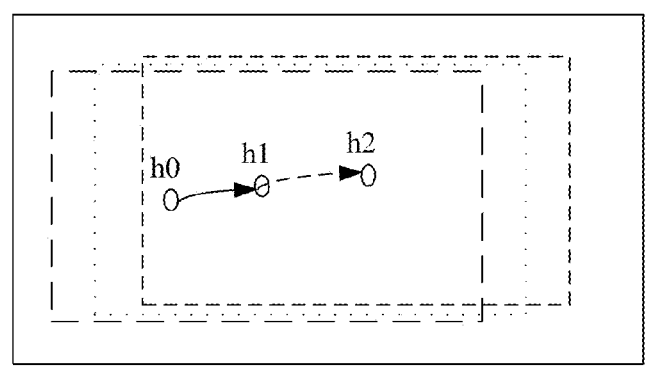
FIG. 15 is a schematic diagram of a method for predicting a next visible region according to an embodiment of the present disclosure.

Exemplarily, a prediction function $f(\square)$ may be $f(a,b)=a+a-b$, where a may be a parameter of the unadjusted visible region, and b may be a parameter of the adjusted visible region. Exemplarily, a horizontal coordinate of a center point of the predicted next visible region may be $x_{v,2}=f(x_{v,1}, x_{v,0})$, where $x_{v,0}$ herein represents a horizontal coordinate of a center point of the unadjusted visible region, and $x_{v,1}$ represents a horizontal coordinate of a center point of the adjusted visible region. A vertical coordinate of the center point of the predicted next visible region may be $y_{v,2}$ $f(y_{v,1},y_{v,0})$, where $y_{v,0}$ herein represents a vertical coordinate of the center point of the unadjusted visible region, and $y_{v,1}$ represents a vertical coordinate of the center point of the adjusted visible region. Certainly, a and b may also be other parameters of the visible region, which are not limited herein. Referring to FIG. 15, if the unadjusted visible region is a rectangular region h0 surrounded by the long dashed lines, and the adjusted visible region is a rectangular region h1 surrounded by dotted lines, the next visible region predicted according to h0, h1, and the prediction function may be a rectangular region h2 surrounded by short dashed lines in the figure.

Step 12: The client requests, from the server, a bitstream file corresponding to a to-be-downloaded sub-region in n sub-regions that has a region overlapped with the adjusted visible region and that covers the predicted next visible region.

Step 13: The client obtains the bitstream file corresponding to the to-be-downloaded sub-region in the n sub-regions that has a region overlapped with the adjusted visible region and that covers the predicted next visible region.

According to step 11 to step 13, when the client is to display the next visible region, if the sub-region that covers the next visible region predicted in step 11 can cover a next adjusted visible region that is obtained according to next posture information, the client may display, according to the bitstream file downloaded in advance in step 13, the next adjusted visible region obtained according to the next posture information. In this way, even if the bandwidth of the client is limited when the client is to display the next visible region, because the bitstream file corresponding to the sub-region that covers the next adjusted visible region is already downloaded in advance, the next adjusted visible region can be displayed in time, and a problem that playback is not smooth does not occur. Generally, the sub-region that covers the predicted next visible region can cover the next adjusted visible region obtained according to the next posture information. If the sub-region that covers the next visible region predicted in step 11 cannot fully cover the next adjusted visible region obtained according to the next posture information, the client requests, from the server, a bitstream file corresponding to a to-be-downloaded sub-region in the n sub-regions that has a region overlapped with the next adjusted visible region and that covers the predicted next visible region, and displays the next adjusted visible region after receiving the bitstream file.

Further, if a current moment is a moment $T_2$, and a moment corresponding to the unadjusted visible region is a moment $T_1$, the client may predict a visible region at a moment $T_3$ according to visible regions at the moment $T_1$ and the moment $T_2$, and predict a visible region at a moment $T_4$ according to the visible regions at the moment $T_1$ and the moment $T_3$ such that a visible region at a moment $T_k$ after a t time period may be successively predicted. Therefore, when a delay t exists on a network of the client, a bitstream file corresponding to a region (for example, a sub-region) in the video that covers the predicted visible region at the moment $T_k$ after the t time period may be requested from the server according to the predicted visible region at the moment $T_k$ after the t time period in order to display the visible region at the moment $T_k$ after the t time period. Therefore, a problem that video playback on the client is not synchronous with that on the server because a delay exists on the network can be resolved.

According to the interactive video display method provided in this embodiment of the present disclosure, a client adjusts, according to posture information, an unadjusted visible region, in a video, for being displayed on the client in order to obtain an adjusted visible region currently for being displayed on the client such that a problem in the prior art that browsing experience of a user is not real because a visible region is simply changed only according to a panning change of a location of the user can be resolved. After obtaining the adjusted visible region, the client determines, according to a media presentation description that is of the video and that is obtained from a server, address information of a bitstream file corresponding to a to-be-downloaded sub-region in n sub-regions that has a region overlapped with the adjusted visible region, and then requests, from the server according to the address information, the bitstream file corresponding to the to-be-downloaded sub-region whose region size is less than that of an entire video region, instead of requesting, from the server, a bitstream file corresponding to the entire video region like that in the prior art. Therefore, a requirement for a bandwidth of the client may be lowered, thereby avoiding a problem in the prior art that video playback on a client is not smooth because a bitstream file corresponding to an entire video region cannot be downloaded due to a limited bandwidth of the client.

Figure 16:
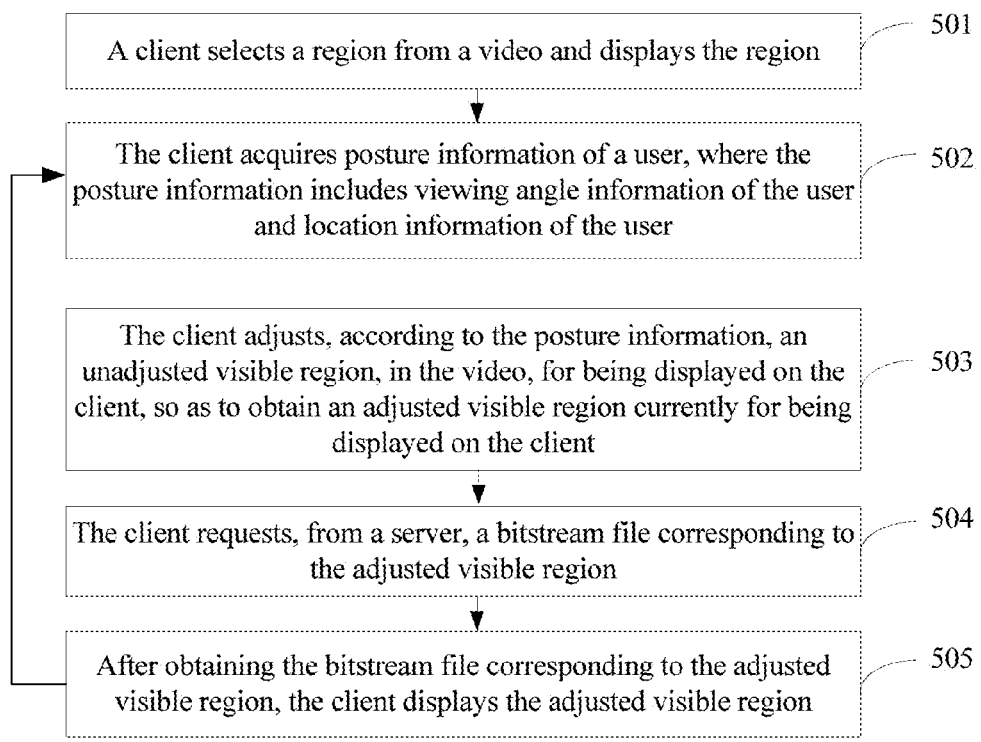
FIG. 16 is a flowchart of an interactive video display method according to still another embodiment of the present disclosure.

Referring to FIG. 16, an embodiment of the present disclosure provides an interactive video display method, and the method may mainly include the following steps.

Step 501: A client selects a region from a video and displays the region.

Step 502: The client acquires posture information of a user, where the posture information includes viewing angle information of the user and location information of the user.

Step 503: The client adjusts, according to the posture information, an unadjusted visible region, in the video, for being displayed on the client in order to obtain an adjusted visible region currently for being displayed on the client.

For a specific implementation manner of step 501 to step 503, reference may be made to step 101 to step 103 in the foregoing embodiment.

Step 504: The client requests, from a server, a bitstream file corresponding to the adjusted visible region.

In this step, the client may request, from the server, the bitstream file corresponding to the adjusted visible region, where a region size of the adjusted visible region is less than that of an entire video region, instead of requesting a bitstream file corresponding to the entire video region like that in the prior art such that a requirement for a bandwidth may be lowered. Therefore, the method may be applied to a scenario in which the bandwidth of the client is limited. When the bandwidth of the client is insufficient, for example, when the bandwidth of the client is less than a bandwidth threshold, according to the method provided in this embodiment of the present disclosure, a bitstream file corresponding to a sub-region that covers the adjusted visible region can still be downloaded, thereby avoiding a problem in the prior art that video playback on a client is not smooth because a bitstream file corresponding to an entire video region cannot be downloaded due to a limited bandwidth. The bandwidth threshold herein may be dynamically set according to an actual situation.

Step 505: After receiving the bitstream file corresponding to the adjusted visible region, the client displays the adjusted visible region, and then returns to step 502.

It should be noted that, after the client obtains the adjusted visible region in step 503, especially when the bandwidth of the client is limited, similar to step 11 to step 13 in the foregoing embodiment, this embodiment of the present disclosure may further include the following steps.

Step 21: The client predicts a next visible region according to the unadjusted visible region and the adjusted visible region.

For a specific implementation manner of the process, reference may be made to step 11 in the foregoing embodiment.

Step 22: The client requests, from the server, a bitstream file corresponding to a to-be-downloaded sub-region in n sub-regions that has a region overlapped with the adjusted visible region and that covers the predicted next visible region.

Step 23: The client obtains the bitstream file corresponding to the to-be-downloaded sub-region in the n sub-regions that has a region overlapped with the adjusted visible region and that covers the predicted next visible region.

According to the foregoing step 21 to step 23, when the client is to display the next visible region, if the sub-region that covers the next visible region predicted in step 21 can cover a next adjusted visible region that is obtained according to next posture information of the user, the client may display, according to the bitstream file downloaded in advance in step 23, the next adjusted visible region obtained according to the next posture information of the use. In this way, even if the bandwidth of the client is limited when the client is to display the next visible region, because the bitstream file corresponding to the sub-region that covers the next adjusted visible region is already downloaded in advance, the next adjusted visible region can be displayed in time, and a problem that playback is not smooth does not occur. If the sub-region that covers the next visible region predicted in step 21 cannot fully cover the next adjusted visible region obtained according to the next posture information of the user, the client requests, from the server, a bitstream file corresponding to a to-be-downloaded sub-region in the n sub-regions that has a region overlapped with the next adjusted visible region and that covers the predicted next visible region obtained according to the next posture information of the user, and displays the next adjusted visible region after receiving the bitstream file.

Further, if a current moment is a moment $T_2$, and a moment corresponding to the unadjusted visible region is a moment $T_1$, the client may predict a visible region at a moment $T_3$ according to visible regions at the moment $T_1$ and the moment $T_2$, and predict a visible region at a moment $T_4$ according to the visible regions at the moment $T_1$ and the moment $T_3$ such that a visible region at a moment $T_k$ after a t time period may be successively predicted. Therefore, when a delay t exists on a network of the client, a bitstream file corresponding to the predicted visible region at the moment $T_k$ after the t time period may be requested from the server according to the predicted visible region at the moment $T_k$ after the t time period in order to display the visible region at the moment $T_k$ after the t time period. Therefore, a problem that video playback on the client is not synchronous with that on the server because a delay exists on the network can be resolved.

According to the interactive video display method provided in this embodiment of the present disclosure, a client adjusts, according to posture information, an unadjusted visible region, in a video, for being displayed on the client in order to obtain an adjusted visible region currently for being displayed on the client such that a problem in the prior art that browsing experience of a user is not real because a visible region is simply changed only according to a panning change of a location of the user can be resolved. After obtaining the adjusted visible region, the client requests, from a server, a bitstream file corresponding to the adjusted visible region, instead of requesting, from the server, a bitstream file corresponding to an entire video region like that in the prior art. Therefore, a requirement for a bandwidth of the client may be lowered, thereby avoiding a problem in the prior art that video playback on a client is not smooth because a bitstream file corresponding to an entire video region cannot be downloaded due to a limited bandwidth of the client.

Figure 17:
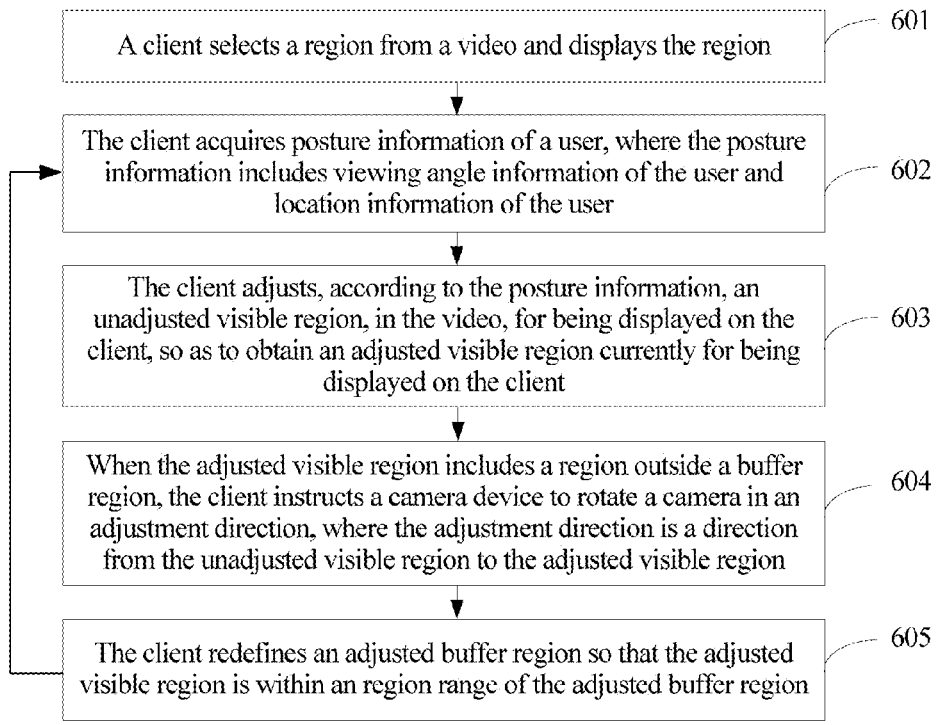
FIG. 17 is a flowchart of an interactive video display method according to still another embodiment of the present disclosure.

Referring to FIG. 17, an embodiment of the present disclosure provides another interactive video display method, and main steps of the method may include the following steps.

Step 601: A client selects a region from a video and displays the region.

The video is shot by a camera device, and a camera of the camera device in this embodiment of the present disclosure is rotatable. For example, the camera device may be a common rotatable pan-tilt-zoom camera that can be used in scenarios such as smart household monitoring and outdoor scene browsing in a cabin of a yacht.

The video in this embodiment of the present disclosure includes a buffer region, where an unadjusted visible region is within a region range of the buffer region and the buffer region is within a region range of the video. Exemplarily, if a width value of the unadjusted visible region is 800 pixels and a height value of the unadjusted visible region is 1000 pixels, and a width value of a video region is 2000 pixels and a height value of the video region is 2000 pixels, a width value of the buffer region may be a numerical value from 800 pixels to 2000 pixels (including 800 pixels and 2000 pixels), for example, 1400 pixels, and a height value of the buffer region may be a numerical value from 1000 pixels to 2000 pixels (including 1000 pixels and 2000 pixels), for example, 1500 pixels. This embodiment of the present disclosure imposes no limitation on a specific size of the set buffer region.

Step 602: The client acquires posture information of a user, where the posture information includes viewing angle information of the user and location information of the user.

Step 603: The client adjusts, according to the posture information, an unadjusted visible region, in the video, for being displayed on the client in order to obtain an adjusted visible region currently for being displayed on the client.

For a specific implementation manner of step 601 to step 603, reference may be made to step 101 to step 103 in the foregoing embodiment.

Step 604: When the adjusted visible region includes a region outside a buffer region, the client instructs a camera device to rotate a camera in an adjustment direction, where the adjustment direction is a direction from the unadjusted visible region to the adjusted visible region.

When the adjusted visible region includes a region outside the buffer region, that is, the buffer region cannot cover the adjusted visible region, the client may instruct the camera device to rotate the camera in the adjustment direction. The client may determine, according to coordinate values of points on a same-side border of the adjusted visible region and the buffer region, whether the adjusted visible region includes a region outside the buffer region. Exemplarily, if at least one of the following cases occurs, the client may determine whether the adjusted visible region includes a region outside the buffer region: a value of a horizontal coordinate of a point on a right-side border of the adjusted visible region is greater than a value of a horizontal coordinate of a point on a right-side border of the buffer region, or a value of a vertical coordinate of a point on a top-side border of the adjusted visible region is greater than a value of a vertical coordinate of a point on a top-side border of the buffer region, or a value of a horizontal coordinate of a point on a left-side border of the adjusted visible region is less than a value of a horizontal coordinate of a point on a left-side border of the buffer region, or a value of a vertical coordinate of a point on a bottom-side border of the adjusted visible region is less than a value of a vertical coordinate of a point on a bottom-side border of the buffer region.

Figure 18:
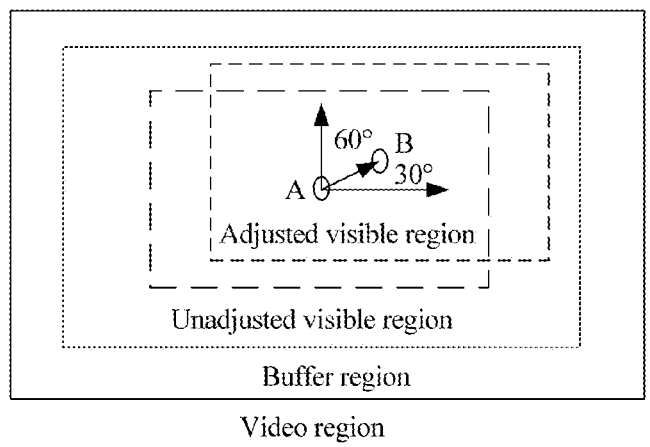
FIG. 18 is a schematic diagram of an adjustment direction according to another embodiment of the present disclosure.

In this step, the client may instruct, using a server, the camera device to rotate the camera in the adjustment direction, where the adjustment direction herein is a direction from the unadjusted visible region to the adjusted visible region. Exemplarily, the client may use a direction of a ray obtained by connecting a center point of the unadjusted visible region and a center point of the adjusted visible region as the adjustment direction. Referring to FIG. 18, if the center point of the unadjusted visible region is a point A and the center point of the adjusted visible region is a point B, and an included angle between a ray AB and a horizontal direction is 30° and an included angle between the ray AB and a vertical direction is 60°, the camera of the camera device may be adjusted in the direction of the ray AB, that is, in a direction that forms an angle of 30° with respect to the horizontal direction and that forms an angle of 60° with respect to the vertical direction. A specific value of a movement distance may be set as required, which is not limited in this embodiment of the present disclosure.

Figure 19:
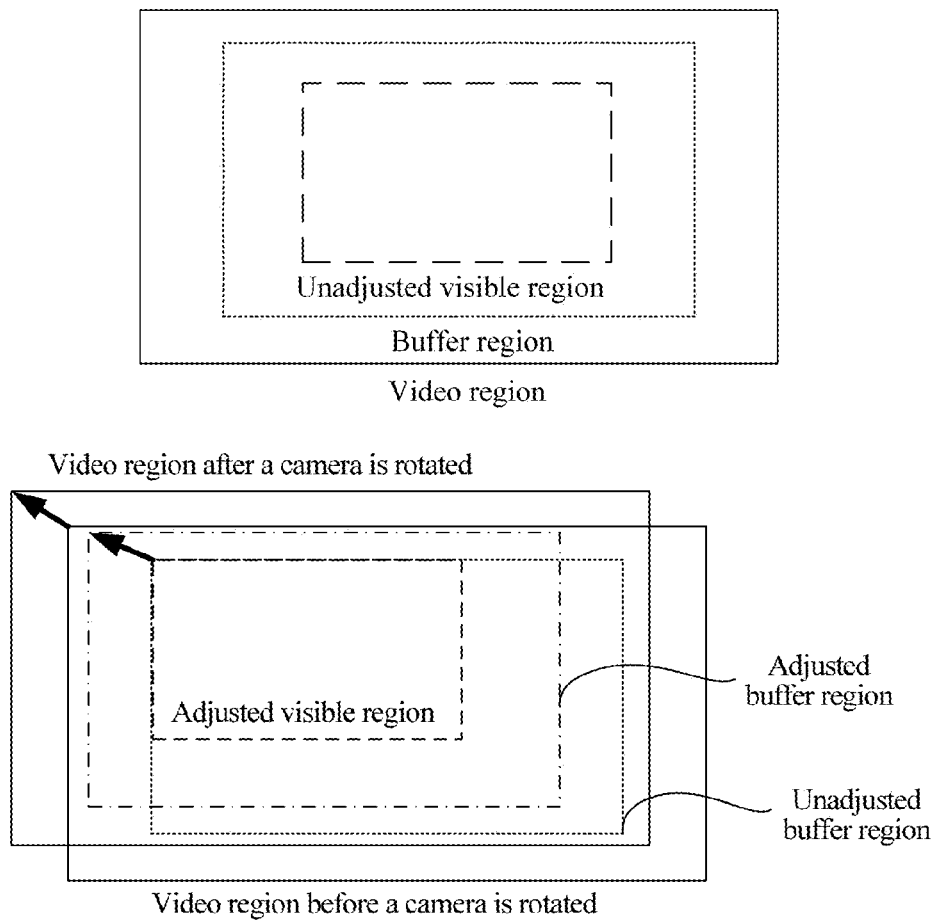
FIG. 19 is a schematic diagram of an effect after a buffer region is set according to an embodiment of the present disclosure.

In this step, because the video includes the buffer region, the unadjusted visible region is within the region range of the buffer region, and the buffer region is within the region range of the video, when the adjusted visible region includes a region outside the buffer region, the camera of the camera device may be triggered to rotate in the direction from the unadjusted visible region to the adjusted visible region. In this case, the camera can be rotated in advance before the adjusted visible region crosses a border of the video region and after the adjusted visible region just crosses a border of the buffer region. Therefore, the following problem in the prior art can be resolved. When a camera is rotated after a visible region crosses a border of a video region of a camera, because after the camera is rotated, capturing image data of the video region by a camera device and transmitting the data to a client require time, an image is delayed when the client performs interactive video display. For a schematic diagram of an effect of resolving, by setting a buffering region, an image delay problem caused by rotating a camera, reference may be made to FIG. 19.

Step 605: The client redefines an adjusted buffer region such that the adjusted visible region is within a region range of the adjusted buffer region, and then returns to step 602.

According to the interactive video display method provided in this embodiment of the present disclosure, a client adjusts, according to posture information, an unadjusted visible region, in a video, for being displayed on the client in order to obtain an adjusted visible region currently for being displayed on the client such that a problem in the prior art that browsing experience of a user is not real because a visible region is simply changed only according to a panning change of a location of the user can be resolved. After obtaining the adjusted visible region, when the adjusted visible region includes a region outside a buffer region, the client instructs a camera device to rotate in a direction from the unadjusted visible region to the adjusted visible region. Because the video includes the buffer region, the unadjusted visible region is within a region range of the buffer region, and the buffer region is within a region range of the video, the client may rotate a camera in advance before the adjusted visible region crosses a border of a video region of the camera, and the following problem in the prior art can be resolved. When a camera is rotated after an adjusted visible region crosses a border of a video region, because capturing image data of the video region and transmitting the data to a client require time, an image is delayed on the client.

Figure 20:
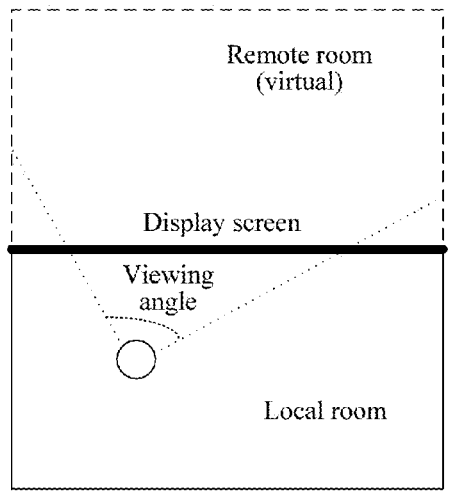
FIG. 20 is a schematic diagram of a scenario in which a local room interworks with a remote room according to an embodiment of the present disclosure.
Figure 21A:
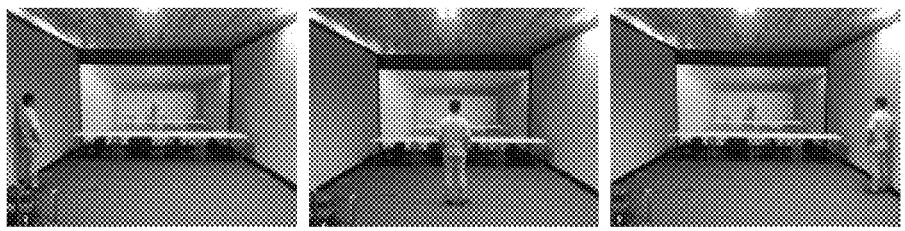
FIG. 21A is a schematic diagram of scenarios in which a user watches a remote room at different locations using a display screen according to an embodiment of the present disclosure.
Figure 21B:
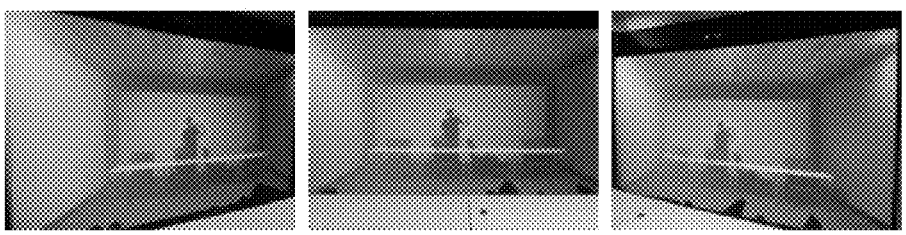
FIG. 21B is a diagram of images of a remote room watched by a user at different locations using a display screen.
Figure 21C:
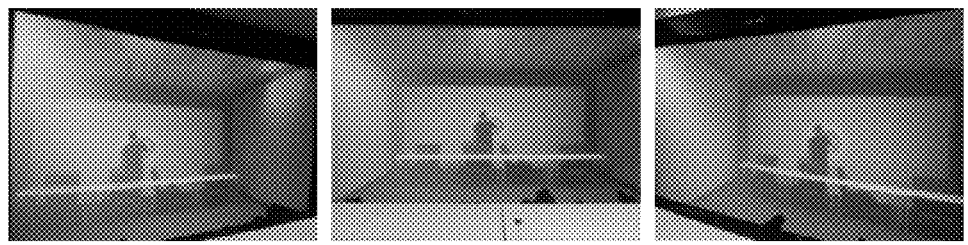
FIG. 21C is a diagram of images of a remote room watched by a user at different locations using a display screen according to an embodiment of the present disclosure.
Figure 21D:
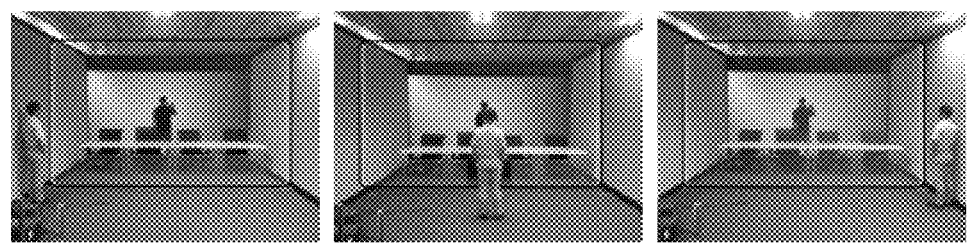
FIG. 21D is a schematic diagram of scenarios in which a user watches a remote room at different locations through glass according to an embodiment of the present disclosure.
Figure 21E:
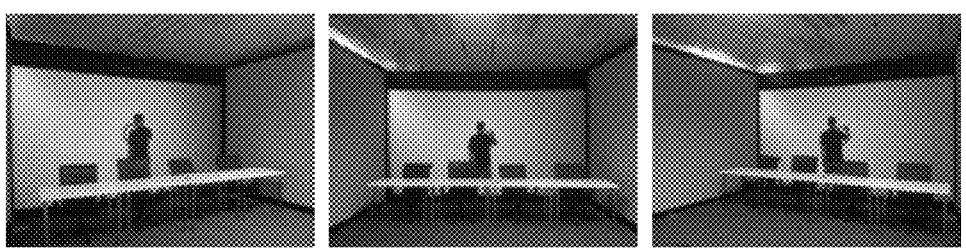
FIG. 21E is a diagram of images of a remote room watched by a user at different locations through glass according to an embodiment of the present disclosure.

In addition, the interactive video display methods provided in the embodiments shown in FIG. 4, FIG. 11, FIG. 12, FIG. 16, and FIG. 17 may further be applied to a scenario of room interworking shown in FIG. 20. That is, a user in a current room watches a remote room using a screen, and adjusts, according to posture information of the user, an unadjusted visible region, in a video, for being displayed on a client in order to implement image changing of the remote room, and provide the user with immersive experience of real interworking between a local room and the remote room. A camera device in the remote room may be a panoramic camera device such as a wide-angle lens and a lens array. In addition, when the camera device captures an image, separation between a person in the room and a room background may be considered in order to subsequently produce a scenario of face-to-face experience between a local user and the person in the remote room, thereby avoiding that subsequent processing cannot be performed because the person is blocked by an object in the room. Exemplarily, referring to schematic diagrams of effects of room interworking shown in FIG. 21A to FIG. 21E, an image in an adjusted visible region currently for being displayed on a client and obtained by adjusting, according to posture information, an unadjusted visible region, in a video, for being displayed on the client in FIG. 21C is basically consistent with an image viewed through glass in a real situation in FIG. 21E. In the prior art, an image (FIG. 21B) in a visible region obtained after a simple change according to only a panning change of a location of a user differs greatly from the image (FIG. 21E) in the real situation (for example, it may be seen from a size of a left wall in the room in the diagram).

Figure 22:
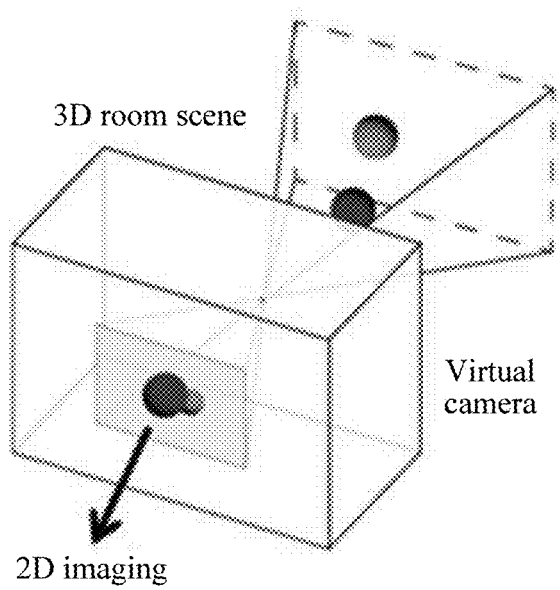
FIG. 22 is a schematic diagram of displaying a three-dimensional (3D) reconstruction result of a room using a 3D plane display technology according to an embodiment of the present disclosure.

Certainly, in the foregoing scenario of room interworking, a 3D camera device may further be used to perform shooting and real-time 3D reconstruction on the remote room and the person in the room in order to obtain a digital 3D model of the room and the person. A display device in the scenario may be a common screen, or may be a 3D display device. When the display device is a common screen, an existing 3D plane display technology may be used for presentation. For a schematic diagram of displaying a 3D reconstruction result of the room using the 3D plane display technology, reference may be made to FIG. 22. When the 3D camera device is used, human eyes may be simulated using a virtual camera in a 3D virtual scenario. If the posture information of the user changes, the change of the posture information of the user may be simulated by changing a location or an orientation of a virtual camera (that is, changing an extrinsic matrix $M_e$), and the unadjusted visible region, in the video, for being displayed on the client is adjusted according to the posture information in order to obtain the adjusted visible region currently for being displayed on the client and display the adjusted visible region. Further, the change of the posture information of the user may be simulated by adjusting a rotation parameter and a panning parameter in the matrix $M_e$.

$M_e$ may be defined as:

$$M_e = \begin{pmatrix} r_{11} & r_{12} & r_{13} & t_x \\ r_{21} & r_{22} & r_{23} & t_y \\ r_{31} & r_{32} & r_{33} & t_z \end{pmatrix},$$

$r_{ij}$ (i, j=1,2,3) and $t_i$ (i=x,y,z) are respectively the rotation parameter and the panning parameter of the virtual camera. After adjusting the parameters of $M_e$ according to a change of location information or viewing angle information of the user, the client may calculate a two dimensional (2D) projection $I_{2D}$ of a 3D reconstruction scenario $S_{3D}$ using $M_e$ and an Intrinsic matrix $M_i$, and displays the 2D projection on the screen of the client, where a specific calculation formula may be represented as:

$$I_{2D} = M_i M_e S_{3D}, \text{ where}$$

$$M_i = \begin{pmatrix} f_x & s & x_0 \\ 0 & f_y & y_0 \\ 0 & 0 & 1 \end{pmatrix},$$

$f_x$ and $f_y$ are focal lengths of the virtual camera, s is a skew axis of the virtual camera, and $x_0$ and $y_0$ are principal point offsets of the virtual camera.

In addition, according to the interactive video display methods provided in the embodiments shown in FIG. 4, FIG. 7, FIG. 11, FIG. 12, FIG. 16, and FIG. 17, a robot with a camera may also be used as the camera device to perform real-time video shooting in order to control, according to the change of the posture information of the user, the remote robot to move, and adjust in real time a shooting angle and a location of the robot such that a video region obtained by means of shooting may be adjusted in real time.

According to the interactive video display methods provided in the embodiments shown in FIG. 4, FIG. 7, FIG. 11, FIG. 12, FIG. 16, and FIG. 17, another display device such as an arc-shaped screen or a multi-screen splicing display device may further be used to display a remote scene, which is not limited in the embodiments of the present disclosure.

Figure 23:
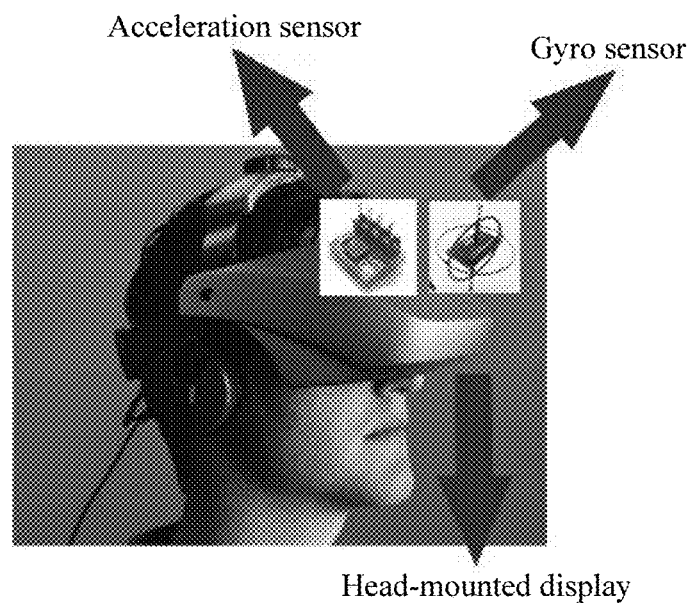
FIG. 23 is a schematic structural diagram of a system's client that performs interactive video display using a head-mounted display according to an embodiment of the present disclosure.

It should be noted that the display device in the interactive video display methods provided in the embodiments shown in FIG. 4, FIG. 7, FIG. 11, FIG. 12, FIG. 16, and FIG. 17 may further be a head-mounted display (HMD), and a shape of the head-mounted display is similar to that of glasses. The HMD zooms in, using a set of optical systems, an image on a micro display screen, and projects the image on retinas such that a zoomed-in screen image is presented on the eyes of a viewer. The user can perform interactive scene browsing using the HMD, adjust, according to the acquired posture information of the user, the unadjusted visible region, in the video, for being displayed on the client, to obtain the adjusted visible region currently for being displayed on the client, thereby achieving an interactive video display effect. Exemplarily, the posture information of the user may be acquired by installing a sensor on the HMD. Herein, a vertical distance, between the user and the client, in the location information may be a vertical distance between the user and a reference plane, where the reference plane may be set according to a specific need. For a schematic diagram of a system client that performs interactive video display using an HMD, reference may be made to FIG. 23. As shown in FIG. 23, the client may perform scene display using the HMD, and may acquire the posture information of the user using a gyro sensor, an acceleration sensor, and the like in order to accordingly adjust the unadjusted visible region. For a specific adjustment method, reference may be made to step 103 in the foregoing embodiment. Certainly, the posture information of the user may also be acquired using another sensor or in another manner, which is not limited in this embodiment of the present disclosure.

Figure 24:
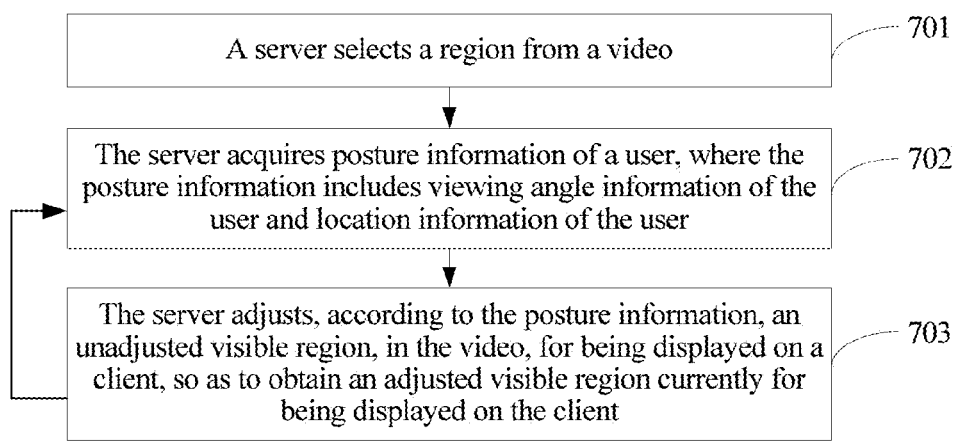
FIG. 24 is a flowchart of an interactive video display method according to another embodiment of the present disclosure.

Referring to FIG. 24, an embodiment of the present disclosure provides an interactive video display method, and main steps of the method may include the following steps.

Step 701: A server selects a region from a video.

In this step, the server may select, from the video, a region as an unadjusted visible region in order to display the selected region as an initial visible region on a client when the client starts interactive video display. A process in which the server further selects the region is similar to a process in which the client selects the region, and reference may be made to step 101.

Step 702: The server acquires posture information of a user, where the posture information includes viewing angle information of the user and location information of the user.

In this step, the server may acquire the posture information of the user from the client, and the posture information includes the viewing angle information of the user and the location information of the user. The viewing angle information of the user includes face orientation information of the user, where the face orientation information of the user includes an angle $\theta_u^x$ by which a face orientation of the user rotates around a coronal axis and an angle $\theta_u^y$ by which the face orientation of the user rotates around a vertical axis. The location information of the user may include a vertical distance $z_u$ between the user and a plane of the client.

Step 703: The server adjusts, according to the posture information, an unadjusted visible region, in the video, for being displayed on a client in order to obtain an adjusted visible region currently for being displayed on the client, and then returns to step 702.

In this step, a process in which the server adjusts, according to the posture information, the unadjusted visible region, in the video, for being displayed on the client in order to obtain the adjusted visible region currently for being displayed on the client is similar to a process in which the client adjusts, according to the posture information, the unadjusted visible region, in the video, for being displayed on the client in order to obtain the adjusted visible region currently for being displayed on the client. For a specific implementation process of this step, reference may be made to step 103, and details are not described herein again.

After obtaining the adjusted visible region in step 703, the server may further send a parameter (such as coordinates of each point in the adjusted visible region) that represents a region range of the adjusted visible region to the client such that the client displays the adjusted visible region.

According to the interactive video display method provided in this embodiment of the present disclosure, a server acquires in real time posture information of a user, and adjusts, according to viewing angle information of the user and location information of the user that are in the posture information of the user, an unadjusted visible region, in a video, for being displayed on a client in order to obtain an adjusted visible region currently for being displayed on the client such that a visible region for being displayed on the client can be accordingly changed according to real-time changes of the viewing angle information and the location information of the user. Therefore, a problem in the prior art that browsing experience of a user is not real because a visible region is simply changed only according to a panning change of a location of the user can be resolved.

Figure 25:
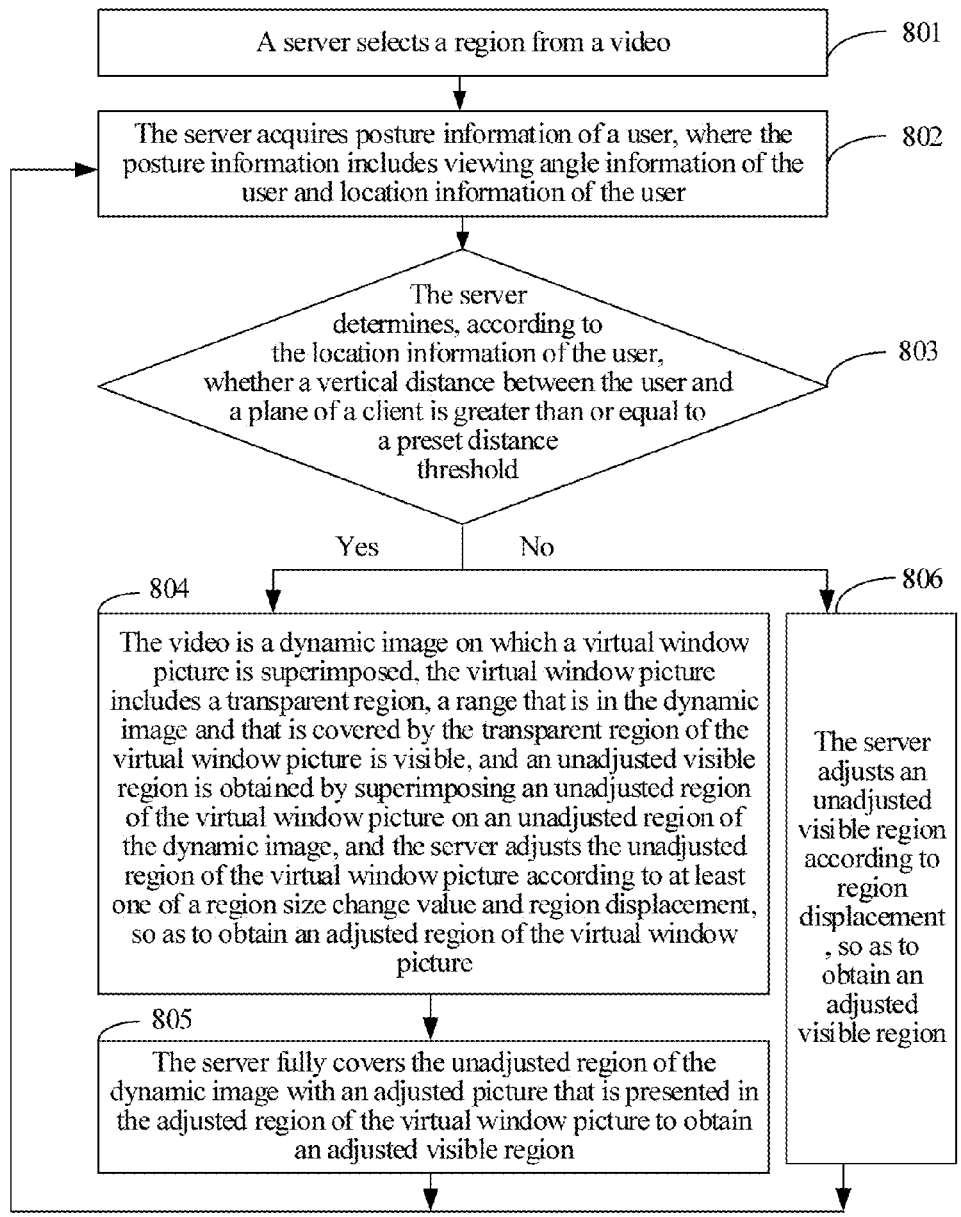
FIG. 25 is a flowchart of an interactive video display method according to another embodiment of the present disclosure.

Referring to FIG. 25, an embodiment of the present disclosure provides an interactive video display method, and the method may mainly include the following steps.

Step 801: A server selects a region from a video.

Step 802: The server acquires posture information of a user, where the posture information includes viewing angle information of the user and location information of the user.

For a specific implementation manner of step 801 and step 802, reference may be made to step 701 and step 702.

Step 803: The server determines, according to the location information of the user, whether a vertical distance between the user and a plane of a client is greater than or equal to a preset distance threshold, and then goes to step 804 or step 806.

Step 804: If the server determines that the vertical distance between the user and the plane of the client is greater than or equal to the preset distance threshold in step 803, where the video is a dynamic image on which a virtual window picture is superimposed, the virtual window picture includes a transparent region, a range that is in the dynamic image and that is covered by the transparent region of the virtual window picture is visible, and an unadjusted visible region is obtained by superimposing an unadjusted region of the virtual window picture on an unadjusted region of the dynamic image, the server adjusts the unadjusted region of the virtual window picture according to at least one of a region size change value and region displacement in order to obtain an adjusted region of the virtual window picture, and then goes to step 805.

Step 805: The server fully covers the unadjusted region of the dynamic image with an adjusted picture that is presented in the adjusted region of the virtual window picture to obtain an adjusted visible region, and then returns to step 802.

Step 806: If the server determines that the vertical distance between the user and the plane of the client is less than the preset distance threshold in step 803, the server adjusts an unadjusted visible region according to region displacement in order to obtain an adjusted visible region, and then returns to step 802.

After step 805 or step 806, the server may further send a parameter that represents a region range of the adjusted visible region to the client such that the client displays the adjusted visible region.

A process in which the server obtains the adjusted visible region according to the posture information of the user in step 803 to step 806 is similar to a process in which the client obtains the adjusted visible region according to the posture information of the user, and reference may be made to descriptions in step 203 to step 206. Details are not described herein again.

According to the interactive video display method provided in this embodiment of the present disclosure, when a vertical distance between a user and a plane of a client is greater than or equal to a preset distance threshold, a server may adjust an unadjusted region of a virtual window picture according to posture information of the user, obtain an adjusted region of the virtual window picture, and superimpose the adjusted region of the virtual window picture on an unadjusted region of a dynamic image in order to obtain an adjusted visible region, or when a vertical distance between a user and a plane of a client is less than a preset distance threshold, a server may obtain region displacement of an unadjusted visible region according to posture information of the user, and further adjust the unadjusted visible region according to the region displacement so as to obtain an adjusted visible region. Therefore, a visible region displayed on the client can be accordingly changed according to the posture information of the user, and a problem in the prior art that browsing experience of a user is not real because a visible region is simply changed only according to a panning change of a location of the user can be resolved.

Figure 26:
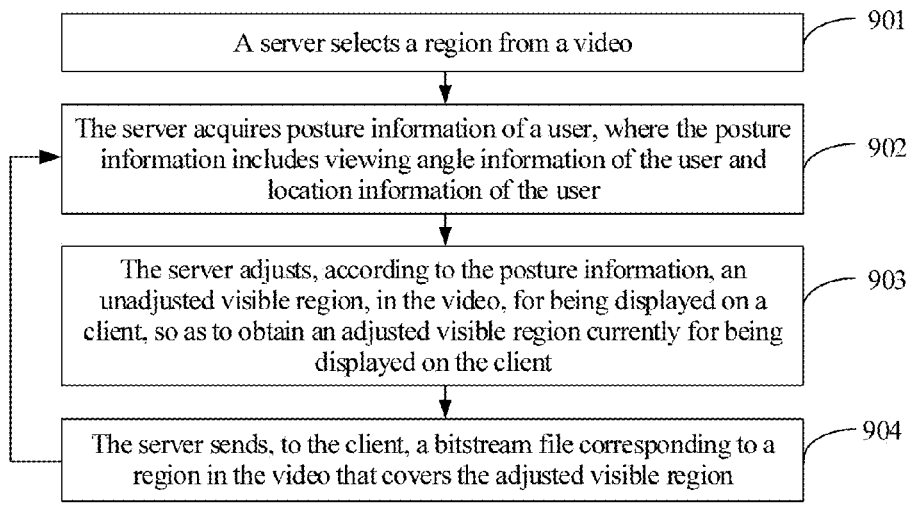
FIG. 26 is a flowchart of an interactive video display method according to another embodiment of the present disclosure.

Referring to FIG. 26, an embodiment of the present disclosure provides an interactive video display method, and the method may mainly include the following steps.

Step 901: A server selects a region from a video.

Step 902: The server acquires posture information of a user, where the posture information includes viewing angle information of the user and location information of the user.

Step 903: The server adjusts, according to the posture information, an unadjusted visible region, in the video, for being displayed on a client in order to obtain an adjusted visible region currently for being displayed on the client.

For a specific implementation manner of step 901 to step 903, reference may be made to step 701 to step 703 in the foregoing embodiment.

Step 904: The server sends, to the client, a bitstream file corresponding to a region in the video that covers the adjusted visible region, and then returns to step 902.

It should be noted that, the region in the video that covers the adjusted visible region herein refers to a region, in the video, whose range is greater than that of the adjusted visible region.

Optionally, the region in the video that covers the adjusted visible region may be a to-be-downloaded sub-region in n sub-regions that has a region overlapped with the adjusted visible region. There is one or several to-be-downloaded sub-regions herein in the n sub-regions obtained by dividing the video, where n is a positive integer greater than 1, and adjacent sub-regions in the n sub-regions have an overlapped region and the adjacent sub-regions have non-overlapped regions.

Optionally, the region in the video that covers the adjusted visible region may be the adjusted visible region.

Because the region in the video that covers the adjusted visible region may be smaller than an entire video region, the server may send, to the client, the bitstream file corresponding to the region whose size is less than that of the entire video region, instead of sending a bitstream file corresponding to the entire video region like that in the prior art such that a requirement for a bandwidth may be lowered. Therefore, the method may be applied to a scenario in which the bandwidth of the client is limited. When the bandwidth of the client is insufficient, for example, when the bandwidth of the client is less than a bandwidth threshold, according to the method provided in this embodiment of the present disclosure, the bitstream file corresponding to the region in the video that covers the adjusted visible region can still be downloaded, thereby avoiding a problem in the prior art that video playback on a client is not smooth because a bitstream file corresponding to an entire video region cannot be downloaded due to a limited bandwidth. The bandwidth threshold herein may be dynamically set according to an actual situation.

It should be noted that, in this embodiment of the present disclosure, one or more clients may communicate with a same server. For example, when a same scene video is browsed online on multiple clients at the same time, the server may adjust, according to posture information, of a user, of a different client, an unadjusted visible region, in the video, for being displayed on the client in order to obtain an adjusted visible region currently for being displayed on the client, and send, to the corresponding client, the bitstream file corresponding to the region in the video that covers the adjusted visible region. Therefore, this embodiment of the present disclosure may be applicable to a multi-client scenario, and a problem in the prior art that a single-client interactive video display system cannot be expanded to a multi-client interactive video display system can be resolved.

In addition, the server may further send a parameter that represents a region range of the adjusted visible region to the client such that the client displays the adjusted visible region according to the parameter and the obtained bitstream file.

According to the interactive video display method provided in this embodiment of the present disclosure, a server adjusts, according to posture information, an unadjusted visible region, in a video, for being displayed on a client in order to obtain an adjusted visible region currently for being displayed on the client such that a problem in the prior art that browsing experience of a user is not real because a visible region is simply changed only according to a panning change of a location of the user can be resolved. After obtaining the adjusted visible region, the server sends, to the client, a bitstream file corresponding to a region in the video that covers the adjusted visible region, instead of sending, to the client, a bitstream file corresponding to an entire video region like that in the prior art. Therefore, a requirement for a bandwidth of the client may be lowered, thereby avoiding a problem in the prior art that video playback on a client is not smooth because the bitstream file corresponding to an entire video region cannot be downloaded due to a limited bandwidth of the client.

Figure 27:
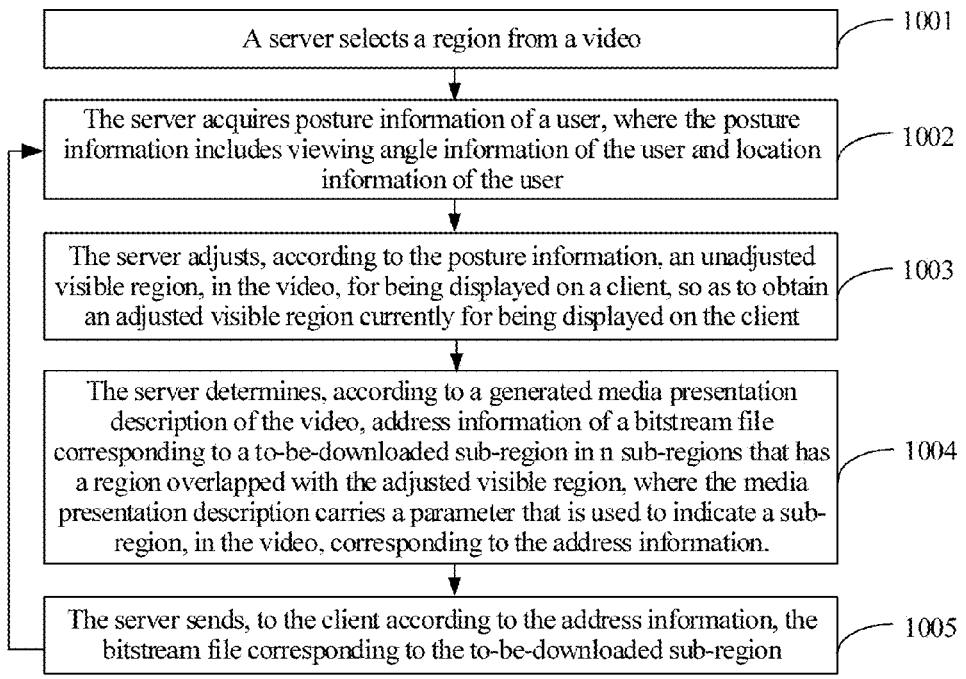
FIG. 27 is a flowchart of an interactive video display method according to another embodiment of the present disclosure.

Referring to FIG. 27, an embodiment of the present disclosure provides an interactive video display method, and the method may mainly include the following steps.

Step 1001: A server selects a region from a video.

Step 1002: The server acquires posture information of a user, where the posture information includes viewing angle information of the user and location information of the user.

Step 1003: The server adjusts, according to the posture information, an unadjusted visible region, in the video, for being displayed on a client in order to obtain an adjusted visible region currently for being displayed on the client.

For a specific implementation manner of step 1001 to step 1003, reference may be made to step 701 to step 703 in the foregoing embodiment.

Step 1004: The server determines, according to a generated media presentation description of the video, address information of a bitstream file corresponding to a to-be-downloaded sub-region in n sub-regions that has a region overlapped with the adjusted visible region, where the media presentation description carries a parameter that is used to indicate a sub-region, in the video, corresponding to the address information.

In this step, a process in which the server determines, according to the generated media presentation description of the video, the address information of the bitstream file corresponding to the to-be-downloaded sub-region is similar to a process in which the client determines, according to the media presentation description of the video, the address information of the bitstream file corresponding to the to-be-downloaded sub-region. Further, reference may be made to step 404, and details are not described herein again.

Step 1005: The server sends, to the client according to the address information, the bitstream file corresponding to the to-be-downloaded sub-region, and then returns to step 1002.

In this step, because a to-be-downloaded sub-region in the n sub-regions that has a region overlapped with the adjusted visible region can cover the adjusted visible region, the server may send, to the client, the bitstream file corresponding to the to-be-downloaded sub-region whose region size is less than that of an entire video region, instead of sending a bitstream file corresponding to the entire video region like that in the prior art such that a requirement for a bandwidth may be lowered. Therefore, the method may be applied to a scenario in which the bandwidth of the client is limited. When the bandwidth of the client is insufficient, for example, when the bandwidth of the client is less than a bandwidth threshold, according to the method provided in this embodiment of the present disclosure, a bitstream file corresponding to a region in the video that covers the adjusted visible region can still be downloaded, thereby avoiding a problem in the prior art that video playback on a client is not smooth because a bitstream file corresponding to an entire video region cannot be downloaded due to a limited bandwidth. The bandwidth threshold herein may be dynamically set according to an actual situation.

In addition, exemplarily, if the unadjusted visible region is a region surrounded by long dashed lines in FIG. 14, sub-regions covering the visible region are a sub-region v1 in an upper-left corner and a sub-region v3 in a lower-left corner. When the visible region is changed from the longdashed-line region in which h1 is located to a short-dashed-line region in which h2 is located (that is close to a border of v1 and v2), and keeps a steady movement trend, it indicates that the visible region is to cross the border of v1 and v2. Because adjacent sub-regions have an overlapped region, a set of sub-regions covering the visible region is to be changed from (v1, v3) to (v1, v2, v3, v4). In this case, the server may send, to the client, bitstream files corresponding to the set (v1, v2, v3, v4) of sub-regions covering the visible region. That is, before the visible region crosses the border of the sub-regions v1 and v2, the server may send in advance, to the client, bitstream files corresponding to the sub-regions v2 and v4. Therefore, because the adjacent sub-regions have an overlapped part, before the visible region crosses the border of v1 and v2, that is, when the visible region approaches the border of v1 and v2, the server may send in advance, to the client, the bitstream files corresponding to the sub-regions v2 and v4. Therefore, a problem that video playback on the client is not smooth caused because a process in which the bitstream files corresponding to the sub-regions v2 and v4 are sent after the visible region crosses the border of v1 and v2 requires time can be avoided. When it is found after several consecutive times of detection that movement trends of the visible region are consistent, for example, it is found for three consecutive times that the visible region moves towards a direction close to the border, it may be considered that this movement trend keeps steady.

If the adjacent sub-regions do not have an overlapped region, when it is predicted that the visible region is changed from the long-dashed-line region in which h1 is located to the short-dashed-line region in which h2 is located, before the visible region crosses the border of v1 and v2, the server does not send, to the client, the bitstream files corresponding to the sub-regions v2 and v4. After the visible region crosses the border of v1 and v2, the server sends, to the client, the bitstream files corresponding to the sub-regions v2 and v4, and in this case, video playback on the client may still be not smooth because a sending process requires time.

It should be noted that, after the server obtains the adjusted visible region in step 1003, especially when the bandwidth of the client is limited, this embodiment of the present disclosure may further include the following steps.

Step 31: The server predicts a next visible region according to the unadjusted visible region and the adjusted visible region.

A process in which the server predicts the next visible region according to the unadjusted visible region and the adjusted visible region is similar to a process in which the client predicts the next visible region according to the unadjusted visible region and the adjusted visible region, and further, reference may be made to step 11.

Step 32: The server sends, to the client, a bitstream file corresponding to a region in the video that covers the next visible region.

In step 31 and step 32, when the client is to display the next visible region, if a sub-region that covers the next visible region predicted in step 31 can cover a next adjusted visible region obtained according to next posture information, the client may display, according to the bitstream file sent by the server in advance in step 32, the next adjusted visible region obtained according to the next posture information. In this way, even if the bandwidth of the client is limited when the client is to display the next visible region, because the server has sent in advance, to the client, the bitstream file corresponding to the sub-region that covers the next adjusted visible region, the client can display in time the next adjusted visible region, and a problem that playback is not smooth does not occur. Generally, the sub-region that covers the predicted next visible region can cover the next adjusted visible region obtained according to the next posture information. If the sub-region that covers the next visible region predicted in step 31 cannot fully cover the next adjusted visible region obtained according to the next posture information, the server sends, to the client, a bitstream file corresponding to a to-be-downloaded sub-region in the n sub-regions that has a region overlapped with the next adjusted visible region and that covers the predicted next visible region.

Further, if a current moment is a moment $T_2$, and a moment corresponding to the unadjusted visible region is a moment $T_1$, the server may predict a visible region at a moment $T_3$ according to visible regions at the moment $T_1$ and the moment $T_2$, and predict a visible region at a moment $T_4$ according to the visible regions at the moment $T_1$ and the moment $T_3$ such that a visible region at a moment $T_k$ after a t time period may be successively predicted. Therefore, when a delay t exists on a network of the client, the server may send, to the client according to the predicted visible region at the moment $T_k$ after the t time period, a bitstream file corresponding to a region (for example, a sub-region) in the video that covers the predicted visible region at the moment $T_k$ after the t time period such that the visible region at the moment $T_k$ after the t time period is displayed. Therefore, a problem that video playback on the client is not synchronous with that on the server because a delay exists on the network can be resolved.

According to the interactive video display method provided in this embodiment of the present disclosure, a server adjusts, according to posture information, an unadjusted visible region, in a video, for being displayed on a client in order to obtain an adjusted visible region currently for being displayed on the client such that a problem in the prior art that browsing experience of a user is not real because a visible region is simply changed only according to a panning change of a location of the user can be resolved. After obtaining the adjusted visible region, the server determines, according to a generated media presentation description of the video, address information of a bitstream file corresponding to a to-be-downloaded sub-region in n sub-regions that has a region overlapped with the adjusted visible region, and then sends, to the client according to the address information, the bitstream file corresponding to the to-be-downloaded sub-region whose region size is less than that of an entire video region, instead of sending, to the client, a bitstream file corresponding to the entire video region like that in the prior art. Therefore, a requirement for a bandwidth of the client may be lowered, thereby avoiding a problem in the prior art that video playback on a client is not smooth because the bitstream file corresponding to an entire video region cannot be downloaded due to a limited bandwidth of the client.

Figure 28:
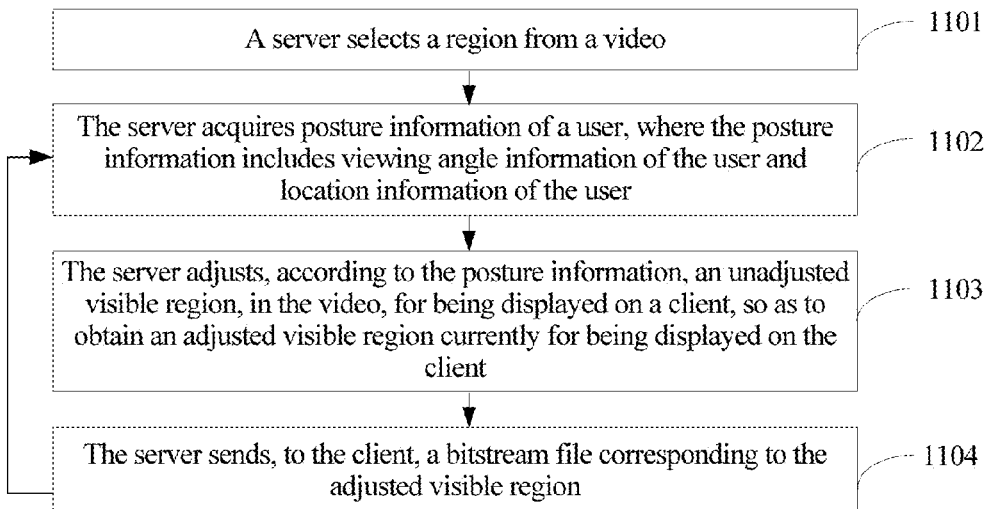
FIG. 28 is a flowchart of an interactive video display method according to another embodiment of the present disclosure.

Referring to FIG. 28, an embodiment of the present disclosure provides an interactive video display method, and the method may mainly include the following steps.

Step 1101: A server selects a region from a video.

Step 1102: The server acquires posture information of a user, where the posture information includes viewing angle information of the user and location information of the user.

Step 1103: The server adjusts, according to the posture information, an unadjusted visible region, in the video, for being displayed on a client in order to obtain an adjusted visible region currently for being displayed on the client.

For a specific implementation manner of step 1101 to step 1103, reference may be made to step 701 to step 703 in the foregoing embodiment.

Step 1104: The server sends, to the client, a bitstream file corresponding to the adjusted visible region, and then returns to step 1102.

In this step, the server may send, to the client, the bitstream file corresponding to the adjusted visible region, where a region size of the adjusted visible region is less than that of an entire video region, instead of sending a bitstream file corresponding to the entire video region like that in the prior art such that a requirement for a bandwidth may be lowered. Therefore, the method may be applied to a scenario in which the bandwidth of the client is limited. When the bandwidth of the client is insufficient, for example, when the bandwidth of the client is less than a bandwidth threshold, according to the method provided in this embodiment of the present disclosure, the client can still download the bitstream file corresponding to the adjusted visible region, thereby avoiding a problem in the prior art that video playback on a client is not smooth because a bitstream file corresponding to an entire video region cannot be downloaded due to a limited bandwidth. The bandwidth threshold herein may be dynamically set according to an actual situation.

After receiving the bitstream file corresponding to the adjusted visible region, the client may display the adjusted visible region according to the bitstream file.

It should be noted that, after the server obtains the adjusted visible region in step 1103, especially when the bandwidth of the client is limited, similar to step 21 and step 22 in the foregoing embodiment, this embodiment of the present disclosure may further include the following steps.

Step 41: The server predicts a next visible region according to the unadjusted visible region and the adjusted visible region.

Step 42: The server sends, to the client, a bitstream file corresponding to a region in the video that covers the next visible region.

In step 41 and step 42, when the client is to display the next visible region, if the next visible region predicted in step 41 can cover a next adjusted visible region obtained according to next posture information, the client may display, according to the bitstream file sent by the server in advance in step 42, the next adjusted visible region obtained according to the next posture information. In this way, even if the bandwidth of the client is limited when the client is to display the next visible region, because the server has sent in advance, to the client, a bitstream file corresponding to the next adjusted visible region, the next adjusted visible region can be displayed in time, and a problem that playback is not smooth does not occur. If the next visible region predicted in step 41 cannot fully cover the next adjusted visible region obtained according to the next posture information, the server sends, to the client, the bitstream file corresponding to a to-be-downloaded sub-region in the n sub-regions that has a region overlapped with the next adjusted visible region and that covers the predicted next visible region obtained according to the next posture information such that the client displays the next adjusted visible region.

Further, if a current moment is a moment $T_2$, and a moment corresponding to the unadjusted visible region is a moment $T_1$, the server may predict a visible region at a moment $T_3$ according to visible regions at the moment $T_1$ and the moment $T_2$, and predict a visible region at a moment $T_4$ according to the visible regions at the moment $T_1$ and the moment $T_3$ such that a visible region at a moment $T_k$ after a t time period may be successively predicted. Therefore, when a delay t exists on a network of the client, the server may send, to the client according to the predicted visible region at the moment $T_k$ after the t time period, a bitstream file corresponding to the predicted visible region at the moment $T_k$ after the t time period such that the client may display the visible region at the moment $T_k$ after the t time period. Therefore, a problem that video playback on the client does not synchronize with the server because a delay exists on the network can be resolved.

According to the interactive video display method provided in this embodiment of the present disclosure, a server adjusts, according to posture information, an unadjusted visible region, in a video, for being displayed on a client in order to obtain an adjusted visible region currently for being displayed on the client such that a problem in the prior art that browsing experience of a user is not real because a visible region is simply changed only according to a panning change of a location of the user can be resolved. After obtaining the adjusted visible region, the server sends, to the client, a bitstream file corresponding to the adjusted visible region, instead of sending, to the client, a bitstream file corresponding to an entire video region like that in the prior art. Therefore, a requirement for a bandwidth of the client may be lowered, thereby avoiding a problem in the prior art that video playback on a client is not smooth because the bitstream file corresponding to an entire video region cannot be downloaded due to a limited bandwidth of the client.

Figure 29:
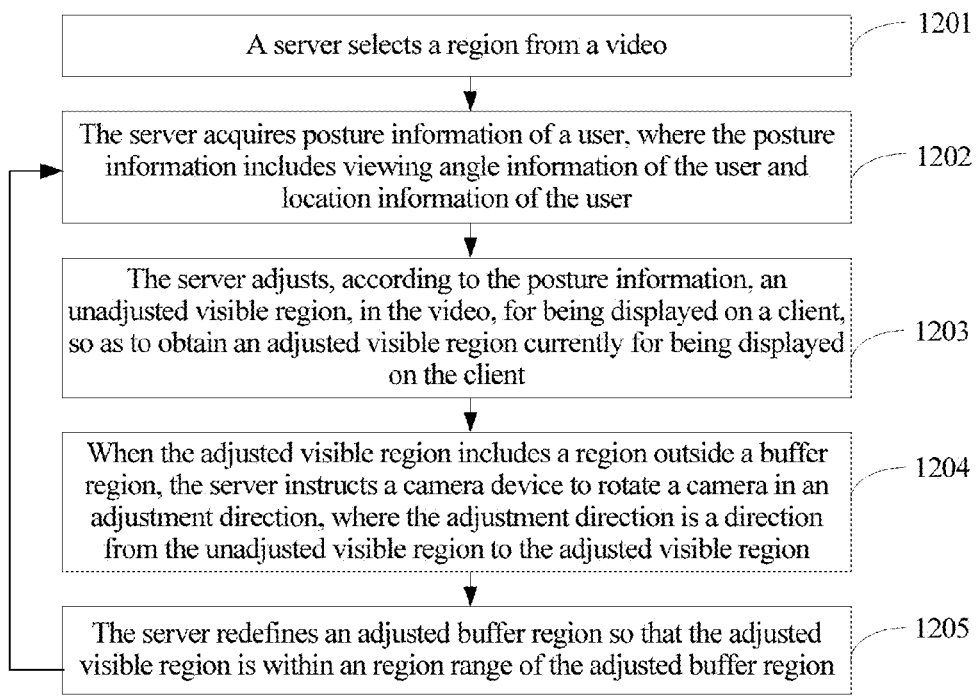
FIG. 29 is a flowchart of an interactive video display method according to another embodiment of the present disclosure.

Referring to FIG. 29, an embodiment of the present disclosure provides another interactive video display method, and main steps of the method may include the following steps.

Step 1201: A server selects a region from a video.

The video is shot by a camera device, and a camera of the camera device in this embodiment of the present disclosure is rotatable. For example, the camera device may be a common rotatable pan-tilt-zoom camera that can be used in scenarios such as smart household monitoring and outdoor scene browsing in a cabin of a yacht.

The video in this embodiment of the present disclosure includes a buffer region, where an unadjusted visible region is within a region range of the buffer region and the buffer region is within a region range of the video. For a specific method of setting the buffer region, reference may be made to step 601.

Step 1202: The server acquires posture information of a user, where the posture information includes viewing angle information of the user and location information of the user.

Step 1203: The server adjusts, according to the posture information, an unadjusted visible region, in the video, for being displayed on a client in order to obtain an adjusted visible region currently for being displayed on the client.

For a specific implementation manner of step 1201 to step 1203, reference may be made to step 701 to step 703 in the foregoing embodiment.

Step 1204: When the adjusted visible region includes a region outside a buffer region, the server instructs a camera device to rotate a camera in an adjustment direction, where the adjustment direction is a direction from the unadjusted visible region to the adjusted visible region.

Step 1205: The server redefines an adjusted buffer region such that the adjusted visible region is within a region range of the adjusted buffer region, and then returns to step 1202.

A process in which when the adjusted visible region includes a region outside the buffer region, the server instructs the camera device to rotate the camera in the adjustment direction and redefines the adjusted buffer region in step 1204 and step 1205 is similar to a process in which the client instructs the camera device to rotate the camera in the adjustment direction and redefines the adjusted buffer region, and further, reference may be made to step 604 and step 605.

According to the interactive video display method provided in this embodiment of the present disclosure, a server adjusts, according to posture information, an unadjusted visible region, in a video, for being displayed on a client in order to obtain an adjusted visible region currently for being displayed on the client such that a problem in the prior art that browsing experience of a user is not real because a visible region is simply changed only according to a panning change of a location of the user can be resolved. After obtaining the adjusted visible region, when the adjusted visible region includes a region outside a buffer region, the server instructs a camera device to rotate in a direction from the unadjusted visible region to the adjusted visible region. Because the video includes the buffer region, the unadjusted visible region is within a region range of the buffer region, and the buffer region is within a region range of the video, the server may rotate a camera in advance before the adjusted visible region crosses a border of a video region of the camera, and the following problem in the prior art can be resolved. When a camera is rotated after an adjusted visible region crosses a border of a video region, because capturing image data of the video region and transmitting the data to a client require time, an image is delayed on the client.

Certainly, the interactive video display methods provided in the embodiments shown in FIG. 24, FIG. 25, FIG. 26, FIG. 27, FIG. 28, and FIG. 29 may also be applied to a scenario of interworking between 2D or 3D rooms. Further, reference may be made to descriptions about a client side, and details are not described herein again.

In addition, according to the interactive video display methods provided in the embodiments shown in FIG. 24 to FIG. 29, a robot with a camera may also be used as the camera device, or another display device such as an arc-shaped screen, a multi-screen splicing display device, or a head-mounted display may be used, which is not limited in the embodiments of the present disclosure.

Figure 30:
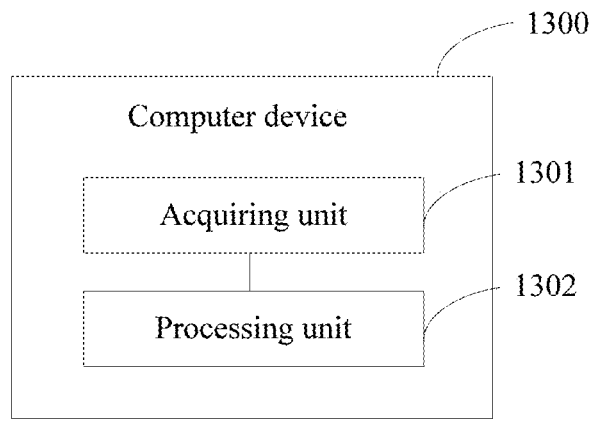
FIG. 30 is a schematic structural diagram of a computer device according to an embodiment of the present disclosure.

An embodiment of the present disclosure provides a computer device 1300. Referring to FIG. 30, the computer device 1300 may include an acquiring unit 1301, which is configured to acquire posture information of a user, where the posture information includes viewing angle information of the user and location information of the user, and a processing unit 1302, which is configured to adjust, according to the posture information acquired by the acquiring unit 1301, an unadjusted visible region, in a video, for being displayed on a client in order to obtain an adjusted visible region currently for being displayed on the client.

Optionally, the viewing angle information of the user may include face orientation information of the user, where the face orientation information of the user may include an angle by which a face orientation of the user rotates around a coronal axis and an angle by which the face orientation of the user rotates around a vertical axis.

Optionally, the location information of the user may include a vertical distance between the user and a plane of the client, and the processing unit 1302 may be further configured to acquire at least one of a region size change value and region displacement of the unadjusted visible region according to the viewing angle information of the user and the vertical distance, where the region size change value includes a width change value and a height change value of the unadjusted visible region, and the region displacement includes horizontal displacement of the unadjusted visible region and vertical displacement of the unadjusted visible region; and adjust the unadjusted visible region according to the at least one of the region size change value and the region displacement in order to obtain the adjusted visible region.

Optionally, the processing unit 1302 may be further configured to, when the vertical distance is greater than or equal to a preset distance threshold, where the video is a dynamic image on which a virtual window picture is superimposed, the virtual window picture includes a transparent region, a range that is in the dynamic image and that is covered by the transparent region of the virtual window picture is visible, and the unadjusted visible region is obtained by superimposing an unadjusted region of the virtual window picture on an unadjusted region of the dynamic image, adjust the unadjusted region of the virtual window picture according to the at least one of the region size change value and the region displacement in order to obtain an adjusted region of the virtual window picture, and fully cover the unadjusted region of the dynamic image with an adjusted picture that is presented in the adjusted region of the virtual window picture to obtain the adjusted visible region, or when the vertical distance is less than a preset distance threshold, adjust the unadjusted visible region according to the region displacement in order to obtain the adjusted visible region.

Optionally, the region size change value of the unadjusted visible region may be acquired using the following formulas:

$$\Delta w = z_u * \left( \tan\left(\frac{\theta_{fov}}{2} + \theta_u^y\right) + \tan\left(\frac{\theta_{fov}}{2} - \theta_u^y\right) \right) - 2 * z_u * \tan\left(\frac{\theta_{fov}}{2}\right), \text{ and}$$

$$\Delta h = z_u * \left( \tan\left(\frac{\theta_{fov}}{2} + \theta_u^x\right) + \tan\left(\frac{\theta_{fov}}{2} - \theta_u^x\right) \right) - 2 * z_u * \tan\left(\frac{\theta_{fov}}{2}\right),$$

where $\Delta w$ represents the width change value of the unadjusted visible region, $\Delta h$ represents the height change value of the unadjusted visible region, $\theta_u^x$ represents the angle by which the face orientation of the user rotates around the coronal axis, $\theta_u^y$ represents the angle by which the face orientation of the user rotates around the vertical axis, $\theta_{fov}$ represents a maximum visual angle of human eyes, and $z_u$ represents the vertical distance.

Optionally, the region displacement of the unadjusted visible region may be acquired using the following formulas, $$x_v = \frac{1}{2} * z_u * \left( \tan\left(\frac{\theta_{fov}}{2} + \theta_u^y\right) - \tan\left(\frac{\theta_{fov}}{2} - \theta_u^y\right) \right), \text{ and}$$

$$y_v = \frac{1}{2} * z_u * \left( \tan\left(\frac{\theta_{fov}}{2} + \theta_u^x\right) - \tan\left(\frac{\theta_{fov}}{2} - \theta_u^x\right) \right),$$

where $x_v$ represents the horizontal displacement of the unadjusted visible region, $y_v$ represents the vertical displacement of the unadjusted visible region, $\theta_u^x$ represents the angle by which the face orientation of the user rotates around the coronal axis, $\theta_u^y$ represents the angle by which the face orientation of the user rotates around the vertical axis, $\theta_{fov}$ represents a maximum visual angle of human eyes, and $z_u$ represents the vertical distance.

Optionally, the location information of the user may include a change value of the vertical distance between the user and the plane of the client, and the processing unit 1302 may be further configured to: acquire the region size change value of the unadjusted visible region according to the change value of the vertical distance, where the region size change value includes the width change value of the unadjusted visible region and the height change value of the unadjusted visible region, and adjust the unadjusted visible region according to the region size change value in order to obtain the adjusted visible region.

Optionally, a formula for acquiring the region size change value of the unadjusted visible region according to the change value of the vertical distance may include, $$\Delta w = \Delta h = \Delta z_u * \tan\left(\frac{\theta_{fov}}{2}\right) * 2,$$

where $\Delta w$ represents the width change value of the unadjusted visible region, $\Delta h$ represents the height change value of the unadjusted visible region, $\theta_{fov}$ represents a maximum visual angle of human eyes, and $\Delta z_u$ represents the change value of the vertical distance.

Figure 31:
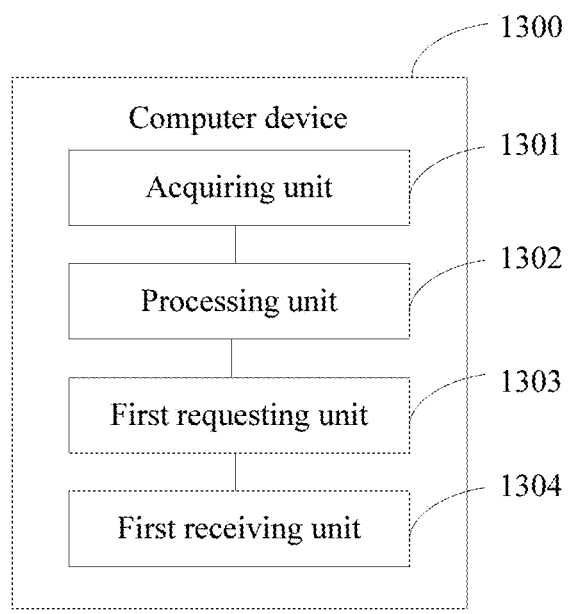
FIG. 31 is a schematic structural diagram of a computer device according to another embodiment of the present disclosure.

Optionally, the computer device 1300 may be the client. Referring to FIG. 31, the computer device 1300 may further include a first requesting unit 1303, which is configured to request, from a server, a bitstream file corresponding to a region in the video that covers the adjusted visible region acquired by the processing unit 1302, and a first receiving unit 1304, which is configured to receive the bitstream file requested by the first requesting unit 1303.

Optionally, the video is divided into n sub-regions, where n is a positive integer greater than 1, adjacent sub-regions in the n sub-regions have an overlapped region and the adjacent sub-regions have non-overlapped regions, and the region in the video that covers the adjusted visible region may be a to-be-downloaded sub-region in the n sub-regions that has a region overlapped with the adjusted visible region.

Optionally, the first requesting unit 1303 may be further configured to determine, according to a media presentation description that is of the video and that is obtained from the server, address information of the bitstream file corresponding to the to-be-downloaded sub-region, where the media presentation description carries a parameter that is used to indicate a sub-region, in the video, corresponding to the address information; and request, from the server according to the address information, the bitstream file corresponding to the to-be-downloaded sub-region.

Optionally, the computer device 1300 may be the client, and the processing unit 1302 may further be configured to predict a next visible region according to a previous visible region and the adjusted visible region currently for being displayed on the client.

Figure 32:
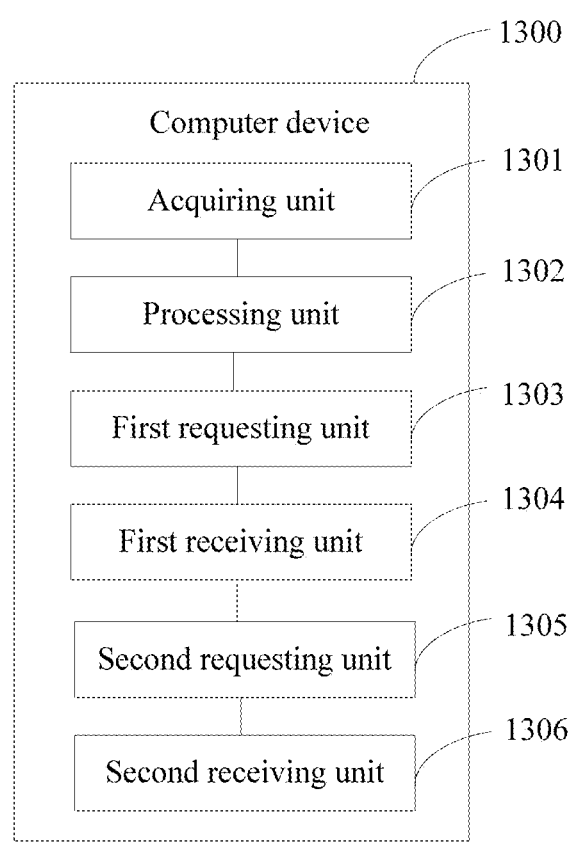
FIG. 32 is a schematic structural diagram of a computer device according to another embodiment of the present disclosure.

Referring to FIG. 32, the computer device 1300 may further include a second requesting unit 1305, which is configured to request, from a server, a bitstream file corresponding to a region in the video that covers the next visible region predicted by the processing unit 1302, and a second receiving unit 1306, which is configured to receive the bitstream file requested by the second requesting unit 1305.

Optionally, the computer device 1300 may be the client, the video is shot by a camera device, a camera of the camera device is rotatable, the video includes a buffer region, the unadjusted visible region is within a region range of the buffer region, and the buffer region is within a region range of the video; and the processing unit 1302 may further be configured to, when the adjusted visible region includes a region outside the buffer region, instruct the camera device to rotate the camera in an adjustment direction, where the adjustment direction is a direction from the unadjusted visible region to the adjusted visible region, and redefine an adjusted buffer region so that the adjusted visible region is within a region range of the adjusted buffer region.

Figure 33:
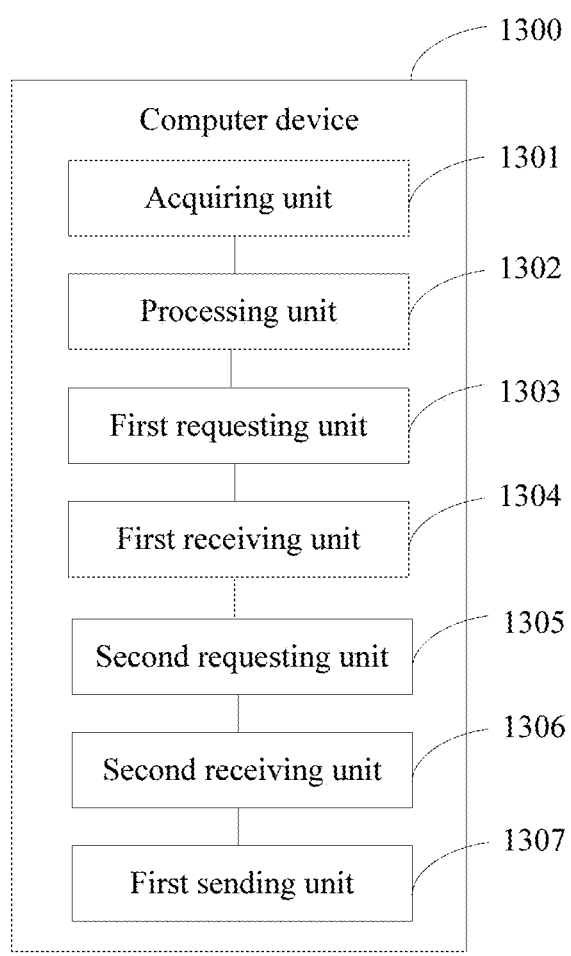
FIG. 33 is a schematic structural diagram of a computer device according to another embodiment of the present disclosure.

Optionally, the computer device 1300 may be a server. Referring to FIG. 33, the computer device 1300 may further include a first sending unit 1307, which is configured to send, to the client, a bitstream file corresponding to a region in the video that covers the adjusted visible region acquired by the processing unit 1302.

Optionally, the video is divided into n sub-regions, where n is a positive integer greater than 1, adjacent sub-regions in the n sub-regions have an overlapped region and the adjacent sub-regions have non-overlapped regions, and the region in the video that covers the adjusted visible region may be a to-be-downloaded sub-region in the n sub-regions that has a region overlapped with the adjusted visible region.

Optionally, the first sending unit 1307 may be further configured to determine, according to a generated media presentation description of the video, address information of the bitstream file corresponding to the to-be-downloaded sub-region, where the media presentation description carries a parameter that is used to indicate a sub-region, in the video, corresponding to the address information, and send, to the client according to the address information, the bitstream file corresponding to the to-be-downloaded sub-region.

Optionally, the computer device 1300 may be a server, and the processing unit 1302 may further be configured to predict a next visible region according to the unadjusted visible region and the adjusted visible region.

Figure 34:
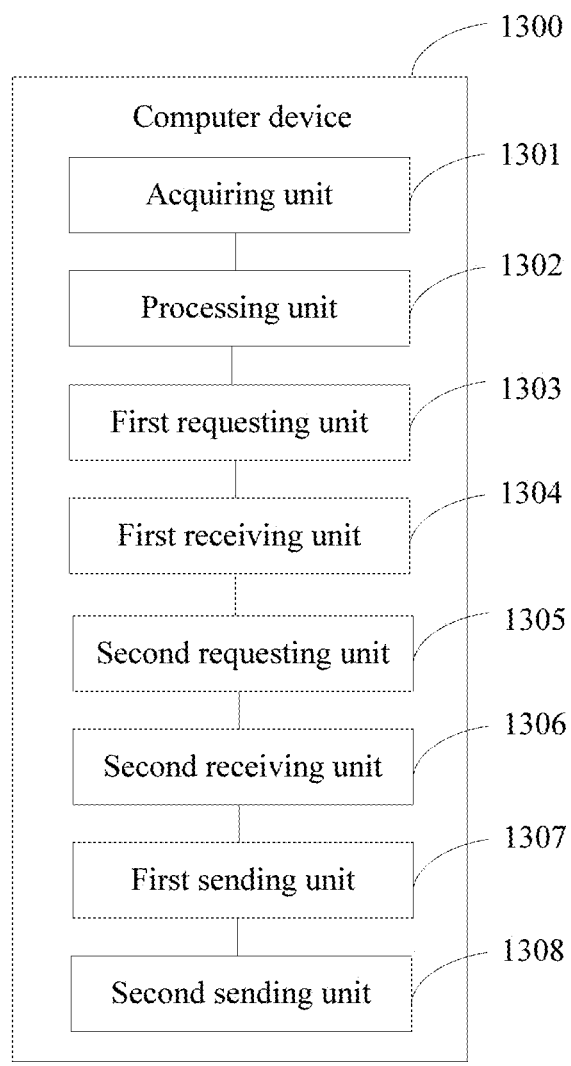
FIG. 34 is a schematic structural diagram of a computer device according to an embodiment of the present disclosure.

Referring to FIG. 34, the computer device 1300 may further include a second sending unit 1308 configured to send, to the client, a bitstream file corresponding to a region in the video that covers the next visible region predicted by the processing unit 1302.

Optionally, the computer device 1300 may be a server, the video is shot by a camera device, a camera of the camera device is rotatable, the video includes a buffer region, the unadjusted visible region is within a region range of the buffer region, and the buffer region is within a region range of the video; and the processing unit 1302 may further be configured to, when the adjusted visible region includes a region outside the buffer region, instruct the camera device to rotate the camera in an adjustment direction, where the adjustment direction is a direction from the unadjusted visible region to the adjusted visible region, and redefine an adjusted buffer region so that the adjusted visible region is within a region range of the adjusted buffer region.

Optionally, the region in the video that covers the adjusted visible region obtained by the processing unit 1302 may be the adjusted visible region.

Optionally, the region in the video that covers the next visible region predicted by the processing unit 1302 may be the next visible region.

Optionally, the media presentation description may include a VMPD, where the VMPD may include address information of the n sub-regions in each time segment obtained by performing compression coding at different bit rates.

According to the computer device 1300 provided in this embodiment of the present disclosure, posture information of a user is acquired in real time, and an unadjusted visible region, in a video, for being displayed on a client is adjusted according to the posture information of the user in order to obtain an adjusted visible region currently for being displayed on the client such that a visible region for being displayed on the client can be accordingly changed according to a real-time change of the posture information of the user, such as viewing angle information and location information of the user. Therefore, a problem in the prior art that browsing experience of a user is not real because a visible region is simply changed only according to a panning change of a location of the user can be resolved.

Figure 35:
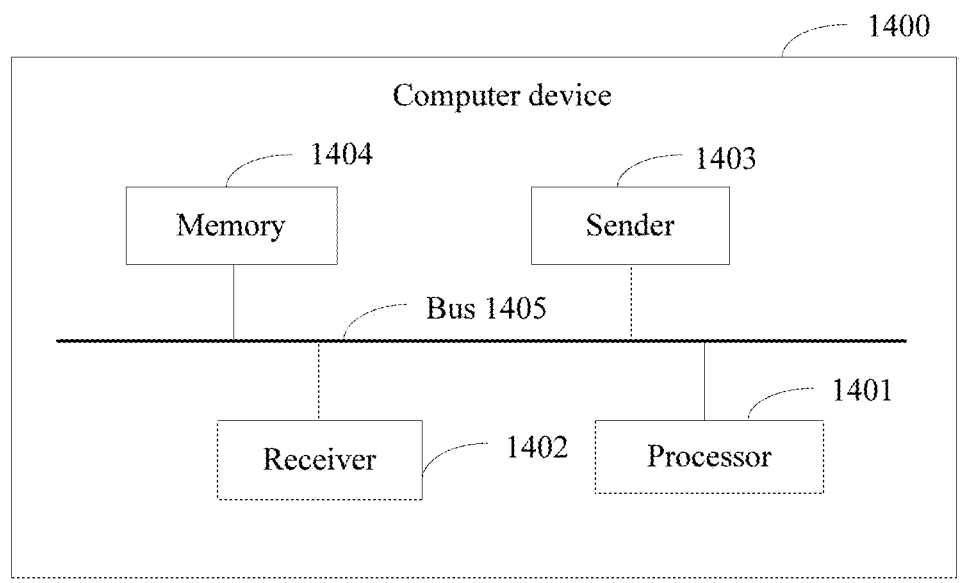
FIG. 35 is a schematic structural diagram of a computer device according to another embodiment of the present disclosure.

FIG. 35 is a schematic structural diagram of a computer device 1400 according to an embodiment of the present disclosure. The computer device 1400 may include a bus 1405, and a processor 1401, a receiver 1402, a sender 1403, and a memory 1404 that are connected to the bus. The memory 1404 is configured to store an instruction and data. The processor 1401 executes the instruction to acquire posture information of a user, where the posture information includes viewing angle information of the user and location information of the user; and adjust, according to the posture information, an unadjusted visible region, in a video, for being displayed on a client in order to obtain an adjusted visible region currently for being displayed on the client.

Optionally, in this embodiment of the present disclosure, the viewing angle information of the user includes face orientation information of the user, where the face orientation information of the user includes an angle by which a face orientation of the user rotates around a coronal axis and an angle by which the face orientation of the user rotates around a vertical axis.

Optionally, in this embodiment of the present disclosure, the location information of the user may include a vertical distance between the user and a plane of the client, and that the processor 1401 is further configured to execute the instruction to adjust, according to the posture information, the unadjusted visible region, in the video, for being displayed on the client in order to obtain the adjusted visible region currently for being displayed on the client may include, acquire at least one of a region size change value and region displacement of the unadjusted visible region according to the viewing angle information of the user and the vertical distance, where the region size change value includes a width change value of the unadjusted visible region and a height change value of the unadjusted visible region, and the region displacement includes horizontal displacement of the unadjusted visible region and vertical displacement of the unadjusted visible region, and adjust the unadjusted visible region according to the at least one of the region size change value and the region displacement in order to obtain the adjusted visible region.

Optionally, in this embodiment of the present disclosure, that the processor 1401 is further configured to execute the instruction to adjust the unadjusted visible region according to the at least one of the region size change value and the region displacement in order to obtain the adjusted visible region may include, when the vertical distance is greater than or equal to a preset distance threshold, where the video is a dynamic image on which a virtual window picture is superimposed, the virtual window picture includes a transparent region, a range that is in the dynamic image and that is covered by the transparent region of the virtual window picture is visible, and the unadjusted visible region is obtained by superimposing an unadjusted region of the virtual window picture on an unadjusted region of the dynamic image, adjust the unadjusted region of the virtual window picture according to the at least one of the region size change value and the region displacement in order to obtain an adjusted region of the virtual window picture, and fully cover the unadjusted region of the dynamic image with an adjusted picture that is presented in the adjusted region of the virtual window picture to obtain the adjusted visible region, or when the vertical distance is less than a preset distance threshold, adjusting the unadjusted visible region according to the region displacement in order to obtain the adjusted visible region.

Optionally, in this embodiment of the present disclosure, formulas used when the processor 1401 executes the instruction to acquire the region size change value of the unadjusted visible region according to the viewing angle information of the user and the vertical distance may include, $$\Delta w = z_u * \left( \tan\left(\frac{\theta_{fov}}{2} + \theta_u^y\right) + \tan\left(\frac{\theta_{fov}}{2} - \theta_u^y\right) \right) - 2 * z_u * \tan\left(\frac{\theta_{fov}}{2}\right), \text{ and}$$

$$\Delta h = z_u * \left( \tan\left(\frac{\theta_{fov}}{2} + \theta_u^x\right) + \tan\left(\frac{\theta_{fov}}{2} - \theta_u^x\right) \right) - 2 * z_u * \tan\left(\frac{\theta_{fov}}{2}\right),$$

where $\Delta w$ represents the width change value of the unadjusted visible region, $\Delta h$ represents the height change value of the unadjusted visible region, $\theta_u^x$ represents the angle by which the face orientation of the user rotates around the coronal axis, $\theta_u^y$ represents the angle by which the face orientation of the user rotates around the vertical axis, $\theta_{fov}$ represents a maximum visual angle of human eyes, and $z_u$ represents the vertical distance.

Optionally, in this embodiment of the present disclosure, formulas used when the processor 1401 executes the instruction to acquire the region displacement of the unadjusted visible region according to the viewing angle information of the user and the vertical distance may include, $$x_v = \frac{1}{2} * z_u * \left( \tan\left(\frac{\theta_{fov}}{2} + \theta_u^y\right) - \tan\left(\frac{\theta_{fov}}{2} - \theta_u^y\right) \right), \text{ and}$$

$$y_v = \frac{1}{2} * z_u * \left( \tan\left(\frac{\theta_{fov}}{2} + \theta_u^x\right) - \tan\left(\frac{\theta_{fov}}{2} - \theta_u^x\right) \right),$$

where $x_v$ represents the horizontal displacement of the unadjusted visible region, $y_v$ represents the vertical displacement of the unadjusted visible region, $\theta_u^x$ represents the angle by which the face orientation of the user rotates around the coronal axis, $\theta_u^y$ represents the angle by which the face orientation of the user rotates around the vertical axis, $\theta_{fov}$ represents a maximum visual angle of human eyes, and $z_u$ represents the vertical distance.

Optionally, in this embodiment of the present disclosure, the location information of the user includes a change value of the vertical distance between the user and the plane of the client, and that the processor 1401 is further configured to execute the instruction to adjust, according to the posture information, the unadjusted visible region, in the video, for being displayed on the client in order to obtain the adjusted visible region currently for being displayed on the client may include, acquire the region size change value of the unadjusted visible region according to the change value of the vertical distance, where the region size change value includes the width change value of the unadjusted visible region and the height change value of the unadjusted visible region, and adjust the unadjusted visible region according to the region size change value in order to obtain the adjusted visible region.

Optionally, in this embodiment of the present disclosure, a formula used when the processor 1401 executes the instruction to acquire the region size change value of the unadjusted visible region according to the change value of the vertical distance may include, $$\Delta w = \Delta h = \Delta z_u * \tan\left(\frac{\theta_{fov}}{2}\right) * 2,$$

where $\Delta w$ represents the width change value of the unadjusted visible region, $\Delta h$ represents the height change value of the unadjusted visible region, $\theta_{fov}$ represents a maximum visual angle of human eyes, and $\Delta z_u$ represents the change value of the vertical distance.

Optionally, in this embodiment of the present disclosure, the computer device 1400 is the client, and after the processor 1401 executes the instruction to further adjust, according to the posture information, the unadjusted visible region, in the video, for being displayed on the client in order to obtain the adjusted visible region currently for being displayed on the client, the processor 1401 is further configured to request, from a server, a bitstream file corresponding to a region in the video that covers the adjusted visible region.

The receiver 1402 may be configured to receive the bitstream file requested by the processor 1401.

Optionally, in this embodiment of the present disclosure, the computer device 1400 is the client, and the video is divided into n sub-regions, where n is a positive integer greater than 1, adjacent sub-regions in the n sub-regions have an overlapped region and the adjacent sub-regions have non-overlapped regions, and the region in the video that covers the adjusted visible region is a to-be-downloaded sub-region in the n sub-regions that has a region overlapped with the adjusted visible region.

Optionally, in this embodiment of the present disclosure, the computer device 1400 is the client, and that the processor 1401 is further configured to execute the instruction to request, from the server, the bitstream file corresponding to the region in the video that covers the adjusted visible region may include: determine, according to a media presentation description that is of the video and that is obtained from the server, address information of the bitstream file corresponding to the to-be-downloaded sub-region, where the media presentation description carries a parameter that is used to indicate a sub-region, in the video, corresponding to the address information, and request, from the server according to the address information, the bitstream file corresponding to the to-be-downloaded sub-region.

Optionally, in this embodiment of the present disclosure, the computer device 1400 is the client, and after the processor 1401 executes the instruction to further adjust, according to the posture information, the unadjusted visible region, in the video, for being displayed on the client in order to obtain the adjusted visible region currently for being displayed on the client, the processor 1401 is further configured to predict a next visible region according to the unadjusted visible region and the adjusted visible region, request, from a server, a bitstream file corresponding to a region in the video that covers the next visible region, and receive the bitstream file.

Optionally, in this embodiment of the present disclosure, the computer device 1400 is the client, the video is shot by a camera device, a camera of the camera device is rotatable, the video includes a buffer region, the unadjusted visible region is within a region range of the buffer region, and the buffer region is within a region range of the video, and after the processor 1401 executes the instruction to further adjust, according to the posture information, the unadjusted visible region, in the video, for being displayed on the client in order to obtain the adjusted visible region currently for being displayed on the client, the processor 1401 is further configured to, when the adjusted visible region includes a region outside the buffer region, instruct the camera device to rotate the camera in an adjustment direction, where the adjustment direction is a direction from the unadjusted visible region to the adjusted visible region, and redefine an adjusted buffer region so that the adjusted visible region is within a region range of the adjusted buffer region.

Optionally, in this embodiment of the present disclosure, the computer device 1400 is a server, and the sender 1403 may be configured to send, to the client, a bitstream file corresponding to a region in the video that covers the adjusted visible region acquired by the processor 1401.

Optionally, in this embodiment of the present disclosure, the computer device 1400 is the server, and the video is divided into n sub-regions, where n is a positive integer greater than 1, adjacent sub-regions in the n sub-regions have an overlapped region and the adjacent sub-regions have non-overlapped regions, and the region in the video that covers the adjusted visible region is a to-be-downloaded sub-region in the n sub-regions that has a region overlapped with the adjusted visible region.

Optionally, in this embodiment of the present disclosure, the computer device 1400 is the server, and the sender 1403 is further configured to determine, according to a generated media presentation description of the video, address information of the bitstream file corresponding to the to-be-downloaded sub-region, where the media presentation description carries a parameter that is used to indicate a sub-region, in the video, corresponding to the address information; and send, to the client according to the address information, the bitstream file corresponding to the to-be-downloaded sub-region.

Optionally, in this embodiment of the present disclosure, the computer device 1400 is a server, and after the processor 1401 may further be configured to adjust, according to the posture information, the unadjusted visible region, in the video, for being displayed on the client in order to obtain the adjusted visible region currently for being displayed on the client, the processor 1401 is further configured to predict a next visible region according to the unadjusted visible region and the adjusted visible region.

The sender 1403 may be configured to send, to the client, a bitstream file corresponding to a region in the video that covers the next visible region.

Optionally, in this embodiment of the present disclosure, the computer device 1400 is a server, the video is shot by a camera device, a camera of the camera device is rotatable, the video includes a buffer region, the unadjusted visible region is within a region range of the buffer region, and the buffer region is within a region range of the video, and after the processor 1401 executes the instruction to further adjust, according to the posture information, the unadjusted visible region, in the video, for being displayed on the client in order to obtain the adjusted visible region currently for being displayed on the client, the processor 1401 is further configured to, when the adjusted visible region includes a region outside the buffer region, instruct the camera device to rotate the camera in an adjustment direction, where the adjustment direction is a direction from the unadjusted visible region to the adjusted visible region, and redefine an adjusted buffer region so that the adjusted visible region is within a region range of the adjusted buffer region.

Optionally, in this embodiment of the present disclosure, the region in the video that covers the adjusted visible region is the adjusted visible region.

Optionally, in this embodiment of the present disclosure, the region in the video that covers the next visible region is the next visible region.

Optionally, in this embodiment of the present disclosure, the media presentation description includes a VMPD, where the VMPD includes address information of the n sub-regions in each time segment obtained by performing compression coding at different bit rates.

According to the computer device 1400 provided in this embodiment of the present disclosure, posture information of a user is acquired in real time, and an unadjusted visible region, in a video, for being displayed on a client is adjusted according to the posture information of the user in order to obtain an adjusted visible region currently for being displayed on the client such that a visible region for being displayed on the client can be accordingly changed according to a real-time change of the posture information of the user, such as viewing angle information and location information of the user. Therefore, a problem in the prior art that browsing experience of a user is not real because a visible region is simply changed only according to a panning change of a location of the user can be resolved.

Figure 36:
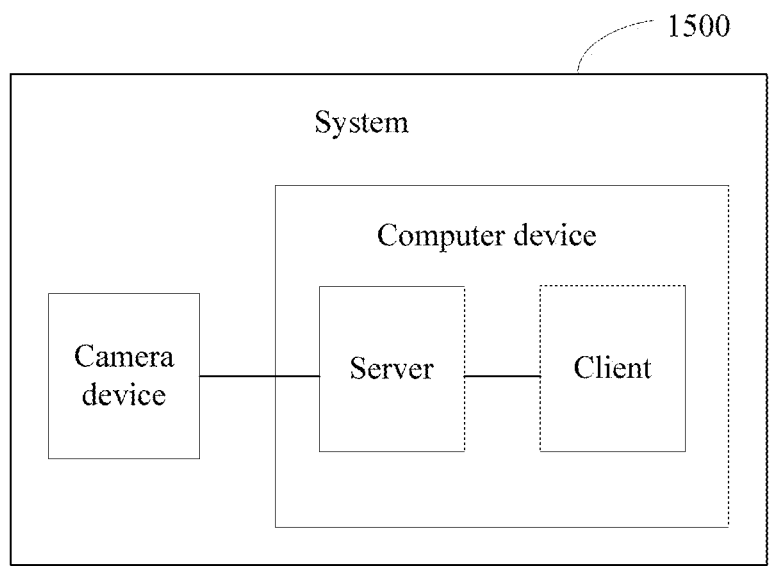
FIG. 36 is a schematic structural diagram of a system according to an embodiment of the present disclosure.

Referring to FIG. 36, an embodiment of the present disclosure provides a system 1500, which includes the computer device shown in FIG. 24 to FIG. 29. The computer device includes a client and a server, and may further include a camera device that is configured to capture image data of a video region. For specific implementation manners of the client and the server, reference may be made to the foregoing embodiments, and details are not described herein again.

In the several embodiments provided in the present application, it should be understood that the disclosed system, device, and method may be implemented in other manners. For example, the described device embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

In addition, functional units in the devices and the systems in the embodiments of the present disclosure may be integrated into one processing unit, or each of the units may exist alone physically, or two or more units are integrated into one unit. The unit may be implemented in a form of hardware, or may be implemented in a form of hardware in addition to a software functional unit.

All or some of the steps of the method embodiments may be implemented by a program instructing related hardware. The program may be stored in a computer-readable storage medium. When the program runs, the steps of the method embodiments are performed. The foregoing storage medium includes, any medium that can store program code, such as a universal serial bus (USB) flash drive, a removable hard disk, a read-only memory (ROM), a random access memory (RAM), a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. An interactive video display method, comprising:
acquiring posture information of a user, wherein the posture information comprises viewing angle information of the user and location information of the user; and
acquiring, for a video displayed on a client, at least one of a size change value for a region of an unadjusted visible region and region displacement of the unadjusted visible region;
adjusting, according to the posture information, the unadjusted visible region to obtain an adjusted visible region for display on the client, wherein the size change value for the region of the unadjusted visible region is acquired according to the following formulas:

$$\Delta w = z_u * \left( \tan\left( \frac{\theta_{fov}}{2} + \theta_u^y \right) + \tan\left( \frac{\theta_{fov}}{2} - \theta_u^y \right) \right) - 2 * z_u * \tan\left( \frac{\theta_{fov}}{2} \right); \text{ and}$$

$$\Delta h = z_u * \left( \tan\left( \frac{\theta_{fov}}{2} + \theta_u^x \right) + \tan\left( \frac{\theta_{fov}}{2} - \theta_u^x \right) \right) - 2 * z_u * \tan\left( \frac{\theta_{fov}}{2} \right),$$

wherein $\Delta w$ represents a width change value of the unadjusted visible region,
wherein $\Delta h$ represents a height change value of the unadjusted visible region,
wherein $\theta_u^x$ represents an angle by which a face orientation of the user rotates around a coronal axis,
wherein $\theta_u^y$ represents an angle by which the face orientation of the user rotates around a vertical axis,
wherein $\theta_{fov}$ represents a maximum visual angle of human eyes, and
wherein $z_u$ represents a vertical distance between the user and a plane of the client.

2. The interactive video display method according to claim 1, wherein the location information of the user comprises the vertical distance between the user and the plane of the client, and wherein adjusting the unadjusted visible region to obtain the adjusted visible region for display on the client comprises:
acquiring at least one of the size change value for the region and the region displacement of the unadjusted visible region according to a viewing angle information of the user and the vertical distance, wherein the size change value for the region comprises the width change value of the unadjusted visible region and the height change value of the unadjusted visible region, and wherein the region displacement comprises horizontal displacement of the unadjusted visible region and vertical displacement of the unadjusted visible region; and
adjusting the unadjusted visible region according to the at least one of the size change value for the region and the region displacement in order to obtain the adjusted visible region.

3. The interactive video display method according to claim 1, wherein adjusting the unadjusted visible region comprises:
adjusting an unadjusted region of a virtual window picture according to the size change value for the region and the region displacement in order to obtain an adjusted region of the virtual window picture when the vertical distance is greater than or equal to a preset distance threshold;

fully covering an unadjusted region of a dynamic image with an adjusted picture that is presented in the adjusted region of the virtual window picture to obtain the adjusted visible region when the vertical distance is greater than or equal to the preset distance threshold, wherein the video is the dynamic image on which the virtual window picture is superimposed, wherein the virtual window picture comprises a transparent region that is in the dynamic image, wherein the dynamic image covered by the transparent region of the virtual window picture is visible, and wherein the unadjusted visible region is obtained by superimposing the unadjusted region of the virtual window picture on the unadjusted region of the dynamic image; and adjusting the unadjusted visible region according to the region displacement in order to obtain the adjusted visible region when the vertical distance is less than the preset distance threshold.

4. The interactive video display method according to claim 1, wherein viewing angle information of the user comprises face orientation information of the user, and wherein the face orientation information of the user comprises the angle by which the face orientation of the user rotates around the coronal axis and the angle by which the face orientation of the user rotates around the vertical axis.

5. The interactive video display method according to claim 1, wherein the region displacement of the unadjusted visible region is acquired using the following formulas:

$$x_v = \frac{1}{2} * z_u * \left(\tan\left(\frac{\theta_{fov}}{2} + \theta_u^y\right) - \tan\left(\frac{\theta_{fov}}{2} - \theta_u^y\right)\right); \text{ and}$$

$$y_v = \frac{1}{2} * z_u * \left(\tan\left(\frac{\theta_{fov}}{2} + \theta_u^x\right) - \tan\left(\frac{\theta_{fov}}{2} - \theta_u^x\right)\right),$$

wherein $x_v$ represents a horizontal displacement of the unadjusted visible region, wherein $y_v$ represents a vertical displacement of the unadjusted visible region.

6. The interactive video display method according to claim 1, wherein the posture information of the user comprises a change value of the vertical distance between the user and the plane of the client, and wherein adjusting, according to the posture information, the unadjusted visible region to obtain the adjusted visible region for display on the client comprises:

acquiring the size change value for the region of the unadjusted visible region according to the change value of the vertical distance, and wherein the size change value for the region comprises a width change value of the unadjusted visible region and a height change value of the unadjusted visible region; and adjusting the unadjusted visible region according to the size change value for the region in order to obtain the adjusted visible region.

7. The interactive video display method according to claim 6, wherein a formula for acquiring the size change value for the region of the unadjusted visible region according to the change value of the vertical distance comprises $$\Delta w = \Delta h = \Delta z_u * \tan\left(\frac{\theta_{fov}}{2}\right) * 2,$$

wherein $\Delta w$ represents the width change value of the unadjusted visible region, wherein $\Delta h$ represents the height change value of the unadjusted visible region, wherein $\theta_{fov}$ represents the maximum visual angle of human eyes, and wherein $\Delta z_u$ represents the change value of the vertical distance.

8. The interactive video display method according to claim 1, wherein after adjusting, according to the posture information, the unadjusted visible region to obtain the adjusted visible region for display on the client, the method further comprises:

requesting, from a server, a bitstream file corresponding to a region in the video that covers the adjusted visible region; and receiving the bitstream file.

9. The interactive video display method according to claim 8, wherein the video is divided into n sub-regions, wherein n is a positive integer greater than 1, wherein adjacent sub-regions of the n sub-regions have an overlapped region and have non-overlapped regions, and wherein a first region in the video that covers the adjusted visible region is a to-be-downloaded sub-region of the n sub-regions that has a second region overlapped with the adjusted visible region.

10. The interactive video display method according to claim 9, wherein requesting, from the server, the bitstream file corresponding to the region in the video that covers the adjusted visible region comprises:

determining, according to a media presentation description of the video obtained from the server, address information of the bitstream file corresponding to the to-be-downloaded sub-region, wherein the media presentation description comprises a parameter that is used to indicate a sub-region of the n sub-regions, in the video, corresponding to the address information; and requesting, from the server, according to the address information, the bitstream file corresponding to the to-be-downloaded sub-region.

11. The interactive video display method according to claim 1, wherein after adjusting, according to the posture information, the unadjusted visible region to obtain the adjusted visible region for display on the client, the method further comprises:

predicting a next visible region according to the unadjusted visible region and the adjusted visible region;

requesting, from a server, a bitstream file corresponding to a region in the video that covers the next visible region; and receiving the bitstream file.

12. The interactive video display method according to claim 1, wherein the video is received from a camera device, wherein a camera of the camera device is rotatable, wherein the video comprises a buffer region, wherein the unadjusted visible region is within a region range of the buffer region, wherein the buffer region is within a region range of the video, and wherein after adjusting, according to the posture information, the unadjusted visible region to obtain the adjusted visible region for display on the client, the method further comprises:

instructing the camera device to rotate the camera in an adjustment direction when the adjusted visible region comprises a region outside the buffer region, wherein the adjustment direction is in a direction from the unadjusted visible region to the adjusted visible region; and redefining an adjusted buffer region such that the adjusted visible region is within a region range of the adjusted buffer region.

13. The interactive video display method according to claim 1, wherein after adjusting, according to the posture information, an unadjusted visible region to obtain an adjusted visible region for display on the client, the method further comprises sending, to the client, a bitstream file corresponding to a region in the video that covers the adjusted visible region.

14. The interactive video display method according to claim 13, wherein the video is divided into n sub-regions, wherein n is a positive integer greater than 1, wherein adjacent sub-regions of the n sub-regions have an overlapped region and the adjacent sub-regions have non-overlapped regions, and wherein the region in the video that covers the adjusted visible region is a to-be-downloaded sub-region of the n sub-regions that has a region overlapped with the adjusted visible region.

15. The interactive video display method according to claim 14, wherein receiving, at the client, the bitstream file corresponding to the region in the video that covers the adjusted visible region comprises:
 determining, according to a media presentation description of the video, address information of the bitstream file corresponding to the to-be-downloaded sub-region, wherein the media presentation description comprises a parameter that indicates a sub-region, in the video, corresponding to the address information; and
 receiving, at the client, according to the address information, the bitstream file corresponding to the to-be-downloaded sub-region.

16. The interactive video display method according to claim 1, wherein after adjusting, according to the posture information, the unadjusted visible region to obtain the adjusted visible region for display on the client, the method further comprises:
 predicting a next visible region according to the unadjusted visible region and the adjusted visible region; and
 receiving, at the client, a bitstream file corresponding to a region in the video that covers the next visible region.

17. The interactive video display method according to claim 1, wherein the video is received from a camera device, wherein a camera of the camera device is rotatable, wherein the video comprises a buffer region, wherein the unadjusted visible region is within a region range of the buffer region, wherein the buffer region is within a region range of the video, and wherein after adjusting, according to the posture information, the unadjusted visible region to obtain the adjusted visible region for display on the client, the method further comprises:
 instructing the camera device to rotate the camera in an adjustment direction when the adjusted visible region comprises a region outside the buffer region, wherein the adjustment direction is in a direction from the unadjusted visible region to the adjusted visible region; and
 redefining an adjusted buffer region such that the adjusted visible region is within a region range of the adjusted buffer region.

18. The interactive video display method according to claim 10, wherein the media presentation description comprises a viewing angle, and wherein the viewing angle comprises address information of the n sub-regions in each time segment that is obtained by performing compression coding at different bit rates.

19. A computer device, comprising:
 a memory comprising instructions; and
 a processor coupled to the memory, wherein the instructions cause the processor to be configured to:
  acquire posture information of a user, and wherein the posture information comprises viewing angle information of the user and location information of the user; and
  acquire at least one of a size change value for a region of an unadjusted visible region and region displacement of the unadjusted visible region;
 adjust, according to the posture information, the unadjusted visible region in a video to obtain an adjusted visible region for display on a client, wherein the size change value for the region of the unadjusted visible region is acquired according to the following formulas:

$$\Delta w = z_u * \left(\tan\left(\frac{\theta_{fov}}{2} + \theta_u^y\right) + \tan\left(\frac{\theta_{fov}}{2} - \theta_u^y\right)\right) - 2 * z_u * \tan\left(\frac{\theta_{fov}}{2}\right); \text{ and}$$

$$\Delta h = z_u * \left(\tan\left(\frac{\theta_{fov}}{2} + \theta_u^x\right) + \tan\left(\frac{\theta_{fov}}{2} - \theta_u^x\right)\right) - 2 * z_u * \tan\left(\frac{\theta_{fov}}{2}\right),$$

wherein $\Delta w$ represents a width change value of the unadjusted visible region,
 wherein $\Delta h$ represents a height change value of the unadjusted visible region,
 wherein $\theta_u^x$ represents an angle by which a face orientation of the user rotates around a coronal axis,
 wherein $\theta_u^y$ represents an angle by which the face orientation of the user rotates around a vertical axis,
 wherein $\theta_{fov}$ represents a maximum visual angle of human eyes, and
 wherein $z_u$ represents a vertical distance between the user and a plane of the client.

* * * * *